US008137188B2

(12) United States Patent
Breckner et al.

(10) Patent No.: US 8,137,188 B2
(45) Date of Patent: Mar. 20, 2012

(54) SERVER BASED GAMING SYSTEM HAVING MULTIPLE PROGRESSIVE AWARDS

(75) Inventors: Robert E. Breckner, Reno, NV (US); Jamal Benbrahim, Reno, NV (US); James A. Vasquez, Carson City, NV (US); Mark W. Bansemer, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1261 days.

(21) Appl. No.: 11/470,225

(22) Filed: Sep. 5, 2006

(65) Prior Publication Data

US 2007/0191088 A1 Aug. 16, 2007

Related U.S. Application Data

(60) Provisional application No. 60/745,947, filed on Apr. 28, 2006, provisional application No. 60/715,526, filed on Sep. 9, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................. 463/27; 463/16; 463/17; 463/42

(58) Field of Classification Search .................... 463/27, 463/42

See application file for complete search history.

(56) References Cited

U.S. PATENT DOCUMENTS

| | | | |
|---|---|---|---|
| 2,942,574 | A | 6/1960 | Golay |
| 3,618,019 | A | 11/1971 | Nemirovsky |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |
| 4,448,419 | A | 5/1984 | Telnaes |
| 4,494,197 | A | 1/1985 | Troy et al. |
| 4,572,509 | A | 2/1986 | Sitrick |
| 4,573,681 | A | 3/1986 | Okada |

(Continued)

FOREIGN PATENT DOCUMENTS

| | | |
|---|---|---|
| AU | 39363/78 | 3/1980 |

(Continued)

OTHER PUBLICATIONS

*Aristocrat Technologies Australia Pty. Ltd.* v. *IGT* (Australia) [2007] FCA 37, dated Feb. 7, 2007.

(Continued)

*Primary Examiner* — David L Lewis
*Assistant Examiner* — Reginald Renwick
(74) *Attorney, Agent, or Firm* — K&L Gates LLP

(57) ABSTRACT

A gaming system including a central server linked to a plurality of gaming machines. The central server includes a plurality of progressive modules. Each progressive module maintains one or more progressive awards and is associated with zero, one or more of the gaming machines in the gaming system. Upon a determination that a designated one of the progressive awards will be provided, one of the gaming machines associated with the progressive module which maintains the designated progressive award provides the designated progressive award to the player of such gaming machine.

48 Claims, 10 Drawing Sheets

U.S. PATENT DOCUMENTS

| | | | |
|---|---|---|---|
| 4,582,324 A | 4/1986 | Koza et al. | |
| 4,624,459 A | 11/1986 | Kaufman | |
| 4,636,951 A | 1/1987 | Harlick | |
| 4,652,998 A | 3/1987 | Koza et al. | |
| 4,657,256 A | 4/1987 | Okada | |
| 4,669,731 A | 6/1987 | Clarke | |
| 4,721,307 A | 1/1988 | Okada | |
| 4,743,024 A | 5/1988 | Helm et al. | |
| 4,760,527 A | 7/1988 | Sidley | |
| 4,764,666 A | 8/1988 | Bergeron | |
| 4,772,023 A | 9/1988 | Okada | |
| 4,775,155 A | 10/1988 | Lees | |
| 4,805,907 A | 2/1989 | Hagiwara | |
| 4,837,728 A | 6/1989 | Barrie et al. | |
| 4,842,278 A | 6/1989 | Markowicz | |
| 4,856,787 A | 8/1989 | Itkis | |
| 4,866,515 A | 9/1989 | Tagawa et al. | |
| 4,871,171 A | 10/1989 | Rivero | |
| 4,880,237 A | 11/1989 | Kishishita | |
| 4,924,378 A | 5/1990 | Hershey et al. | |
| 4,926,327 A | 5/1990 | Sidley | |
| 4,964,638 A | 10/1990 | Ishida | |
| 4,991,848 A | 2/1991 | Greenwood et al. | |
| 5,016,880 A | 5/1991 | Berge | |
| 5,038,022 A | 8/1991 | Lucero | |
| 5,048,833 A | 9/1991 | Lamle | |
| 5,074,559 A | 12/1991 | Okada | |
| 5,116,055 A | 5/1992 | Tracy | |
| 5,123,649 A | 6/1992 | Tiberio | |
| 5,127,651 A | 7/1992 | Okada | |
| 5,138,712 A | 8/1992 | Corbin | |
| 5,142,622 A | 8/1992 | Owens | |
| 5,158,293 A | 10/1992 | Mullins | |
| 5,178,390 A | 1/1993 | Okada | |
| 5,179,517 A | 1/1993 | Sarbin et al. | |
| 5,209,479 A | 5/1993 | Nagao | |
| 5,217,224 A | 6/1993 | Sincock | |
| 5,249,800 A | 10/1993 | Hilgendorf et al. | |
| 5,259,616 A | 11/1993 | Bergmann | |
| 5,265,874 A | 11/1993 | Dickinson et al. | |
| 5,275,400 A | 1/1994 | Weingardt et al. | |
| 5,276,312 A | 1/1994 | McCarthy | |
| 5,277,424 A | 1/1994 | Wilms | |
| 5,280,909 A | 1/1994 | Tracy | |
| 5,282,620 A | 2/1994 | Keesee | |
| 5,286,023 A | 2/1994 | Wood | |
| 5,288,978 A | 2/1994 | Iijima | |
| 5,292,127 A | 3/1994 | Kelly et al. | |
| 5,305,195 A | 4/1994 | Murphy | |
| 5,321,241 A | 6/1994 | Craine | |
| 5,324,035 A | 6/1994 | Morris et al. | |
| 5,326,104 A | 7/1994 | Pease et al. | |
| 5,342,047 A | 8/1994 | Heidel et al. | |
| 5,342,049 A | 8/1994 | Wichinsky et al. | |
| 5,344,144 A | 9/1994 | Canon | |
| 5,349,642 A | 9/1994 | Kingdon | |
| 5,351,970 A | 10/1994 | Fioretti | |
| 5,375,206 A | 12/1994 | Hunter et al. | |
| 5,377,993 A | 1/1995 | Josephs | |
| 5,380,008 A | 1/1995 | Mathis et al. | |
| 5,393,057 A | 2/1995 | Marnell, II | |
| 5,398,932 A | 3/1995 | Eberhardt et al. | |
| 5,401,024 A | 3/1995 | Simunek | |
| 5,404,567 A | 4/1995 | DePietro et al. | |
| 5,417,430 A | 5/1995 | Breeding | |
| 5,423,539 A | 6/1995 | Nagao | |
| 5,429,361 A | 7/1995 | Raven et al. | |
| 5,430,791 A | 7/1995 | Feit et al. | |
| 5,438,508 A | 8/1995 | Wyman | |
| 5,456,465 A | 10/1995 | Durham | |
| 5,465,082 A | 11/1995 | Chaco | |
| 5,470,079 A | 11/1995 | LeStrange et al. | |
| 5,472,194 A | 12/1995 | Breeding et al. | |
| 5,476,259 A | 12/1995 | Weingardt | |
| 5,489,101 A | 2/1996 | Moody | |
| 5,499,340 A | 3/1996 | Barritz | |
| 5,507,489 A | 4/1996 | Reibel et al. | |
| 5,507,491 A | 4/1996 | Gatto et al. | |
| 5,511,781 A | 4/1996 | Wood et al. | |
| 5,524,888 A | 6/1996 | Heidel | |
| 5,530,232 A | 6/1996 | Taylor | |
| 5,536,016 A | 7/1996 | Thompson | |
| 5,544,893 A | 8/1996 | Jones et al. | |
| 5,547,192 A | 8/1996 | Ishibashi | |
| 5,559,313 A | 9/1996 | Claus et al. | |
| 5,560,603 A | 10/1996 | Seelig et al. | |
| 5,564,700 A * | 10/1996 | Celona | 463/27 |
| 5,566,337 A | 10/1996 | Szymanski et al. | |
| 5,570,885 A | 11/1996 | Ornstein | |
| 5,578,808 A | 11/1996 | Taylor | |
| 5,580,053 A | 12/1996 | Crouch | |
| 5,580,309 A | 12/1996 | Piechowiak et al. | |
| 5,584,763 A | 12/1996 | Kelly et al. | |
| 5,586,257 A | 12/1996 | Perlman | |
| 5,586,937 A | 12/1996 | Menashe | |
| 5,601,487 A | 2/1997 | Oshima | |
| 5,605,506 A | 2/1997 | Hoorn et al. | |
| 5,611,535 A | 3/1997 | Tiberio | |
| 5,611,730 A | 3/1997 | Weiss | |
| 5,617,331 A | 4/1997 | Wakai et al. | |
| 5,626,341 A | 5/1997 | Jones et al. | |
| 5,630,757 A | 5/1997 | Gagin et al. | |
| 5,640,192 A | 6/1997 | Garfinkle | |
| 5,641,050 A | 6/1997 | Smith et al. | |
| 5,643,086 A | 7/1997 | Alcorn et al. | |
| 5,645,486 A | 7/1997 | Nagao et al. | |
| 5,649,118 A | 7/1997 | Carlisle et al. | |
| 5,655,603 A | 8/1997 | Schulte et al. | |
| 5,655,961 A | 8/1997 | Acres et al. | |
| 5,664,998 A | 9/1997 | Seelig et al. | |
| 5,671,412 A | 9/1997 | Christiano | |
| 5,674,128 A | 10/1997 | Holch et al. | |
| 5,702,304 A | 12/1997 | Acres et al. | |
| 5,707,285 A | 1/1998 | Place et al. | |
| 5,707,286 A | 1/1998 | Carlson | |
| 5,708,709 A | 1/1998 | Rose | |
| 5,717,604 A | 2/1998 | Wiggins | |
| 5,722,891 A | 3/1998 | Inoue | |
| 5,732,948 A | 3/1998 | Yoseloff | |
| 5,741,183 A | 4/1998 | Acres et al. | |
| 5,743,800 A | 4/1998 | Huard et al. | |
| 5,745,879 A | 4/1998 | Wyman | |
| 5,752,882 A | 5/1998 | Acres et al. | |
| 5,755,621 A | 5/1998 | Marks et al. | |
| 5,758,069 A | 5/1998 | Olsen | |
| 5,759,102 A | 6/1998 | Pease et al. | |
| 5,761,647 A | 6/1998 | Boushy | |
| 5,762,552 A | 6/1998 | Vuong et al. | |
| 5,766,076 A | 6/1998 | Pease et al. | |
| 5,768,382 A | 6/1998 | Schneier et al. | |
| 5,769,716 A | 6/1998 | Saffari et al. | |
| 5,772,511 A | 6/1998 | Smeltzer | |
| RE35,864 E | 7/1998 | Weingardt | |
| 5,779,545 A | 7/1998 | Berg et al. | |
| 5,779,547 A | 7/1998 | SoRelle et al. | |
| 5,779,549 A | 7/1998 | Walker et al. | |
| 5,788,573 A | 8/1998 | Baerlocher et al. | |
| 5,800,268 A | 9/1998 | Molnick | |
| 5,800,269 A | 9/1998 | Holch et al. | |
| 5,806,855 A | 9/1998 | Cherry | |
| 5,807,172 A | 9/1998 | Piechowiak | |
| 5,816,918 A | 10/1998 | Kelly et al. | |
| 5,820,459 A | 10/1998 | Acres et al. | |
| 5,823,874 A | 10/1998 | Adams | |
| 5,828,840 A | 10/1998 | Cowan et al. | |
| 5,833,537 A | 11/1998 | Barrie | |
| 5,833,538 A | 11/1998 | Weiss | |
| 5,833,540 A | 11/1998 | Miodunski et al. | |
| 5,836,817 A | 11/1998 | Acres et al. | |
| 5,845,283 A | 12/1998 | Williams et al. | |
| 5,848,932 A | 12/1998 | Adams | |
| 5,851,011 A | 12/1998 | Lott | |
| 5,851,148 A | 12/1998 | Brune et al. | |
| 5,851,149 A | 12/1998 | Xidos et al. | |
| 5,855,514 A | 1/1999 | Kamille | |
| 5,855,515 A | 1/1999 | Pease et al. | |
| 5,871,398 A | 2/1999 | Schneier et al. | |

| | | | |
|---|---|---|---|
| 5,876,284 | A | 3/1999 | Acres et al. |
| 5,885,158 | A | 3/1999 | Torango et al. |
| 5,902,184 | A | 5/1999 | Bennett |
| 5,902,983 | A | 5/1999 | Crevelt et al. |
| 5,903,732 | A | 5/1999 | Reed et al. |
| 5,905,248 | A | 5/1999 | Russell et al. |
| 5,910,048 | A | 6/1999 | Feinberg |
| 5,913,164 | A | 6/1999 | Pawa et al. |
| 5,917,725 | A | 6/1999 | Thacher et al. |
| 5,918,039 | A | 6/1999 | Buswell et al. |
| 5,919,088 | A | 7/1999 | Weiss |
| 5,925,127 | A | 7/1999 | Ahmad |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,611 | A | 9/1999 | La Pierre |
| 5,970,143 | A | 10/1999 | Schneier et al. |
| 5,971,271 | A | 10/1999 | Wynn et al. |
| 5,971,849 | A | 10/1999 | Falciglia |
| 5,974,409 | A | 10/1999 | Sanu et al. |
| 5,980,093 | A | 11/1999 | Jones et al. |
| 5,980,384 | A | 11/1999 | Barrie |
| 5,983,190 | A | 11/1999 | Trower, II et al. |
| 5,984,779 | A | 11/1999 | Bridgeman et al. |
| 5,989,121 | A | 11/1999 | Sakamoto |
| 5,991,760 | A | 11/1999 | Gauvin et al. |
| 5,991,790 | A | 11/1999 | Shah et al. |
| 5,993,316 | A | 11/1999 | Coyle et al. |
| 5,996,068 | A | 11/1999 | Dwyer, III et al. |
| 5,997,400 | A | 12/1999 | Seelig et al. |
| 5,999,808 | A | 12/1999 | LaDue |
| 6,001,016 | A | 12/1999 | Walker et al. |
| 6,003,066 | A | 12/1999 | Ryan et al. |
| 6,003,094 | A | 12/1999 | Dean |
| 6,003,123 | A | 12/1999 | Carter et al. |
| 6,004,207 | A | 12/1999 | Wilson, Jr. et al. |
| 6,007,427 | A | 12/1999 | Wiener et al. |
| 6,011,850 | A | 1/2000 | Bertrand et al. |
| 6,012,982 | A | 1/2000 | Piechowiak et al. |
| 6,012,983 | A | 1/2000 | Walker et al. |
| 6,015,346 | A | 1/2000 | Bennett |
| 6,024,640 | A | 2/2000 | Walker et al. |
| 6,030,288 | A | 2/2000 | Davis et al. |
| 6,039,648 | A | 3/2000 | Guinn et al. |
| 6,039,649 | A | 3/2000 | Schulze |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,068,552 | A | 5/2000 | Walker et al. |
| 6,068,553 | A | 5/2000 | Parker |
| 6,068,982 | A | 5/2000 | Rolfe et al. |
| 6,071,190 | A | 6/2000 | Weiss et al. |
| 6,077,162 | A | 6/2000 | Weiss |
| 6,080,062 | A | 6/2000 | Olson |
| 6,085,247 | A | 7/2000 | Parsons, Jr. et al. |
| 6,089,975 | A | 7/2000 | Dunn |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,089,982 | A | 7/2000 | Holch et al. |
| 6,099,408 | A | 8/2000 | Schneier et al. |
| 6,106,396 | A | 8/2000 | Alcorn et al. |
| 6,108,420 | A | 8/2000 | Larose et al. |
| 6,110,041 | A | 8/2000 | Walker et al. |
| 6,110,043 | A | 8/2000 | Olsen |
| 6,113,098 | A | 9/2000 | Adams |
| 6,113,495 | A | 9/2000 | Walker et al. |
| 6,117,013 | A | 9/2000 | Eiba |
| 6,135,884 | A | 10/2000 | Hedrick et al. |
| 6,135,887 | A | 10/2000 | Pease et al. |
| 6,141,737 | A | 10/2000 | Krantz et al. |
| 6,142,872 | A | 11/2000 | Walker et al. |
| 6,146,270 | A | 11/2000 | Huard et al. |
| 6,146,273 | A | 11/2000 | Olsen |
| 6,149,521 | A | 11/2000 | Sanduski |

| | | | |
|---|---|---|---|
| 6,149,522 | A | 11/2000 | Alcorn et al. |
| 6,151,707 | A | 11/2000 | Hecksel et al. |
| 6,152,823 | A | 11/2000 | Lacoste et al. |
| 6,155,925 | A | 12/2000 | Giobbi et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,167,523 | A | 12/2000 | Strong |
| 6,168,520 | B1 | 1/2001 | Baerlocher et al. |
| 6,183,366 | B1 | 2/2001 | Goldberg et al. |
| 6,186,894 | B1 | 2/2001 | Mayeroff |
| 6,190,255 | B1 | 2/2001 | Thomas et al. |
| 6,193,606 | B1 * | 2/2001 | Walker et al. .................. 463/20 |
| 6,203,010 | B1 | 3/2001 | Jorasch et al. |
| 6,203,430 | B1 | 3/2001 | Walker et al. |
| 6,206,374 | B1 | 3/2001 | Jones |
| 6,206,782 | B1 | 3/2001 | Walker et al. |
| 6,210,275 | B1 | 4/2001 | Olsen |
| 6,210,277 | B1 | 4/2001 | Stefan |
| 6,217,448 | B1 | 4/2001 | Olsen |
| 6,219,836 | B1 | 4/2001 | Wells et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,238,288 | B1 | 5/2001 | Walker et al. |
| 6,241,608 | B1 * | 6/2001 | Torango .......................... 463/27 |
| 6,244,958 | B1 | 6/2001 | Acres |
| 6,251,014 | B1 | 6/2001 | Stockdale et al. |
| 6,254,483 | B1 | 7/2001 | Acres |
| 6,257,981 | B1 | 7/2001 | Acres et al. |
| 6,264,557 | B1 | 7/2001 | Schneier et al. |
| 6,264,561 | B1 | 7/2001 | Saffari et al. |
| 6,270,409 | B1 | 8/2001 | Shuster |
| 6,287,194 | B1 | 9/2001 | Okada et al. |
| 6,287,200 | B1 | 9/2001 | Sharma |
| 6,287,202 | B1 | 9/2001 | Pascal et al. |
| 6,293,866 | B1 | 9/2001 | Walker et al. |
| RE37,414 | E | 10/2001 | Harlick |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,304,905 | B1 | 10/2001 | Clark |
| 6,308,271 | B2 | 10/2001 | Tanaka |
| 6,309,298 | B1 | 10/2001 | Gerow |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,332 | B1 | 11/2001 | Walker et al. |
| 6,312,333 | B1 | 11/2001 | Acres |
| 6,315,662 | B1 | 11/2001 | Jorasch et al. |
| 6,319,122 | B1 | 11/2001 | Packes, Jr. et al. |
| 6,319,125 | B1 | 11/2001 | Acres |
| 6,328,649 | B1 | 12/2001 | Randall et al. |
| 6,334,814 | B1 | 1/2002 | Adams |
| 6,336,857 | B1 | 1/2002 | McBride |
| 6,340,158 | B2 | 1/2002 | Pierce et al. |
| 6,345,386 | B1 | 2/2002 | Delo et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,353,928 | B1 | 3/2002 | Altberg et al. |
| 6,354,946 | B1 | 3/2002 | Finn |
| 6,358,147 | B1 | 3/2002 | Jaffe et al. |
| 6,358,149 | B1 | 3/2002 | Schneider et al. |
| 6,358,150 | B1 | 3/2002 | Mir et al. |
| 6,361,437 | B1 | 3/2002 | Walker et al. |
| 6,361,441 | B1 | 3/2002 | Walker et al. |
| 6,364,314 | B1 | 4/2002 | Canterbury |
| 6,364,766 | B1 | 4/2002 | Anderson et al. |
| 6,364,768 | B1 | 4/2002 | Acres et al. |
| 6,364,769 | B1 | 4/2002 | Weiss et al. |
| 6,368,216 | B1 | 4/2002 | Hedrick et al. |
| 6,371,852 | B1 | 4/2002 | Acres |
| 6,375,567 | B1 | 4/2002 | Acres |

6,375,568 B1 4/2002 Roffman et al.
6,375,569 B1 4/2002 Acres
6,383,074 B1 5/2002 Boggs
6,389,538 B1 5/2002 Gruse et al.
6,389,589 B1 5/2002 Mishra et al.
6,394,907 B1 5/2002 Rowe
6,397,381 B1 5/2002 Delo et al.
6,398,218 B1 6/2002 Vancura
6,402,614 B1 6/2002 Schneier et al.
6,406,369 B1 6/2002 Baerlocher et al.
6,409,602 B1 6/2002 Wiltshire et al.
6,416,408 B2 7/2002 Tracy et al.
6,416,409 B1 7/2002 Jordan
6,418,554 B1 7/2002 Delo et al.
6,419,579 B1 7/2002 Bennett
6,419,583 B1 7/2002 Crumby et al.
6,425,828 B2 7/2002 Walker et al.
6,427,227 B1 7/2002 Chamberlain
6,428,412 B1 8/2002 Anderson et al.
6,431,983 B2 8/2002 Acres
6,435,511 B1 8/2002 Vancura et al.
6,435,968 B1 8/2002 Torango
6,439,996 B2 8/2002 LeMay et al.
6,442,529 B1 8/2002 Krishan et al.
6,443,839 B2 9/2002 Stockdale et al.
6,450,887 B1 9/2002 Mir et al.
6,454,651 B1 9/2002 Yoseloff
6,457,175 B1 9/2002 Lerche
RE37,885 E 10/2002 Acres et al.
6,461,241 B1 10/2002 Webb et al.
6,471,208 B2 10/2002 Yoseloff et al.
6,481,713 B2 11/2002 Perrie et al.
6,488,585 B1 12/2002 Wells et al.
6,503,146 B2 1/2003 Walker et al.
6,503,147 B1 1/2003 Stockdale et al.
6,508,710 B1 1/2003 Paravia et al.
6,511,376 B2 1/2003 Walker et al.
6,523,166 B1 2/2003 Mishra et al.
6,527,638 B1 3/2003 Walker et al.
6,532,543 B1 3/2003 Smith et al.
6,533,664 B1 3/2003 Crumby
6,537,150 B1 3/2003 Luciano et al.
6,546,134 B1 4/2003 Shrairman et al.
6,546,374 B1 4/2003 Esposito et al.
6,547,131 B1 4/2003 Foodman et al.
6,554,705 B1 4/2003 Cumbers
6,561,904 B2 5/2003 Locke et al.
6,565,434 B1 5/2003 Acres
6,569,015 B1 5/2003 Baerlocher et al.
6,572,471 B1 6/2003 Bennett
6,575,832 B1 6/2003 Manfredi et al.
6,578,199 B1 6/2003 Tsou et al.
6,589,115 B2 7/2003 Walker et al.
6,592,457 B1 7/2003 Frohm et al.
6,592,460 B2 7/2003 Torango
6,595,853 B1 7/2003 Osawa
6,595,856 B1 7/2003 Ginsburg et al.
6,599,185 B1 7/2003 Kaminkow et al.
6,599,190 B2 7/2003 Osawa
6,599,193 B2 7/2003 Baerlocher et al.
6,607,438 B2 8/2003 Baerlocher et al.
6,607,439 B2 8/2003 Schneier et al.
6,607,441 B1 8/2003 Acres
6,609,973 B1 8/2003 Weiss
6,609,978 B1 8/2003 Paulsen
6,620,046 B2 9/2003 Rowe
6,620,047 B1 9/2003 Alcorn et al.
6,626,758 B1 9/2003 Parham et al.
6,628,939 B2 9/2003 Paulsen
6,634,944 B2 10/2003 Osawa
6,637,747 B1 10/2003 Garrod
6,638,170 B1 10/2003 Crumby
6,645,074 B2 11/2003 Thomas et al.
6,645,077 B2 11/2003 Rowe
6,648,759 B2 11/2003 Vancura
6,648,762 B2 11/2003 Walker et al.
6,656,047 B1 12/2003 Tarantino et al.
6,656,048 B2 12/2003 Olsen
6,656,052 B2 12/2003 Abramopoulos et al.
6,672,959 B2 1/2004 Moody et al.
6,675,152 B1 1/2004 Prasad et al.
6,682,419 B2 1/2004 Webb et al.
6,682,420 B2 1/2004 Webb et al.
6,682,421 B1 1/2004 Rowe et al.
6,682,423 B2 1/2004 Brosnan et al.
6,685,567 B2 2/2004 Cockerille et al.
6,692,355 B2 2/2004 Baerlocher et al.
6,702,674 B1 3/2004 De Bruin et al.
6,712,695 B2 3/2004 Mothwurf et al.
6,712,697 B2 3/2004 Acres
6,712,699 B2 3/2004 Walker et al.
6,712,702 B2 3/2004 Goldberg et al.
6,719,630 B1 4/2004 Seelig et al.
6,722,986 B1 4/2004 Lyons et al.
6,733,389 B2 5/2004 Webb et al.
6,733,390 B2 5/2004 Walker et al.
6,746,327 B2 6/2004 Frohm et al.
6,746,328 B2 6/2004 Cannon et al.
6,749,510 B2 6/2004 Giobbi
6,754,346 B2 6/2004 Eiserling et al.
6,755,741 B1 6/2004 Rafaeli
6,761,632 B2 7/2004 Nolz et al.
6,776,714 B2 8/2004 Ungaro et al.
6,776,715 B2 8/2004 Price
6,780,111 B2 8/2004 Cannon et al.
6,782,477 B2 8/2004 McCarroll
6,786,819 B2 9/2004 Baerlocher et al.
6,790,141 B2 9/2004 Muir
6,790,142 B2 9/2004 Okada et al.
6,790,143 B2 9/2004 Crumby
6,793,578 B2 9/2004 Baerlocher et al.
6,800,030 B2 10/2004 Acres
6,802,778 B1 10/2004 Lemay et al.
6,804,763 B1 10/2004 Stockdale et al.
6,805,352 B2 10/2004 Hunter
6,805,634 B1 10/2004 Wells et al.
6,811,483 B1 11/2004 Webb et al.
6,811,488 B2 11/2004 Paravia et al.
6,813,765 B1 11/2004 Flores
6,816,882 B1 11/2004 Conner et al.
6,823,456 B1 11/2004 Dan et al.
6,830,515 B2 12/2004 Rowe
6,832,956 B1 12/2004 Boyd et al.
6,832,958 B2 12/2004 Acres et al.
6,834,245 B2 12/2004 Ota et al.
6,836,794 B1 12/2004 Lucovsky et al.
6,837,788 B2 1/2005 Cannon
6,843,723 B2 1/2005 Joshi
6,843,725 B2 1/2005 Nelson
6,846,238 B2 1/2005 Wells
6,852,031 B1 2/2005 Rowe
6,855,054 B2 2/2005 White et al.
6,855,057 B2 2/2005 Namba et al.
6,857,958 B2 2/2005 Osawa
6,857,959 B1 2/2005 Nguyen
6,863,608 B1 3/2005 LeMay et al.
6,866,581 B2 3/2005 Martinek et al.
6,866,584 B2 3/2005 Michaelson
6,866,586 B2 3/2005 Oberberger et al.
6,869,361 B2 3/2005 Sharpless et al.
6,875,109 B2 4/2005 Stockdale
6,875,110 B1 4/2005 Crumby
6,878,063 B2 4/2005 Manfredi et al.
6,884,162 B2 4/2005 Raverdy et al.
6,884,166 B2 4/2005 Leen et al.
6,884,170 B2 4/2005 Rowe
6,884,171 B2 4/2005 Eck et al.
6,884,173 B2 4/2005 Gauselmann
6,884,174 B2 4/2005 Lundy et al.
6,887,151 B2 5/2005 Leen et al.
6,887,154 B1 5/2005 Luciano, Jr. et al.
6,887,156 B2 5/2005 DeWeese et al.
6,889,159 B2 5/2005 Klotz et al.
6,889,849 B2 5/2005 Heidel et al.
6,890,256 B2 5/2005 Walker et al.
6,896,616 B2 5/2005 Weiss
6,896,618 B2 5/2005 Benoy et al.
6,899,625 B2 5/2005 Luciano, Jr. et al.

6,899,627 B2 5/2005 Lam et al.
6,899,628 B2 5/2005 Leen et al.
6,901,375 B2 5/2005 Fernandez
6,902,481 B2 6/2005 Breckner et al.
6,908,387 B2 6/2005 Hedrick et al.
6,908,391 B2 6/2005 Gatto et al.
6,910,964 B2 6/2005 Acres
6,910,965 B2 6/2005 Downes
6,918,832 B2 7/2005 Baerlocher et al.
6,918,834 B2 7/2005 Vancura
6,932,707 B2 8/2005 Duhamel
6,935,951 B2 8/2005 Paulsen et al.
6,935,958 B2 8/2005 Nelson
6,939,234 B2 9/2005 Beatty
6,942,571 B1 9/2005 McAllister et al.
6,945,870 B2 9/2005 Gatto et al.
RE38,812 E 10/2005 Acres et al.
6,966,834 B1 11/2005 Johnson
6,981,917 B2 1/2006 Webb et al.
6,984,173 B1 1/2006 Piechowiak et al.
6,991,544 B2 1/2006 Soltys et al.
7,051,004 B2 5/2006 Nuttall et al.
7,056,215 B1 6/2006 Olive
7,097,562 B2 8/2006 Gagner
7,156,741 B2 1/2007 Hornik et al.
7,481,430 B1 * 1/2009 Jackson et al. ............. 273/138.1
2001/0024971 A1 9/2001 Brossard
2001/0036857 A1 11/2001 Mothwurf et al.
2001/0044337 A1 11/2001 Rowe et al.
2001/0046893 A1 11/2001 Giobbi et al.
2001/0049303 A1 12/2001 Found
2001/0055990 A1 12/2001 Acres
2002/0002674 A1 1/2002 Grimes et al.
2002/0032049 A1 3/2002 Walker et al.
2002/0045484 A1 4/2002 Eck et al.
2002/0057800 A1 5/2002 Gordon et al.
2002/0058546 A2 5/2002 Acres
2002/0068629 A1 6/2002 Allen et al.
2002/0068631 A1 6/2002 Raverdy et al.
2002/0071557 A1 6/2002 Nguyen
2002/0071560 A1 6/2002 Kurn et al.
2002/0080969 A1 6/2002 Giobbi
2002/0116615 A1 8/2002 Nguyen et al.
2002/0137217 A1 9/2002 Rowe
2002/0138594 A1 9/2002 Rowe
2002/0144116 A1 10/2002 Giobbi
2002/0151360 A1 10/2002 Durham et al.
2002/0152120 A1 10/2002 Howington
2002/0160826 A1 10/2002 Gomez et al.
2002/0165023 A1 11/2002 Brosnan et al.
2002/0169022 A1 11/2002 Canterbury
2002/0173355 A1 11/2002 Walker et al.
2002/0174160 A1 11/2002 Gatto et al.
2002/0174444 A1 11/2002 Gatto et al.
2002/0177483 A1 11/2002 Cannon
2002/0187834 A1 12/2002 Rowe et al.
2002/0188940 A1 12/2002 Breckner et al.
2003/0027625 A1 2/2003 Rowe
2003/0027630 A1 2/2003 Kelly et al.
2003/0027638 A1 2/2003 Schneider et al.
2003/0032479 A1 2/2003 LeMay et al.
2003/0045350 A1 3/2003 Baerlocher et al.
2003/0045351 A1 3/2003 Gauselmann
2003/0045353 A1 3/2003 Paulsen et al.
2003/0045354 A1 3/2003 Giobbi
2003/0050111 A1 3/2003 Saffari
2003/0054878 A1 3/2003 Benoy et al.
2003/0054879 A1 3/2003 Schneier et al.
2003/0060266 A1 3/2003 Baerlocher
2003/0060269 A1 3/2003 Paulsen et al.
2003/0060279 A1 3/2003 Torango
2003/0060286 A1 3/2003 Walker et al.
2003/0064771 A1 4/2003 Morrow et al.
2003/0064807 A1 4/2003 Walker et al.
2003/0069058 A1 4/2003 Byrne et al.
2003/0073497 A1 4/2003 Nelson
2003/0078094 A1 4/2003 Gatto et al.
2003/0078101 A1 4/2003 Schneider et al.
2003/0083943 A1 5/2003 Adams et al.
2003/0092484 A1 5/2003 Schneider et al.
2003/0092489 A1 5/2003 Veradej
2003/0093669 A1 5/2003 Morais et al.
2003/0100359 A1 5/2003 Loose et al.
2003/0100361 A1 5/2003 Sharpless et al.
2003/0100369 A1 5/2003 Gatto et al.
2003/0100370 A1 5/2003 Gatto et al.
2003/0100371 A1 5/2003 Gatto et al.
2003/0100372 A1 5/2003 Gatto et al.
2003/0115351 A1 6/2003 Giobbi
2003/0140134 A1 7/2003 Swanson et al.
2003/0144965 A1 7/2003 Prasad et al.
2003/0148808 A1 8/2003 Price
2003/0162589 A1 8/2003 Nguyen et al.
2003/0171149 A1 9/2003 Rothschild
2003/0176219 A1 9/2003 Manfredi et al.
2003/0181231 A1 9/2003 Vancura et al.
2003/0182574 A1 9/2003 Whitten et al.
2003/0188306 A1 10/2003 Harris et al.
2003/0190941 A1 10/2003 Byrne
2003/0195033 A1 10/2003 Gazdic et al.
2003/0199321 A1 10/2003 Williams
2003/0211879 A1 11/2003 Englman
2003/0216182 A1 11/2003 Gauselmann
2003/0222402 A1 12/2003 Olive
2003/0223803 A1 12/2003 De Schrijver
2003/0224852 A1 12/2003 Walker et al.
2003/0228904 A1 12/2003 Acres et al.
2003/0228907 A1 12/2003 Gatto et al.
2003/0228912 A1 12/2003 Wells et al.
2003/0232647 A1 12/2003 Moser
2003/0232650 A1 12/2003 Beatty
2004/0002381 A1 1/2004 Alcorn et al.
2004/0002385 A1 1/2004 Nguyen
2004/0003389 A1 1/2004 Reynar et al.
2004/0005919 A1 1/2004 Walker et al.
2004/0009811 A1 1/2004 Torango
2004/0010700 A1 1/2004 Mont
2004/0015423 A1 1/2004 Walker et al.
2004/0023721 A1 2/2004 Giobbi
2004/0024666 A1 2/2004 Walker et al.
2004/0029635 A1 2/2004 Giobbi
2004/0038723 A1 2/2004 Schneier et al.
2004/0048660 A1 3/2004 Gentles et al.
2004/0048667 A1 3/2004 Rowe
2004/0053664 A1 3/2004 Byrne
2004/0054952 A1 3/2004 Morrow et al.
2004/0063489 A1 4/2004 Crumby
2004/0072604 A1 4/2004 Toyoda
2004/0072608 A1 4/2004 Toyoda
2004/0072615 A1 4/2004 Maya et al.
2004/0082385 A1 4/2004 Silva et al.
2004/0087368 A1 5/2004 Gauselmann
2004/0092310 A1 5/2004 Brosnan et al.
2004/0098597 A1 5/2004 Giobbi
2004/0106452 A1 6/2004 Nguyen et al.
2004/0124243 A1 7/2004 Gatto et al.
2004/0127279 A1 7/2004 Gatto et al.
2004/0132532 A1 7/2004 Brosnan et al.
2004/0133485 A1 7/2004 Schoonmaker et al.
2004/0142739 A1 7/2004 Loose et al.
2004/0142742 A1 7/2004 Schneider et al.
2004/0152509 A1 8/2004 Hornik et al.
2004/0152511 A1 * 8/2004 Nicely et al. .................... 463/27
2004/0162144 A1 8/2004 Loose et al.
2004/0166923 A1 8/2004 Michaelson et al.
2004/0166940 A1 8/2004 Rothschild
2004/0166942 A1 8/2004 Muir
2004/0176162 A1 9/2004 Rothschild
2004/0176167 A1 9/2004 Michaelson et al.
2004/0179701 A1 9/2004 Boyd
2004/0180721 A1 9/2004 Rowe
2004/0180722 A1 9/2004 Giobbi
2004/0185936 A1 9/2004 Block et al.
2004/0193726 A1 9/2004 Gatto et al.
2004/0198494 A1 10/2004 Nguyen et al.
2004/0198496 A1 10/2004 Gatto et al.
2004/0204244 A1 10/2004 Rathsack et al.
2004/0214622 A1 10/2004 Atkinson

| | | | | |
|---|---|---|---|---|
| 2004/0214627 | A1 | 10/2004 | Jordan et al. | |
| 2004/0214640 | A1 | 10/2004 | Giobbi | |
| 2004/0214641 | A1 | 10/2004 | Giobbi | |
| 2004/0215756 | A1 | 10/2004 | VanAntwerp et al. | |
| 2004/0219962 | A1 | 11/2004 | Vancura | |
| 2004/0219967 | A1 | 11/2004 | Giobbi et al. | |
| 2004/0219983 | A1 | 11/2004 | Giobbi | |
| 2004/0224770 | A1 | 11/2004 | Wolf et al. | |
| 2004/0229684 | A1 | 11/2004 | Blackburn et al. | |
| 2004/0229698 | A1 | 11/2004 | Lind et al. | |
| 2004/0229699 | A1 | 11/2004 | Gentles et al. | |
| 2004/0235559 | A1 | 11/2004 | Brosnan et al. | |
| 2004/0235563 | A1 | 11/2004 | Blackburn et al. | |
| 2004/0242297 | A1 | 12/2004 | Walker | |
| 2004/0242298 | A1 | 12/2004 | Inamura et al. | |
| 2004/0242328 | A1 | 12/2004 | Blackburn et al. | |
| 2004/0242329 | A1 | 12/2004 | Blackburn et al. | |
| 2004/0242330 | A1 | 12/2004 | Blackburn et al. | |
| 2004/0242331 | A1 | 12/2004 | Blackburn et al. | |
| 2004/0243848 | A1 | 12/2004 | Blackburn et al. | |
| 2004/0243849 | A1 | 12/2004 | Blackburn et al. | |
| 2004/0248642 | A1 | 12/2004 | Rothschild | |
| 2004/0248645 | A1 | 12/2004 | Blackburn et al. | |
| 2004/0248646 | A1 | 12/2004 | Canterbury | |
| 2004/0248651 | A1 | 12/2004 | Gagner | |
| 2004/0254006 | A1 | 12/2004 | Lam et al. | |
| 2004/0254013 | A1 | 12/2004 | Quraishi et al. | |
| 2004/0254014 | A1 | 12/2004 | Quraishi et al. | |
| 2004/0254954 | A1 | 12/2004 | Gatto et al. | |
| 2004/0255139 | A1 | 12/2004 | Giobbi | |
| 2004/0259629 | A1 | 12/2004 | Michaelson et al. | |
| 2004/0259633 | A1 | 12/2004 | Gentles et al. | |
| 2004/0259640 | A1 | 12/2004 | Gentles et al. | |
| 2004/0259643 | A1 | 12/2004 | Gentles | |
| 2004/0266532 | A1 | 12/2004 | Blackburn et al. | |
| 2004/0266533 | A1 | 12/2004 | Gentles et al. | |
| 2005/0003886 | A1 | 1/2005 | Englman et al. | |
| 2005/0009599 | A1 | 1/2005 | Ryan | |
| 2005/0009601 | A1 | 1/2005 | Manfredi et al. | |
| 2005/0009607 | A1 | 1/2005 | Russell et al. | |
| 2005/0010738 | A1 | 1/2005 | Stockdale et al. | |
| 2005/0012818 | A1 | 1/2005 | Kiely et al. | |
| 2005/0014559 | A1 | 1/2005 | Mattice et al. | |
| 2005/0026694 | A1 | 2/2005 | Kelly et al. | |
| 2005/0032573 | A1 | 2/2005 | Acres et al. | |
| 2005/0032577 | A1 | 2/2005 | Blackburn et al. | |
| 2005/0037708 | A1 | 2/2005 | Torvinen | |
| 2005/0043072 | A1 | 2/2005 | Nelson | |
| 2005/0043088 | A1 | 2/2005 | Nguyen et al. | |
| 2005/0043090 | A1 | 2/2005 | Pryzby et al. | |
| 2005/0043094 | A1 | 2/2005 | Nguyen et al. | |
| 2005/0044535 | A1 | 2/2005 | Coppert | |
| 2005/0049037 | A1 | 3/2005 | Anderson et al. | |
| 2005/0054430 | A1 | 3/2005 | Pitman et al. | |
| 2005/0054431 | A1 | 3/2005 | Walker et al. | |
| 2005/0054438 | A1 | 3/2005 | Rothschild et al. | |
| 2005/0054445 | A1 | 3/2005 | Gatto et al. | |
| 2005/0054447 | A1 | 3/2005 | Hiroyama et al. | |
| 2005/0054448 | A1 | 3/2005 | Frerking et al. | |
| 2005/0059457 | A1 | 3/2005 | Rothschild et al. | |
| 2005/0059467 | A1 | 3/2005 | Saffari et al. | |
| 2005/0059493 | A1 | 3/2005 | Tyson et al. | |
| 2005/0059494 | A1 | 3/2005 | Kammler | |
| 2005/0064939 | A1 | 3/2005 | McSheffrey et al. | |
| 2005/0070353 | A1 | 3/2005 | Webb et al. | |
| 2005/0070356 | A1 | 3/2005 | Mothwurf | |
| 2005/0075983 | A1 | 4/2005 | St. Denis | |
| 2005/0079908 | A1 | 4/2005 | Pacey | |
| 2005/0079911 | A1 | 4/2005 | Nakatsu | |
| 2005/0081623 | A1 | 4/2005 | Frank | |
| 2005/0086286 | A1 | 4/2005 | Gatto et al. | |
| 2005/0086478 | A1 | 4/2005 | Peinado et al. | |
| 2005/0090313 | A1 | 4/2005 | Rowe | |
| 2005/0096114 | A1 | 5/2005 | Cannon et al. | |
| 2005/0096125 | A1 | 5/2005 | LeMay et al. | |
| 2005/0096130 | A1 * | 5/2005 | Mullins | 463/27 |
| 2005/0096133 | A1 | 5/2005 | Hoefelmeyer et al. | |
| 2005/0097342 | A1 | 5/2005 | Gatto et al. | |
| 2005/0101370 | A1 | 5/2005 | Lind et al. | |
| 2005/0101374 | A1 | 5/2005 | Acres | |
| 2005/0101375 | A1 | 5/2005 | Webb et al. | |
| 2005/0101384 | A1 | 5/2005 | Parham | |
| 2005/0113172 | A1 | 5/2005 | Gong | |
| 2005/0114272 | A1 | 5/2005 | Herrmann et al. | |
| 2005/0119045 | A1 | 6/2005 | Fujimoto | |
| 2005/0119046 | A1 | 6/2005 | Fujimoto | |
| 2005/0119047 | A1 | 6/2005 | Olive | |
| 2005/0137012 | A1 | 6/2005 | Michaelson | |
| 2005/0143168 | A1 | 6/2005 | Torango | |
| 2005/0143169 | A1 | 6/2005 | Nguyen et al. | |
| 2005/0148385 | A1 | 7/2005 | Michaelson | |
| 2005/0159211 | A1 | 7/2005 | Englman | |
| 2005/0163377 | A1 | 7/2005 | Walch | |
| 2005/0176488 | A1 | 8/2005 | Olive | |
| 2005/0178716 | A1 | 8/2005 | Suri | |
| 2005/0192083 | A1 | 9/2005 | Iwamoto | |
| 2005/0192099 | A1 | 9/2005 | Nguyen et al. | |
| 2005/0209004 | A1 | 9/2005 | Torango | |
| 2005/0215314 | A1 * | 9/2005 | Schneider et al. | 463/26 |
| 2005/0239542 | A1 | 10/2005 | Olsen | |
| 2005/0261060 | A1 | 11/2005 | Nguyen et al. | |
| 2005/0261061 | A1 | 11/2005 | Nguyen et al. | |
| 2005/0267610 | A1 | 12/2005 | Shinoda | |
| 2005/0282626 | A1 | 12/2005 | Manfredi et al. | |
| 2005/0282629 | A1 | 12/2005 | Gagner | |
| 2005/0282638 | A1 | 12/2005 | Rowe | |
| 2006/0003829 | A1 | 1/2006 | Thomas | |
| 2006/0009273 | A2 | 1/2006 | Moshal | |
| 2006/0009285 | A1 | 1/2006 | Pryzby et al. | |
| 2006/0019747 | A1 | 1/2006 | Loose et al. | |
| 2006/0025210 | A1 | 2/2006 | Johnson | |
| 2006/0026604 | A1 | 2/2006 | Tan et al. | |
| 2006/0030397 | A1 | 2/2006 | Chan | |
| 2006/0030403 | A1 | 2/2006 | Lafky et al. | |
| 2006/0030409 | A1 | 2/2006 | Lechner et al. | |
| 2006/0031829 | A1 | 2/2006 | Harris et al. | |
| 2006/0035694 | A1 | 2/2006 | Fuller | |
| 2006/0035705 | A1 | 2/2006 | Jordan et al. | |
| 2006/0035706 | A1 | 2/2006 | Thomas et al. | |
| 2006/0036552 | A1 | 2/2006 | Gunyakti et al. | |
| 2006/0036573 | A1 | 2/2006 | Watanabe et al. | |
| 2006/0039132 | A1 | 2/2006 | Chen | |
| 2006/0040732 | A1 | 2/2006 | Baerlocher et al. | |
| 2006/0052159 | A1 | 3/2006 | Cahill et al. | |
| 2006/0052161 | A1 | 3/2006 | Soukup et al. | |
| 2006/0052162 | A1 | 3/2006 | Soukup et al. | |
| 2006/0068897 | A1 | 3/2006 | Sanford et al. | |
| 2006/0073882 | A1 | 4/2006 | Rozkin et al. | |
| 2006/0073887 | A1 | 4/2006 | Nguyen et al. | |
| 2006/0073889 | A1 | 4/2006 | Edidin et al. | |
| 2006/0073897 | A1 | 4/2006 | Englman et al. | |
| 2006/0084502 | A1 | 4/2006 | Downs et al. | |
| 2006/0094508 | A1 | 5/2006 | D'Amico et al. | |
| 2006/0135255 | A1 | 6/2006 | Roth | |
| 2006/0154718 | A1 | 7/2006 | Willyard et al. | |
| 2006/0160620 | A1 | 7/2006 | Matthews et al. | |
| 2006/0183537 | A1 | 8/2006 | Dickerson | |
| 2006/0183538 | A1 | 8/2006 | Michaelson et al. | |
| 2006/0194633 | A1 | 8/2006 | Paulsen | |
| 2006/0229122 | A1 | 10/2006 | Macke et al. | |
| 2006/0252546 | A1 | 11/2006 | Castellari et al. | |
| 2006/0287077 | A1 | 12/2006 | Grav et al. | |
| 2006/0287107 | A1 | 12/2006 | Okada | |
| 2007/0111786 | A1 | 5/2007 | Snow | |

FOREIGN PATENT DOCUMENTS

| | | |
|---|---|---|
| AU | 198166683 | 8/1981 |
| AU | 524709 | 9/1982 |
| AU | 542455 | 2/1985 |
| AU | 555905 | 10/1986 |
| AU | 567001 | 11/1987 |
| AU | 585160 | 6/1989 |
| AU | 589158 | 10/1989 |
| AU | 593059 | 2/1990 |
| AU | 630112 | 3/1990 |
| AU | 628330 | 9/1992 |
| AU | 633469 | 1/1993 |
| AU | 667210 | 2/1993 |

| | | |
|---|---|---|
| AU | 680920 | 2/1994 |
| AU | 649009 | 5/1994 |
| AU | 656302 | 8/1994 |
| AU | 655801 | 1/1995 |
| AU | 1996 70247 | 4/1997 |
| AU | 704365 | 6/1997 |
| AU | 704372 | 6/1997 |
| AU | PO 7780 | 7/1997 |
| AU | 680920 | 8/1997 |
| AU | PO 9090 | 9/1997 |
| AU | 1996 50327 | 10/1997 |
| AU | 690499 | 1/1998 |
| AU | 199662115 | 2/1998 |
| AU | 722902 | 6/1998 |
| AU | 680602 | 7/1998 |
| AU | 199743615 | 7/1998 |
| AU | 755826 | 8/1998 |
| AU | 733963 | 9/1998 |
| AU | 1998 63553 | 10/1998 |
| AU | 743079 | 11/1998 |
| AU | 738686 | 3/1999 |
| AU | 199884162 | 3/1999 |
| AU | 736679 | 5/1999 |
| AU | 707687 | 7/1999 |
| AU | 714299 | 8/1999 |
| AU | 709724 | 9/1999 |
| AU | 768285 | 9/1999 |
| AU | 199917318 | 9/1999 |
| AU | 711501 | 10/1999 |
| AU | 746082 | 10/1999 |
| AU | 756180 | 10/1999 |
| AU | 753102 | 11/1999 |
| AU | 765084 | 11/1999 |
| AU | 760617 | 1/2000 |
| AU | 716299 | 2/2000 |
| AU | 721968 | 7/2000 |
| AU | 722107 | 7/2000 |
| AU | 728788 | 1/2001 |
| AU | 744569 | 3/2001 |
| AU | 771847 | 3/2001 |
| AU | 2001 1000032 | 11/2001 |
| AU | 2001 1000033 | 11/2001 |
| AU | 748263 | 5/2002 |
| AU | 749222 | 6/2002 |
| AU | 754689 | 11/2002 |
| AU | 758306 | 3/2003 |
| AU | 1999 43453 | 4/2003 |
| DE | 3415114 | 11/1985 |
| DE | 3917683 | 12/1990 |
| DE | 4200254 | 8/1993 |
| EP | 0 342 797 | 11/1989 |
| EP | 0 444 932 | 2/1991 |
| EP | 0 420 586 | 4/1991 |
| EP | 0 433 420 | 1/1995 |
| EP | 0 798 676 | 10/1997 |
| EP | 0 843 272 | 5/1998 |
| EP | 0 874 337 | 10/1998 |
| EP | 0 952 563 | 2/1999 |
| EP | 0 926 645 | 6/1999 |
| EP | 0 944 030 | 9/1999 |
| EP | 1 004 970 | 5/2000 |
| EP | 1 199 690 | 2/2004 |
| EP | 1 637 196 | 9/2004 |
| EP | 1 467 329 | 10/2004 |
| EP | 0 813 132 | 1/2005 |
| EP | 1 498 860 | 1/2005 |
| EP | 1 378 873 | 3/2005 |
| EP | 1 513 114 | 3/2005 |
| EP | 1 238 688 | 5/2005 |
| EP | 1 378 874 | 5/2005 |
| EP | 1 471 710 | 5/2005 |
| EP | 1 528 516 | 5/2005 |
| EP | 1 528 517 | 5/2005 |
| EP | 1 291 048 | 6/2005 |
| GB | 2 098 778 | 11/1982 |
| GB | 2 151 054 | 10/1983 |
| GB | 2118445 | 11/1983 |
| GB | 2 142 457 | 6/1984 |
| GB | 2 137 392 | 10/1984 |
| GB | 2 139 390 | 11/1984 |
| GB | 2 147 773 | 5/1985 |
| GB | 2 148 135 | 5/1985 |
| GB | 1 151 054 | 7/1985 |
| GB | 2 153 572 | 8/1985 |
| GB | 2231189 | 11/1990 |
| GB | 2 282 690 | 4/1995 |
| GB | 2 328 311 | 2/1999 |
| GB | 2 387 703 | 10/2003 |
| JP | 7 148 307 | 6/1995 |
| WO | WO 94 12256 | 6/1994 |
| WO | WO 95 22811 | 8/1995 |
| WO | WO 95 30944 | 11/1995 |
| WO | WO 96 12262 | 4/1996 |
| WO | WO 96 24421 | 8/1996 |
| WO | WO 97 12338 | 4/1997 |
| WO | WO 97 27568 | 7/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 99 41718 | 8/1999 |
| WO | WO 99 60498 | 11/1999 |
| WO | WO 99 65579 | 12/1999 |
| WO | WO 00 12186 | 3/2000 |
| WO | WO 00 25281 | 5/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 01 61437 | 8/2001 |
| WO | WO 03 45515 | 6/2003 |
| WO | WO 03 45516 | 6/2003 |
| WO | WO 03 063019 | 7/2003 |
| WO | WO 03 075235 | 9/2003 |
| WO | WO 2004 004855 | 1/2004 |
| WO | WO 2004 035161 | 4/2004 |
| WO | WO 2004 066061 | 8/2004 |
| WO | WO 2004 103495 | 12/2004 |
| WO | WO 2005 027058 | 3/2005 |
| WO | WO 2005 028056 | 3/2005 |
| WO | WO 2005 029220 | 3/2005 |
| WO | WO 2005 033825 | 4/2005 |
| WO | WO 2005 033826 | 4/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2005 120672 | 12/2005 |
| WO | WO 2006 014770 | 2/2006 |
| WO | WO 2006 014833 | 2/2006 |
| WO | WO 2006 014990 | 2/2006 |
| WO | WO 2006 039366 | 4/2006 |

OTHER PUBLICATIONS

Aristrocrat Brochure, written by Aristocrat Gaming, published in 2004.

Aristrocrat Buyer's Guide with ACES Ad, 2pp. (Mar.-May 1989).

Atronic Systems Progressive Products at G2E, published by Atronic in 2004, printed from ForRelease.com.

Auction Fever Advertisement, written by Sierra Design Group, available prior to 2004.

Bally Live-Server Based Gaming brochure, written by Bally Gaming Systems, published in 2006.

Bally Slot Machines Electro-Mechanicals 1964-1980 Book [In Part], Revised 3rd Edition written by Marshall Fey.

Believe it or Not Article, written by Strictly Slots, published in 2001.

Bingo Advertisement and Jackpot Bingo Advertisements, written by Casino Data Systems, published in 1998 and 2001.

Bonus Spin Diamond Fives Advertisement, written by IGT, published in 1999.

Bonus Times Article, written by Strictly Slots, published in Jul. 2000.

Bonusing Solutions without Limits brochure, written by Bally Gaming Systems, published in 2005.

Boom Advertisement, written by WMS Gaming, Inc., published in 1998.
Cartoon Jackpots description, printed from www.ballvgamino.com/home.asp, on Feb. 4, 2005.
Cash Box Advertisement, written by Anchor Games, published in 2000.
Cash Express Advertisements, written by Aristocrat, published in 2002.
Catalogue of Champions Advertisement, written by Aristocrat, published in 1990.
Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1991.
Double Spin Five Times Pay Advertisement, written by IGT, published prior to 2000.
Excerpt from Local Area Electronic Gaming Machine Communications Protocol, QCOM Version 1.5, by Queensland Treasury Office of Gaming Regulation printed Feb. 26, 1998.
Fast Buck Systems Manual, written by International Game Technology, available to Mirage shift supervisors at least as early as May 30, 1990.
Federal Court of Australia, Jupiter's Ltd v. Neurizon Pty Ltd [2005] FCAFC 90 (including description of Activadata gaming system), dated May 26, 2005.
Federal Court of Australia, *Neurizon Pty Ltd* v. *Jupiter's Ltd* [2004] FCA 1012 (including description of Activdata gaming system), dated Oct. 21, 2004.
Federal Court of Australia, *Neurizon Pty Ltd.* v. *LTH Consulting and Marketing Services Pty. Ltd.* [2002] FCA 1547 (including description of Mega Gold System), dated Dec. 13, 2002.
Full House Advertisement, written by Anchor Games, published in 2000.
Gold Fever Advertisement and Game Description written Casino Data System, published in 1997.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
Jackpot Carnival Hyperlink Advertisement, written by Aristocrat, published prior to 2002.
Jewel in the Crown Advertisement, written by IGT, published in 2000.
Lemons, Cherries and Bell-Fruit-Gum, pp. 1 to 4 and 304 to 314, written by Bueschel, published in Royal Bell Books in Nov. 1995.
Mega Multiplier®, printed from www.wmsgaming.com, on May 22, 2001.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.
Money Time advertisement, written by Mikohn Gaming, published in 1999.
M-Slot Series Primary Reel Product description from Lemons, Cherries and Bell-Fruit-Gum, written by Richard M. Bueschel, published in 1995.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Plaintiff Torango's Supplemental Response to Defendant Aristocrat Technologies, Inc's First Set of Interrogatories.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
SB Products—The Next Big Innovation, printed from www.igt.com in Aug. 2006.
Server Based: Other Possibilities Article; published by www.casinocenter.com in May 2006.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines a Pictorial History of the First 100 Years (pp. 216, 242 to 243), 5th edition, written by Marshall Fey, published in 1983-1997.
Super Cherry Advertisement, written by IGT, published in 2001.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
Take Your Pick Article, written by Strictly Slots, published in Mar. 2001.
Transferring Gaming brochure, written by Cyberview Technology, published in 2006.
Vision Series Good Times Advertisement, written by IGT, published in 1999.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.
Written Opinion for PCT/US2006/034892 mailed on May 14, 2009.
Office Action dated Dec. 17, 2008 for U.S. Appl. No. 11/470,223.
Office Action dated Dec. 16, 2008 for U.S. Appl. No. 11/830,031.
Office Action dated Dec. 18, 2008 for U.S. Appl. No. 11/830,034.

* cited by examiner

FIG. 4

| Progressive Module | Maintained Progressive Award(s) |
|---|---|
| Progressive Module #1 | $105; $317 |
| Progressive Module #2 | $110,459 |
| Progressive Module #3 | $39; $121; $4,103 |

FIG. 5

16,18

| Supplemental Progressive Award | Amount of Supplemental Progressive Award | Minimum Side Bet Required to be Eligible for a Chance to Win the Supplemental Progressive Award |
|---|---|---|
| Poker Supplemental Progressive Award #1 | $1,414 | $1.00 |
| Poker Supplemental Progressive Award #2 | $645 | $0.50 |
| Black Jack Supplemental Progressive Award | $81 | $0.10 |
| Keno Supplemental Progressive Award | $15,487 | $1.00 |
| Slots Supplemental Progressive Award #1 | $798 | $0.50 |
| Slots Supplemental Progressive Award #2 | $6,654 | $1.00 |
| Slots Supplemental Progressive Award #3 | $89,218 | $2.00 |

SERVER BASED GAMING SYSTEM HAVING MULTIPLE PROGRESSIVE AWARDS

PRIORITY CLAIM

This application is a non-provisional patent application that claims priority to and the benefit of U.S. Provisional Patent Application Ser. No. 60/715,526, filed on Sep. 9, 2005, and U.S. Provisional Patent Application Ser. No. 60/745,947, filed on Apr. 28, 2006, the entire contents of which are incorporated herein.

CROSS-REFERENCE TO RELATED APPLICATIONS

This application relates to the following co-pending commonly owned patent applications: "SERVER BASED GAMING SYSTEM HAVING MULTIPLE PROGRESSIVE AWARDS," Ser. No. 11/470,228; "SERVER BASED GAMING SYSTEM HAVING MULTIPLE PROGRESSIVE AWARDS," Ser. No. 11/470,226; "SERVER BASED GAMING SYSTEM HAVING MULTIPLE PROGRESSIVE AWARDS," Ser. No. 11/470,223; "SERVER BASED GAMING SYSTEM HAVING MULTIPLE PROGRESSIVE AWARDS," Ser. No. 11/830,049; "SERVER BASED GAMING SYSTEM HAVING MULTIPLE PROGRESSIVE AWARDS," Ser. No. 11/830,034; "SERVER BASED GAMING SYSTEM HAVING MULTIPLE PROGRESSIVE AWARDS," Ser. No. 11/830,062 and "SERVER BASED GAMING SYSTEM HAVING MULTIPLE PROGRESSIVE AWARDS," Ser. No. 11/830,031.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (i.e., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game enables the player to make a wager on each payline in a single play of the primary game. Slot games with 1, 3, 5, 9, 15 and 25 lines are widely commercially available. Thus, it is known that a gaming machine, such as a slot game, enables players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. It should be appreciated that different players play at substantially different wagering amounts or levels and at substantially different rates of play.

Secondary or bonus games are also known in gaming machines. These secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game of the gaming machine. For instance, a bonus symbol occurring on a payline on the third reel of a three reel slot machine may trigger the secondary bonus game on that gaming device. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Progressive awards associated with gaming machines are also known. In one form, a progressive award or progressive pool is an award amount which includes an initial amount funded by a casino and an additional amount funded through a portion of each wager made on the progressive gaming machine. For example, 0.1% of each wager placed on the primary game of the gaming machine may be allocated to the progressive award or progressive award fund or pool. The progressive award grows in value as more players play the gaming machine and more portions of the players' wagers are allocated to the progressive award. When a player obtains a winning symbol or symbol combination associated with the progressive award, the accumulated progressive award is provided to the player. After the progressive award is provided to the player, the amount of the next progressive award is reset to the initial value and a portion of each subsequent wager is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine(s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming devices in the same gaming establishment sometimes called local area progressives ("LAP") and such progressive awards played for by a plurality of gaming devices at a plurality of different gaming establishments are sometimes called wide area progressives ("WAP"). Moreover, a gaming machine or bank of gaming machines may be simultaneously associated with a plurality of progressive awards. In these multi-level progressive ("MLP") configurations, a plurality of progressive awards start at different award or value levels, such as \$10, \$100, \$1000 and \$10,000 and each individually increment or increase until provided to a player. Upon a suitable triggering event at one of more of the gaming devices associated with the MLP, one or more of the progressive awards which form the MLP are provided to one or more of the players at such gaming devices.

Known progressive systems are set up such that each stand alone gaming device associated with a designated progressive award (or each bank of gaming machines associated with a designated progressive award) has its own separate progressive controller which tracks and maintains the designated progressive award. In one known method or model of tracking and maintaining a progressive award, the gaming device itself keeps track of the progressive metering (i.e., how much of a wager placed to allocate to a designated progressive award). In this method, the gaming device does not communicate with a progressive server, but functions as a stand-alone gaming system. Such a method provides limited opportunities for a progressive award to increment to relatively large award levels because the gaming device is only accounting for wagers placed at that gaming device.

Another known method of tracking and maintaining a progressive award includes the gaming device sending coin-in information to a designated progressive controller and the designated progressive controller using this information to track or maintain the progressive award In different known methods, the gaming machine sends either a delta number (i.e., a change since the last coin-in sent) to the designated progressive controller or the actual current coin-in to the designated progressive controller (wherein the central server determines any change in the coin-in by comparing the actual current coin-in to any previous coin-in). Utilizing this communicated information (in either form), the designated progressive controller determines the change in coin-in from the previous communication with the gaming device and sets each progressive level to be incremented an appropriate amount.

Another known method of tracking and maintaining a progressive award includes a gaming device sending a pulse to a designated progressive controller for each wager or coin placed at the gaming device. In this known method, each gaming device is associated with its own progressive tracking meter and the progressive controller is not aware of any of the information tracked by the gaming device's progressive tracking meter (i.e., the progressive controller only recognizes a pulse sent from the gaming device.) It should be appreciated that this method has some faults in how the pulse is sent, the possibility for a missed pulse, or the possibility of picking up an extra pulse. Moreover, this method requires a pulse or message to be sent to the designated progressive controller with every single coin-in.

It should be appreciated that these known methods for progressive implementation require multiple progressive tracking meters for each game offered, each denomination and/or each progressive award associated with each gaming machine. These setups require a great number of messages communicated between each gaming device and the progressive controller, wherein the size of each of these messages is substantial. These known methods also require a designated progressive controller to keep track of all progressive award data sent from each gaming machine. This constant messaging is costly and presents increased chances of one or more errors in the accounting to occur. These methods also provide no known method to reconcile when one or more of these situations occur, nor do they provide a means to determine the occurrence of any errors in accounting.

It should be further appreciated that known progressive gaming systems use a method of gaming device identification (assigned to paytable combinations), ProgLevel and ProgID to hook into the gaming system. While this information is useful to the maintenance of the progressive award, it lacks other information pertinent to running and implementing a progressive award. That is, without the sending of odds and combinations, an operator must access a PAR sheet to determine which games of which gaming devices to associate with which progressive awards. Such methods are often timely and costly because the gaming system operator may have a substantially large list of possible progressive awards, and odds of different outcomes occurring and must manually determine which progressive awards to assign to which games of which gaming devices (along with how to hook the gaming system together).

In known progressive award systems, each gaming machine associated with a designated progressive award is proximate to or otherwise associated with the progressive controller which maintains the designated progressive award, (such that the gaming machine and the progressive controller communicate with each other to establish the progressive award). Currently, if a gaming system operator desires to add or otherwise associate another gaming machine (or bank of gaming machines) with the designated progressive award, the gaming system operator must cause the additional gaming machine (or additional bank of gaming machines) to communicate with the designated progressive controller. This operation is costly and is limited by the capacity of the hardware and/or software of the progressive controller which is usually only designed to host a set number of stand-alone gaming machines (or a set number of banks of gaming machines). This greatly limits the gaming system operator due to the cost of adding gaming machines to any existing progressive controllers. Moreover, because a gaming device must be connected to a specific progressive controller and each progressive controller is capable of being connected to only a certain or limited number of gaming machines, players only have the option to play for a specific progressive award if they are able to place wagers on a gaming device associated that such specific progressive award.

While this setup provides a commercially viable progressive system, it significantly lacks in such areas as adaptability, configurability, and the overall ability to be modified. That is, as the setup of known progressive controllers requires each of the gaming machines to be either physically tied to or in RF communication with a progressive controller, gaming machines are limited to interaction with that specific progressive controller. This setup limits these gaming machines to the current format of one base game and one progressive pool.

As described above, a casino may include thousands of gaming devices. Hundreds of these gaming devices may each be associated with a progressive award specific to that gaming device. Moreover, a plurality of these gaming devices may each be associated with more than one progressive award (e.g., an MLP) which are each specific to that gaming device. These progressive awards may be associated with individual gaming devices, pluralities of gaming devices located at banks within the casino or pluralities of linked gaming devices set up in a WAP configuration. As these progressive awards start at different levels, such as from $1 to $1,000,000, different players at different gaming devices want to be eligible for one or more of these progressive awards which are different than the progressive award associated with the player's currently played gaming device. However, in known progressive systems, a fixed relationship exists between each gaming device and the progressive award(s) associated with that gaming device. A player at a specific gaming device may only play for and obtain the dedicated progressive award associated with that specifically played gaming device. In other words, the player may not play for and obtain any other progressive award(s) (beyond the progressive award(s) associated with the player's currently played gaming device) because such other progressive award(s) are dedicated to or otherwise associated with gaming devices not currently played by the player. Thus, even though a casino may include hundreds of gaming devices which are each associated with one or more dedicated progressive awards (i.e., players in a casino witness hundreds or thousands of incrementing progressive awards at different award levels or values), a player may only play for and obtain the progressive award(s) associated with their currently played gaming device (or bank of gaming devices). Accordingly, a need exists to provide a gaming system wherein a player may obtain one or more progressive awards different than the progressive award(s) associated with the player's currently played gaming device.

In one known gaming device or gaming system, a progressive award is formed by allocating a percentage of a player's wager into the player's own progressive award or pool (i.e., a personal progressive award) and subsequently returning the player's progressive award or pool to the player upon the occurrence of an event. However, these personal progressive awards take a long time to increase to a desirable amount because only one player is contributing to it. This serves to devolitize the game played because each game is simply returning a percentage of a player's wager back to them at some interval (in the form of a progressive award).

Moreover, known progressive award gaming systems may be perceived as not being fair because many players contribute to the building of the progressive award, yet only one person wins the progressive award. This is deflating to many of the players who contribute to the progressive award but do not win such progressive awards. Moreover, these players commonly suffer from jackpot fatigue when the value of the progressive award drops to an undesirable level after a hit, which in turn keeps players from wanting to play for the progressive award until it builds back to a higher level.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player. If there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

There is a continuing need to provide new and different gaming machines and gaming systems as well as new and different ways to provide awards to players including bonus awards. There is also a continuing need to provide new and different linked or related gaming machines.

SUMMARY

In one embodiment, the gaming system disclosed herein includes a central server, central controller or remote host in communication with or linked to a plurality of gaming machines or gaming devices. In another embodiment, the gaming system includes a plurality of linked gaming machines wherein one of the gaming machines functions as the central server or controller. In these embodiments, the central server functions or serves as the progressive controller for one or more of the gaming machines.

In one embodiment, the gaming system includes at least one and preferably a plurality of progressive awards, progressive pools or progressive incremented values adapted to be provided to one or more players at the gaming machines in the gaming system. In one embodiment, the central server includes at least one and preferably a plurality of progressive modules. Each progressive module is adapted to maintain one or more separate progressive awards or progressive incremented values. In one embodiment, the gaming system disclosed herein provides that a player at a first gaming device is eligible to win the progressive award associated with the first gaming device and may be further eligible to win a different progressive award associated with a second independent gaming device (or second group of gaming devices). In this embodiment, based on one or more suitable factors, such as any side wager placed or the player's status in a player tracking system, the player at the first gaming device becomes eligible to win the progressive award associated with the second gaming device (or second group of gaming devices). Accordingly, such a gaming system provides for the selective activation of one or more progressive awards (which are different than the progressive award(s) associated with the player's currently played gaming device), wherein the player is provided a chance to obtain one, more or each of the selectively activated progressive award during a single play of a gaming device.

In one embodiment, one or more of the progressive modules track and maintain a separate one of the progressive awards. In another embodiment, one or more of the progressive modules each maintains a plurality of progressive awards. In one embodiment, one or more of the progressive modules are each associated with one or more gaming devices in the gaming system. In this embodiment, if a gaming device is associated with a progressive module, a portion of each wager placed at that gaming machine funds the progressive award maintained by the associated progressive module. In one embodiment, if a gaming device is associated with a progressive module, upon a suitable triggering event, the progressive award (or one or more of the plurality of progressive awards) maintained by the progressive module is provided to a player at one of the gaming devices associated with that progressive module.

In one embodiment, a gaming system operator may add one or more gaming devices to each progressive module as desired. In this embodiment, each gaming device added to a progressive module can play for and obtain any progressive awards maintained by that progressive module. It should be appreciated that because all of the gaming machines are already in communication with the central server and the central server includes a plurality of progressive modules, adding a gaming machine (or a bank of gaming machines) to a progressive module merely requires establishing communication between the additional gaming machine (or between a bank of gaming machines) and the associated progressive module of the central server. This eliminates the costly rewiring required in linking one or more gaming devices to a separate progressive controller as in current progressive systems. This also eliminates the limitations presented by known dedicated progressive controllers because the central server (via the progressive modules of the central server) is now overseeing the responsibility and control for each of the progressive awards.

In one embodiment, in addition to enabling each gaming device to provide the progressive award associated with that gaming device (i.e., the primary or default progressive award), the central server enables players at one or more gaming devices in the gaming system to place one or more side bets on one or more progressive awards (i.e., supplemental progressive awards) associated with one or more different gaming devices which they wish to be eligible for. In this embodiment, if a player places one or more side bets, the player's gaming machine is connected to the progressive module(s) which maintains the progressive award(s) which the player placed one or more side-bets on. That is, each gaming machine is connected to or is otherwise associated with each progressive module that maintains each progressive award the player placed a side wager on. For example, if a player is playing a first gaming device associated with a first default progressive award and the player places a side bet or side wager on a second supplemental progressive award which is associated with a second gaming device (and not associated with the first gaming device), the player's side bet provides the player a chance of obtaining the second supplemental progressive award in addition to the player's existing chance of obtaining the first default progressive award.

In one embodiment, the determination of if a player at a gaming device is provided either a default progressive award or a supplemental progressive award is based on when a designed amount of wagers are placed at one or more of the gaming devices of the gaming system. In one such embodiment, each progressive award is associated with a range of values, wherein each progressive award will be provided to a player of a gaming device in the gaming system when the progressive award increments to a progressive award hit value within the range of values associated with that progressive award. In another such embodiment, the central controller determines a minimum amount and a maximum amount for the progressive award, provides that the progressive award starts at the minimum, determines a progressive award hit value between the minimum amount and the maximum amount, increments the progressive award with a configured percent of coin in, and provides the progressive award when the progressive award equals the determined progressive award hit value. In different embodiments, as described below, the determination of if a player at a gaming device is provided either a default progressive award or a supplemental progressive award is based on a generated symbol or symbol combination, based on a random determination by the central controller, based on a random determination at the gaming machine, based on one or more side wagers placed, predetermined, randomly determined, determined based on the player's primary game wager, determined based on the player's status (such as determined through a player tracking system), determined based on a level of a progressive award, determined based on time (such as the time of day) or determined based on any other suitable method or criteria.

In one embodiment, a defined relationship or ratio exists between a first player's wager on the primary game of a first gaming device and a side bet (to be eligible for the progressive award associated with the first gaming device) placed by a second player at a second gaming device. In one embodiment, the side bet placed by a second player at a second gaming device must be at least a predefined portion or percentage of a designated primary game wager placed by the first player at a first gaming device. In one embodiment, the side bet placed by the second player at the second gaming device must be a designated portion of the maximum primary game wager which may be placed by the first player at the first gaming device. For example, if a first player playing a first gaming device associated with a first progressive award places the maximum wager of $1.00 to be eligible to win the first progressive award and $0.01 of the first player's wager funds the first progressive award (with the remaining $0.99 funding the play of the primary game), then a second player at a second gaming device must place a side bet or side wager associated with the first progressive award of at least $0.01 to obtain a chance of winning the first progressive award. In this example, the first progressive award is designated or classified as the default progressive award for the first player (i.e., the progressive award associated with the player's currently played gaming device) and the first progressive award is designated or classified as a supplemental progressive award for the second player (i.e., a progressive award not associated with the player's currently played gaming device). It should be appreciated that the same progressive award may be classified as a default or primary progressive award for at least one gaming device and also as a supplemental progressive award for one or more different gaming devices.

In one embodiment, to be eligible to win a non-symbol driven or mystery supplemental progressive award (i.e., a supplemental progressive award which is provided based on a triggering event independent of any generated symbol or symbol combination), a side bet placed by a player must be at least a designated amount. In this embodiment, a player odds of winning the non-symbol driven progressive award is based on the player's relative side wager amount. In one embodiment, each side bet placed by each player (to be eligible to win a mystery supplemental progressive award) must be equal or substantially equal. Using the example described above, if the second player at the second gaming device places a side bet or side wager of $0.01 to obtain a chance of winning a non-symbol driven progressive award, the second player is provided the same probability of winning the non-symbol driven progressive award as the first player at the first gaming device (because the second players side bet contributes the same $0.01 to the progressive award as the players primary game wager). In another embodiment, to be eligible to win a mystery supplemental progressive award, each player is not required to place equal or substantially equal side bets. In this embodiment, for each side bet placed, the gaming system determines each player's chances of winning the non-symbol driven progressive award based on that player's relative side bet wager amount, wherein the greater the side bet, the greater the odds of winning the non-symbol driven or mystery progressive award. For example, if the second player at the second gaming device places a side bet of $0.02 on the non-symbol driven progressive award, the second player has twice the probability of winning the non-symbol driven progressive award as the first player at the first gaming device (because the second players side bet contributes $0.02 to the progressive award, while the first players primary game wager contributes $0.01 to the progressive award). In another embodiment, if a plurality of players each place a side bet to be eligible to win a non-symbol driven progressive award, each player's odds of winning the non-symbol driven progressive award are based on the amount of that player's individual side bet. On the other hand, in one embodiment, if a determination of winning a supplemental progressive award is symbol driven (i.e., based on a generated symbol or symbol combination), then once a player is eligible for a chance to win the supplemental progressive award, the player's odds of winning the supplemental progressive award are set (and dependent on the set probabilities associated with the symbols) and does not change regardless of the amount of the side bet placed on the supplemental progressive award. In another embodiment, if a determination of winning a supplemental progressive award is symbol driven (i.e., based on a generated symbol or symbol combination), the central controller and/or gaming device determines a symbol or symbol combination to associate with the player winning the supplemental progressive award, wherein the determined symbol or symbol combination is based on the amount of the player's side bet.

In one embodiment, enabling players to place side bets on one or more progressive awards provides each player the potential to select from multiple different progressive awards that are available through the central server. This embodiment enables any player to participate in a designated progressive, even if they are not currently on a gaming machine that is directly associated with the designated progressive. Such a gaming system enables each player to participate in (i.e., obtain a chance to win) any progressive available through the gaming system without having to seek out a specific gaming machine or wait until it becomes available. Such a gaming system further enables a player to participate in multiple progressives simultaneously, sequentially or in an over-lapping manner. Accordingly, in this embodiment, a player who placed a full side bet wager and is eligible for the game's own progressive award could theoretically obtain a plurality of progressive awards from a single gaming machine for a single play of the gaming machine.

In one embodiment, the progressive controller of the central server is associated with a player tracking system (implemented through a player tracking card or other suitable manner). In this embodiment, the central server communicates with a player tracking server which provides information utilized in the progressive gaming features. The player tracking system enables the use of progressive awards based on the player's current status or player tracking level with the casino. In one embodiment, the player tracking card determines which progressive award (or progressive award level in a multi-level progressive configuration) a player is eligible for based on the player's current status. Through this centralized system, a gaming system operator can configure a gaming machine to enable progressives only for players of a certain player tracking status or provides that the highest level of a multi-level progressive configuration is available only to players with the highest player tracking status.

In another embodiment, the gaming system and method disclosed herein contemplates employing one or more displays to provide the players of the gaming machines information about the progressive or bonus awards. This displayed information increases player's awareness of these awards and increases interaction between players of the gaming machines. The display(s) provide any suitable information about the gaming system, gaming machines, bonus events and progressive awards, such as which gaming machines are winning or have recently won progressive awards, the amount of the progressive awards, and when a progressive award is about to be hit. In one embodiment, the central server communicates information to the players via one or more progressive tracking meters on each separate machine, on an overhead sign that is common to all machines in the bank and/or on one or more signs which are not associated with any gaming machines in the gaming system (such as signs placed anywhere in the casino). By enabling the central server to serve as the progressive server, the control of these signs can be done by sending signals to the sign controller as all of the information is readily available to the central server.

In one embodiment, providing that the central controller functions as the progressive controller enables the gaming system operator to: offer the player a choice from a certain set of games, decide which games to offer a player, change the games offered to a player based on any number or type of criteria, and/or enable the player to choose which game they want to play. In another embodiment, the gaming system disclosed herein provides the gaming system operator with the ability to configure the contributions to one or more progressive awards, decide which of a plurality of progressive awards to offer one or more players, enable for different players to play for different progressive levels of one or more multi-level progressive configurations, provide one or more mystery progressive awards to one or more players and/or temporarily or permanently disable one or more progressive awards.

In one embodiment, the central server functioning as the progressive controller enables one or more gaming machines of the gaming system to be activated with defined progressive pools and tie in paytable information from each gaming machine (including denomination and bet information). In one embodiment, as described above the central server functioning as the progressive controller enables one or more gaming machines of the gaming system to transmit information to one or more sign controllers for communication to the players of the gaming system. Accordingly, such a gaming system essentially enables for the gaming system operator to have total configuration control. That is the gaming system disclosed herein enables a gaming system operator to decide which games to offer to players, decide when and where to offer such games, decide which progressive awards to offer with each game, change the video graphics of one or more of the offered games without modifying the underlying math, and/or dynamically change the gaming system based on any number of criteria. Such configuration control enables a gaming system operation to serve players and casinos in a new and exciting way with increased benefits over existing progressive controllers.

In the gaming system disclosed herein, providing that the central server functions as the progressive controller enables a virtual unlimited number of games and gaming devices associated with the progressive controller. By enabling the central server to serve as the progressive controller, a great deal of flexibility is added to the gaming system as the gaming devices no longer have to be tied to a location proximate to a progressive controller. This solves a number of the problems identified above by enabling the gaming system to be easily adapted, configured, or changed. Moreover, by removing the limitations associated with current progressive award setups and enabling for more gaming devices to play for a progressive award, the progressive awards will increment to higher values and thus be provided to players more often. Such higher progressive awards and faster hits creates additional excitement for players and breaks up the relatively long periods of time it often takes to build the progressive awards to the appropriate levels. The gaming system and method disclosed herein enables each player who is actively playing a gaming device in the gaming system a chance at winning a progressive award. Also, the cost-effectiveness of enabling the central server to also serve as the progressive module would save the operator by enhancing the banked network without requiring expensive hard-wiring and larger controller devices.

In other words, the usage of a central server with progressive modules enables for flexibility and enhancements in gaming systems that are not possible with the current gaming systems. A gaming system with a central server that includes a plurality of progressive modules enables an operator to dynamically change games or progressive award types, add or remove a gaming machine from association with a progressive award, easily add multiple banks of gaming machines associated with the same game-driven type progressive award, control the signage to reflect the dynamic nature of the gaming system and enable for side bets on multiple progressive award games. Additionally, the gaming system disclosed herein enables for greater control and adaptability of stand-alone progressive awards.

Additional features and advantages are described in, and will be apparent from, the following Detailed Description and the figures.

BRIEF DESCRIPTION OF THE FIGURES

FIG. 4 is a chart illustrating each of the active progressive modules and the progressive award(s) maintained by each progressive module.

FIG. 5 is a menu illustrating each of the supplemental progressive awards which a player may place a side wager on and the minimum side wager required for each of such supplemental progressive awards.

DETAILED DESCRIPTION

In one embodiment, the gaming system disclosed herein includes a plurality of progressive awards provided to players of the linked gaming machines. These awards are referred to herein as progressive awards to distinguish them from the awards that the gaming machines provide to the players for winning outcomes in the plays of the primary wagering games, such as slot games, card games (e.g., poker, blackjack) or any other suitable game.

Figure 1:
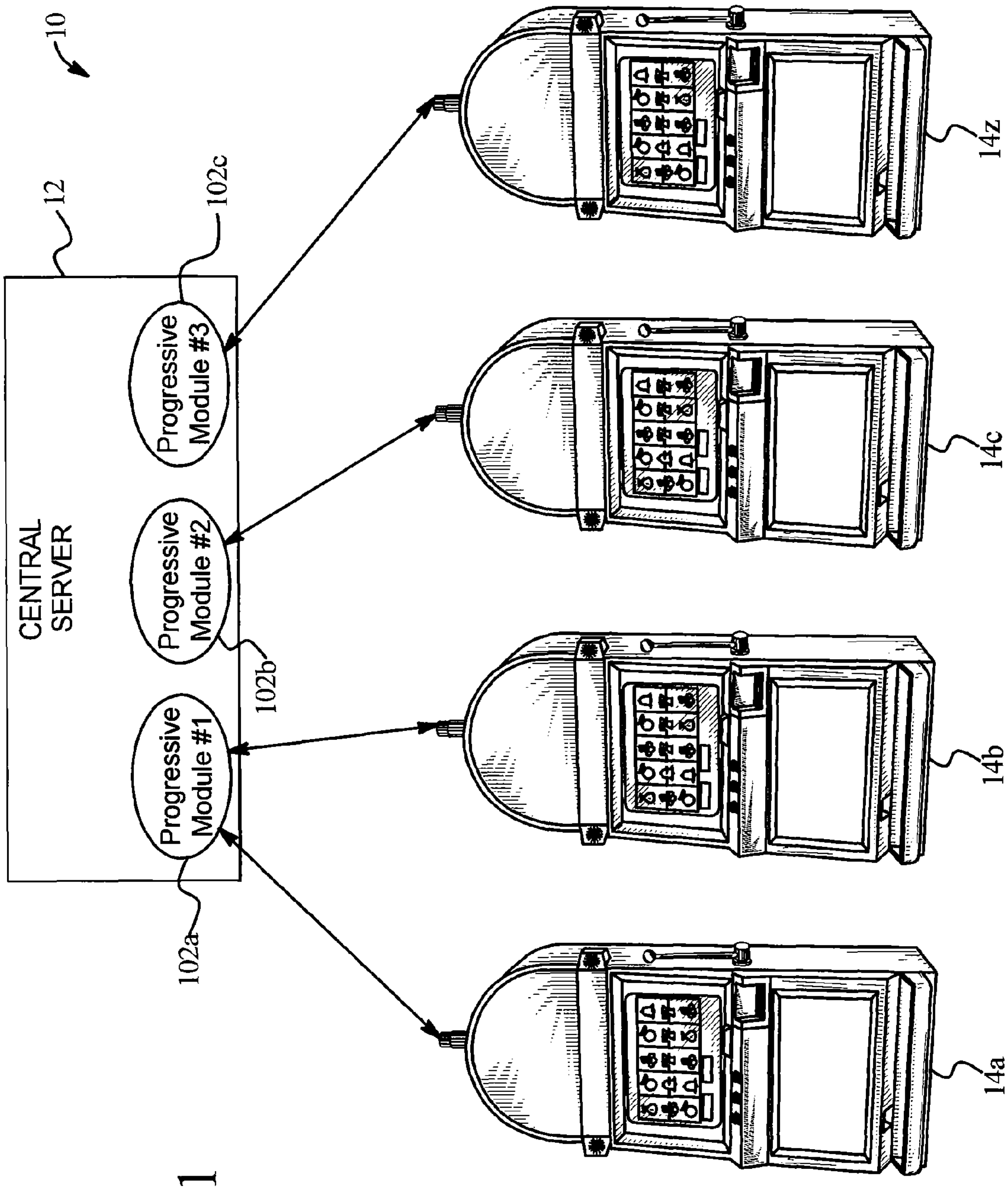
FIG. 1 is a schematic diagram of the central server in communication with a plurality of gaming devices in accordance with one embodiment of the gaming system disclosed herein wherein each progressive module is associated with one or more gaming devices.

Referring to FIG. 1, one embodiment of the gaming system 10 includes a central server, central controller or remote host 12 and a plurality of gaming machines or gaming devices 14*a*, 14*b*, 14*c* . . . 14*z* in communication with or linked to the central server 12 through a data network or a remote communication link. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. The play of each of the gaming machines in the group is monitored by the central server. The central server or controller may be any suitable server or computing device which includes a processor and a memory or storage device. In alternative embodiments, the central server is another gaming machine in the gaming system. As described below, the central server functions as the progressive server for one or more progressive awards maintained by the gaming system. The terms central server, central controller and remote host are used interchangeably herein.

In one embodiment, the central server or controller maintains or keeps track of the play and/or other activity on or relating to the gaming machines in the gaming system. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming device includes a separate coin-in, wager meter or pool which tracks the total or partial coin-in or wagers placed at that gaming device. It should be appreciated that the player of a gaming machine may change during this tracking and that this tracking can be independent of the specific player playing the gaming machine.

The central server functions or serves as the progressive controller for one or more of the gaming machines. In one embodiment, the central server includes at least one and preferably a plurality of progressive modules, wherein one or more of the progressive modules each maintains one or more progressive awards. For example, as seen in FIG. 1, the central controller includes a plurality of progressive modules 102*a*, 102*b* and 102*c*, wherein each progressive module is associated with zero, one or more gaming devices. In this example, gaming devices 14*a* and 14*b* are associated with progressive module #1 102*a*, gaming device 14*c* is associated with progressive module #2 102*b* and gaming device 14*z* is associated with progressive module #3 102*c*. Accordingly, the gaming system disclosed herein provides that at least one and preferably a plurality of stand alone gaming devices (e.g., stand alone gaming device 14*c*) or at least one and preferably a plurality of banks of gaming devices (e.g., banked gaming devices 14*a* and 14*b*) are each connected to the same central server which has multiple progressive modules. In one embodiment, one or more progressive modules are each dedicated to a stand-alone gaming device. In one embodiment, all games of a single theme are linked to the same progressive module (i.e., associated with the same progressive awards) no matter where they are located. It should be appreciated that while each gaming machine in a bank of gaming machines may have a different game on it, it is preferred that the games have a similar mathematical model to ensure fairness among the eligible gaming machines.

In one embodiment, the gaming system operator may add one or more gaming devices to each progressive module as required. It should be appreciated because all of the gaming machines are already in communication with the central server, adding a gaming machine or a bank of gaming machines merely requires establishing secure communication with the gaming machine or bank of gaming machines and the associated progressive module. This eliminates the costly rewiring required in current progressive systems as well as eliminates the limitations presented by known progressive controllers because the central server is now overseeing the responsibility for control of the progressive awards. It should be appreciated that by utilizing the central controller to serve as the progressive controller, the gaming system disclosed herein provides that the gaming devices no longer have to be tied to a location proximate to a progressive controller and therefore an unlimited number of games and gaming devices may be associated with one or more progressive awards. Such a progressive gaming system provides that gaming system operators will no longer require any additional wiring to install and associate a new bank of gaming devices with one or more progressive awards.

For example, in known methods of connecting banks of gaming devices to a progressive controller, there may be a maximum of three banks of eight gaming machines connected to the progressive controller before the associated costs outweigh the associated benefit to the casino. Accordingly, at most twenty-four gaming machines could be connected to the progressive controller and in play at any given time for a designated progressive award. Thus, if a designated progressive award for a specific game has an average hit rate of once every 240 pulls and the players were playing (on average) a game every 10 seconds, the designated progressive award would hit approximately every 100 seconds. By contrast, as indicated above, the disclosed gaming system enables a virtual unlimited number of banks of gaming machines to be connected to the central controller (and thus to one or more progressive modules). For example, if thirty banks of eight gaming machines are connected to the same progressive module of the central controller, two-hundred-forty gaming machines could be in play for a designated progressive award at any given time. Thus, with the same example hit and play rate described above, the designated progressive award would hit almost every ten seconds (thus awarding one player at one of the connected gaming machines with a progressive award for every set of pulls). Accordingly, the gaming system and method disclosed herein causes increased excitement as players realize that the gaming system frequently provides bonus or progressive awards.

In another embodiment, the gaming system disclosed herein eliminates liability rollover when one or more gaming devices in the gaming system shut-down. In this embodiment, when a shutdown of a gaming machine or a bank of gaming machines occurs within the gaming system (either scheduled or unexpected), the gaming system operator easily moves the value of the progressive award associated with the shutdown gaming machine(s) to another progressive module on the network. This could be done due to the use of the central server which makes communication between different progressive modules possible. Such a setup enables the progressive award associated with the shutdown gaming machine(s) to remain available to the players. This eliminates lost revenue and lost value build-up to the progressive awards associated with a downtime. For example, if the stand-alone gaming device (which is associated with a dedicated progressive module) malfunctions or experiences other problems wherein information or data relating to the progressive award(s) associated with that gaming device is compromised, the gaming device retrieves such information or data from the dedicated progressive module of the central server and transfers such information or data to another progressive module of the central server.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 2A:
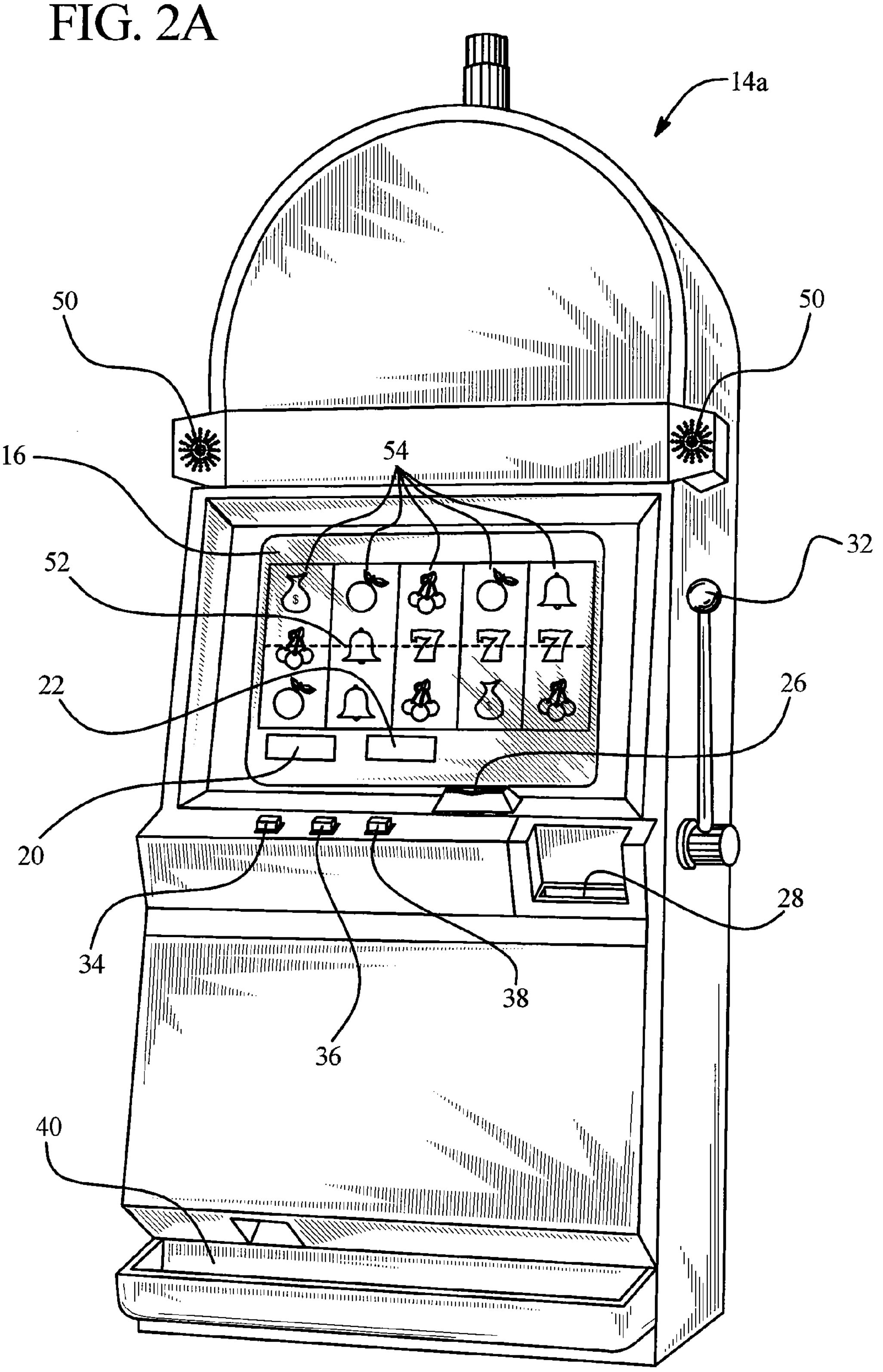
FIGS. 2A and 2B are front perspective views of alternative embodiments of gaming devices disclosed herein.
Figure 2B:
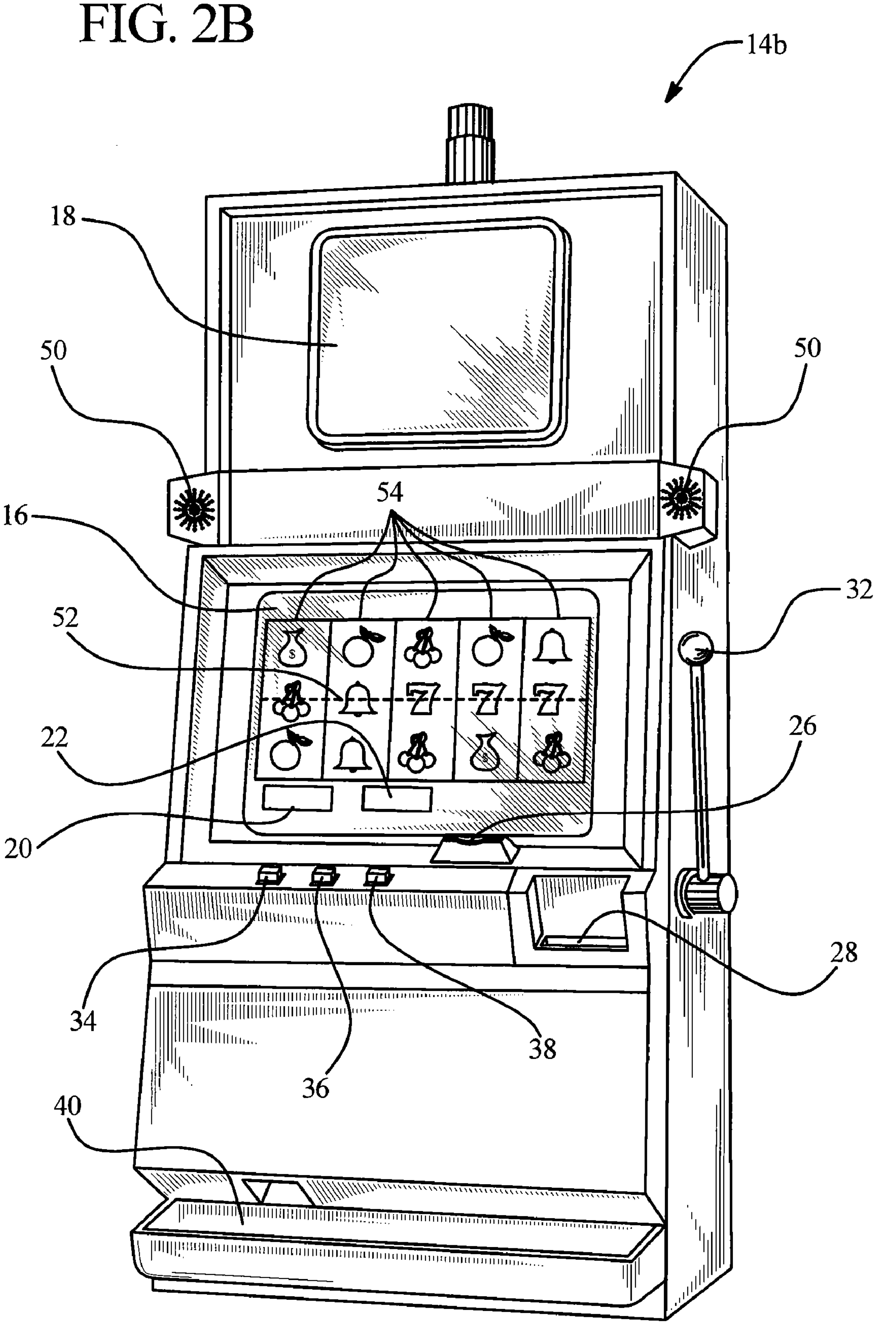

Two alternative embodiments of the gaming devices of the gaming system are illustrated in FIGS. 2A and 2B as gaming device 14*a* and gaming device 14*b*, respectively. Gaming device 14*a* and/or gaming device 14*b* are generally referred to herein as gaming device 14.

In one embodiment, as illustrated in FIGS. 2A and 2B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

Figure 3:
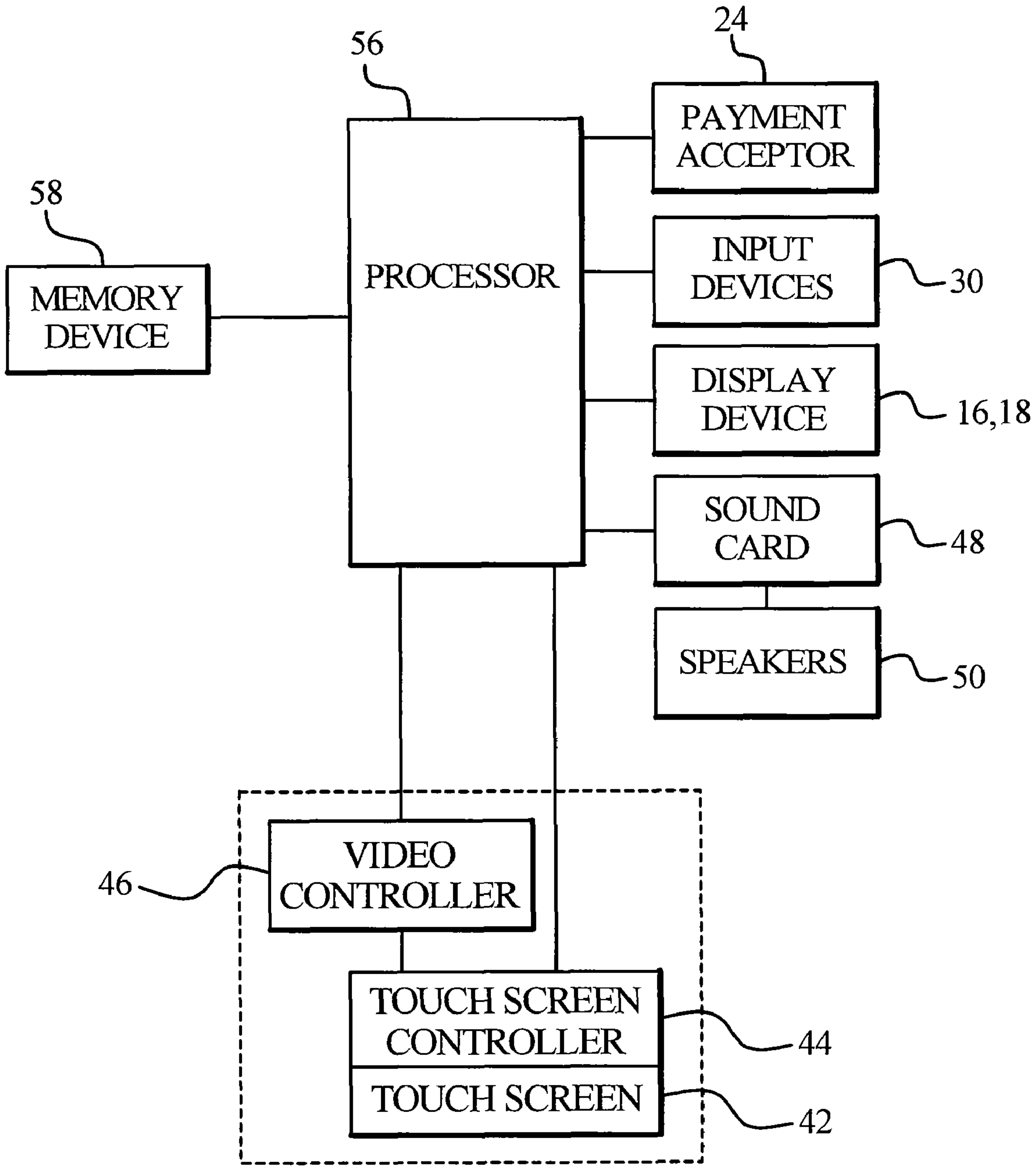
FIG. 3 is a schematic block diagram of the electronic configuration of one embodiment of a gaming device disclosed herein.

In one embodiment, as illustrated in FIG. 3, the gaming device preferably includes at least one processor 56, such as a microprocessor, a microcontroller-based platform, a suitable integrated circuit or one or more application-specific integrated circuits (ASIC's). The processor is in communication with or operable to access or to exchange signals with at least one data storage or memory device 58. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG), such as a true random number generator, a pseudo random number generator or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 3, the gaming device includes one or more display devices controlled by the processor. The display devices are preferably connected to or mounted to the cabinet of the gaming device. The embodiment shown in FIG. 2A includes a central display device 16 which displays a primary game. This display device may also display any secondary game associated with the primary game as well as information relating to the primary or secondary game. The alternative embodiment shown in FIG. 2B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 2A and 2B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 3, in one embodiment, the gaming device includes at least one payment acceptor 24 in communication with the processor. As seen in FIGS. 2A and 2B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 2A, 2B and 3, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 2A and 2B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 3, one input device is a touch-screen 42 coupled with a touch-screen controller 44, or some other touch-sensitive display overlay to enable for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 3, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 14 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 2A and 2B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 2A and 2B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

In one embodiment, the game outcome provided to the player is determined by the central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a intermittent award in addition to any award provided for winning the bingo game as described above. In this embodiment, if one or more elements are marked in intermittent patterns within a designated number of drawn elements, a intermittent award or value associated with the marked intermittent pattern is provided to the player as part of the predetermined game outcome. For example, if the four corners of a bingo card are marked within the first twenty selected elements, an intermittent award of $10 is provided to the player as part of the predetermined game outcome. It should be appreciated that in this embodiment, the player of a gaming device may be provided an intermittent award regardless of if the enrolled gaming device's provided bingo card wins or does not win the bingo game as described above.

In another embodiment, one or more of the gaming devices are in communication with the central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, as mentioned above, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

As described above, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the present disclosure is employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Progressive System Configuration

In one embodiment, a plurality of gaming devices at one or more gaming sites are networked to the central server in a progressive configuration, wherein a portion of each wager placed is allocated to one or more progressive awards. As indicated below, the progressive awards are maintained by one or more progressive module(s) of the central server, wherein the gaming devices associated with each progressive module contribute portions of wagers placed to the progressive award maintained by that progressive module. The multiple gaming machines may be in the same bank of machines, in the same casino or gaming establishment (such as through LAN) or in two or more different casinos or gaming establishments (such as through a WAN).

In another embodiment, one or more of the progressive modules each maintain one or more multi-level progressives (MLP). As described above, a multi-level progressive is a configuration of a plurality of progressive awards which are each associated with the same progressive module. In one embodiment, if a triggering event occurs, one of the progressive awards of the MLP configuration is provided to a player and the provided progressive award is reset to an initial value. It should be appreciated that when one progressive award of the MLP configuration is provided to a player, the remaining progressive awards of the MLP configuration continue to increment. In one embodiment, the progressive awards of each MLP configuration start at different levels, such as $10, $100, $1000 and $10,000, and increment or increase until provided to a player. In one embodiment, the percentage that goes to each progressive award of each MLP module is equal (such as 0.1% to each of four progressive awards). In other embodiments, a plurality of the progressive awards of one or more MLP configurations may be funded by different percentages. In these embodiments, the progressive module which maintains the MLP continues to increase the value or award level of each progressive award of the MLP until a progressive award is provided to a player (upon the occurrence of a bonus or triggering event), at which point another progressive award starts to increment from the appropriate progressive award level.

In one alternative embodiment, one or more of the gaming devices each require an additional wager to fund one or more of the progressives awards. For example, the plurality of progressive awards are funded, at least partially, via a side-bet or side-wager which the player may make (and which is tracked via a side-bet meter). In one embodiment, the progressive awards are funded with only side-bets or side-wagers placed. In another embodiment, the progressive awards are funded based on player's wagers as described above as well as any side-bets or side-wagers placed. In another embodiment, a separate side bet is not required (though maximum wager may be required) to provide a player one of the maintained progressive awards.

In one embodiment, as described in more detail below, the central server or central controller determines when a progressive award win is triggered. In this embodiment, if the central controller determines that a gaming device will provide a progressive award to a player, the central controller communicates the appropriate data to the gaming device (and the gaming device provides the progressive award). In another embodiment, an individual gaming machine determines when a progressive award win is triggered. In this embodiment, if an individual gaming machine determines to provide a progressive award to a player, the gaming machine provides the player the progressive award and communicates the appropriate data to the central controller. In another embodiment, the central controller and one or more individual gaming machines each determine at least part of when a progressive award win is triggered. In this embodiment, the central controller and at least one individual gaming machine work in conjunction with each other to determine when a progressive award is provided to at least one player at least one gaming device in the gaming system, such as through an individual gaming machine meeting a predetermined requirement established by the central controller. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

As described above, the central server includes at least one and preferably a plurality of progressive modules. Each progressive module maintains zero, one or a plurality of progressive awards. For example, as illustrated in FIG. 4, progressive module #1 is associated with two progressive awards valued at $105 and $317, progressive module #2 is associated with one progressive award valued at $110,459 and progressive module #3 is associated with three progressive awards valued at $39, $121 and $4,103. In one embodiment, each progressive award maintained by each progressive module is different. In another embodiment, a plurality of progressive awards maintained by a plurality of progressive modules are different. In another embodiment, a plurality of progressive awards maintained by a plurality of progressive modules are the same. In another embodiment, a plurality of progressive awards maintained by at least one of the progressive modules are different. In another embodiment, each of the progressive awards maintained by at least one of the progressive modules is different. In another embodiment, a plurality of progressive awards maintained by at least one of the progressive modules are the same.

In one embodiment, the central server has a predefined number of progressive modules. In this embodiment, these progressive modules may or may not be associated with a gaming machine at any one time, wherein the gaming system operator has the ability to decide which gaming machine to associate with which progressive module and when. Thus, even though a central server may have 100 progressive modules, at any given time, any number from 0 to 100 may be active based upon the state of the gaming system and the configurations supplied by the gaming system operator. This determination could be based on a number of factors, such as time, rate of play, player tracking card information, or any other factor the gaming system operator chooses.

It should be appreciated that if a gaming device is associated with a specific progressive module, that gaming device may provide the progressive award maintained by that specific associated progressive module. On the other hand, if a gaming device is not associated with a specific progressive module, that gaming device cannot provide the progressive award maintained by the specific non-associated progressive module. For example, referring to FIGS. 1 and 4, since gaming device 14*c* is associated with progressive module #2 102*b*, gaming device 14*c* may provide a player the progressive award of $110,459 maintained by progressive module #2. In this example, since gaming device 14*c* is not associated with progressive module #1 or progressive module #3, gaming device 14*c* cannot provide a player any of the two progressive awards maintained by progressive module #1 or any of the four progressive awards maintained by progressive module #3.

In one embodiment, the gaming system disclosed herein utilizes a progressive registration wherein a gaming device reports various pieces of information to the central server in the form of a progressive file. In this embodiment, the gaming device identifies the particular paytable utilized in the played game and the amount bet and the central server determines which progressive awards to increment and by how much. In different embodiments, this reporting is done in any set interval, such as every game (which ensures the progressive meters are kept up to date and incremented for the player to view) or over a certain time period to reduce communications to the central server. Such a configuration offloads the task of the gaming device having to locally maintain the coin-in data as well as relieves the gaming device from having to manage and communicate a number of progressive tracking meters.

Figure 10:
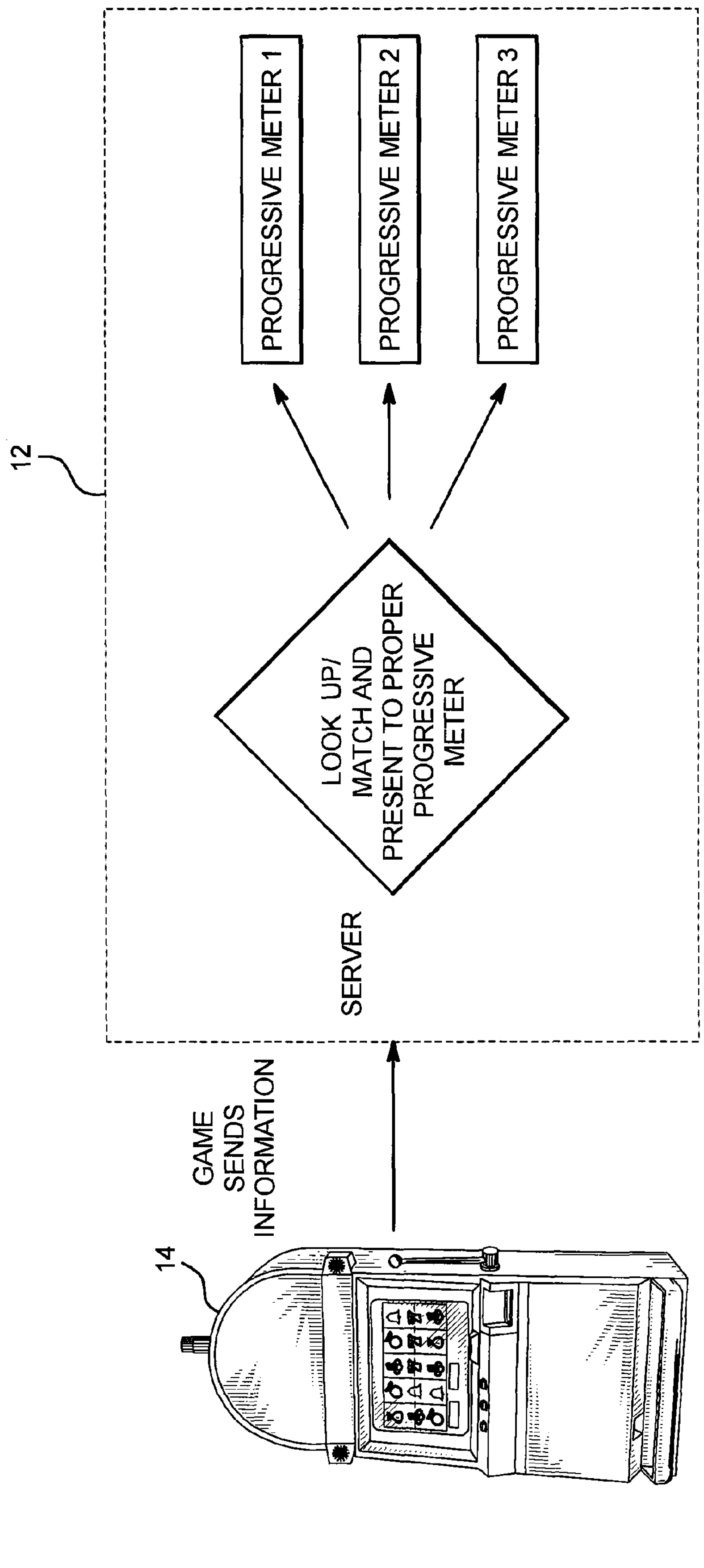
FIG. 10 is a schematic diagram of one embodiment of the gaming system disclosed herein wherein a gaming device communicates information related to a plurality of progressive awards to the central server and the central server sorts and categories the communicated information.

As illustrated in FIG. 10, in one embodiment, a gaming device 14 sends one or more messages to the central server 12 to start the reporting process. In one example, this message includes the paytable played, the actual bet placed, the theme of the game, the maximum bet on the game, the number of lines bet, the denomination of the game and/or any other pertinent paytable information. The central server processes this message, looks up information in a suitable database or look-up table and presents the appropriate coin-in data to the appropriate progressive tracking meter. That is, the central server sorts out the bet information to determine how to apply each bet to each progressive award. In other words, this embodiment enables for a wager which contributes to a number of progressive awards to be allocated to the appropriate progressive awards by the central server and not by the individual gaming device (thus eliminating the need to keep separate metering for each progressive award on each gaming device).

One such embodiment enables the gaming system to group a plurality of different wagers on a plurality of different progressive awards without having to keep separate meters for each wager placed on each progressive award on each gaming device. In this embodiment, the central server sends a single reported bet to a number of different groups. It should be appreciated that by enabling the central server to process the information in this manner, the gaming system is enabled to reduce individual coin-in metering and only sends bet information. This configuration provides that the bet information is sorted out by the central server to determine the game type and how to apply the bet to each progressive award. In one embodiment, groups are individually named throughout the gaming system. It should be appreciated that when a gaming system operator puts more than one progressive level win on a paytable, it is desirable to group the plurality of progressive awards as disclosed above.

In one embodiment, an individual gaming machine may trigger a progressive win, for example through a game play event or game specific function, such as a symbol-driven trigger. In this embodiment, the progressive award provided is a direct result of a game outcome generated on one of the gaming devices. That is, providing the progressive award is triggered by an event in or based specifically on one or more plays of any primary game or on one or more of the plays of any secondary game of one or more of the gaming machines (associated with the progressive module which maintains the specific progressive award) in the gaming system. In one embodiment, the central sever determines the symbol combination which will trigger a progressive award for the specific game played. In one embodiment, an individual gaming device determines the symbol combination which will trigger a progressive award for the specific game played and the gaming device communicates such determined symbol combination to the central server. In this embodiment, the gaming device determines the symbol combination based on the central server determined parameters set forth for the specific game played. In these embodiments, the central server displays the determined symbol combination on one or more signs associated with that progressive award.

In one embodiment, the gaming system is operable to dynamically change the gaming device outcomes (i.e., winning symbol combinations) associated with winning the progressive awards. For example, a first player is betting $1 per spin on a reel game associated with a first progressive award, wherein the reel game outcome associated with winning the first progressive award is determined to be a specific symbol combination with the odds of 1 in 1,000,000. If the first player subsequently changes their bet to $2 per spin, for the gaming system to enable the first player to continue playing for the first progressive award, to account for the changed wager amount, the gaming system changes one or more of the reel game outcomes associated with winning the first progressive award. The changes to which game outcomes are associated with winning the progressive awards are communicated to or otherwise displayed to the players of the gaming devices in the gaming system. In one example, the gaming system queries a list of game outcomes associated with the reel game and reassociates the reel game outcome associated with winning the first progressive award to a reel game outcome with the odds of 1 in 500,000. In another example, the gaming system queries the list of game outcomes associated with the reel game and associates an additional symbol combination (with the odds of 1 in 1,000,000) with winning the first progressive award (thus resulting in two different symbol combinations each associated with winning the first progressive award). That is, this function provides a player that wagers $2 with the same overall odds of winning the progressive award over one played game as a player that wagers $1 over two played games.

In these embodiments, the central server utilizes different applications that access the player's currently played gaming device to pick from available levels and/or game outcomes for the progressive awards. Such an embodiment eliminates the timely chore, as described above, of manually accessing the PAR sheets, because the gaming device has communicated the appropriate information to the central server required for the gaming device to match to one or more appropriate progressive awards.

In one embodiment, the central server queries either itself or one or more gaming devices to find game outcomes that match the odds it is looking for. Accordingly, the gaming devices are matched to progressive awards available based upon reported configurations. In one embodiment, the selection of which gaming devices to include in a linked progressive configuration is accomplished by specifically selecting a single gaming device, selecting a plurality of gaming devices that match the search criteria or selecting all gaming devices that match the search criteria. In one embodiment, a gaming system operator or user with appropriate permissions is able to create, edit and/or delete these progressive configurations.

In one embodiment, due to the above-described querying/match/assign feature, the gaming system disclosed herein is operable to associate a game of a gaming device with a progressive award nearly instantaneously. In one embodiment, the gaming device sends a progressive file (with any suitable paytable information) to the central server when the gaming device desires to add a progressive award. After receiving the progressive file, the central server matches the gaming device to a progressive module that maintains a progressive award which supports the game's characteristics and sets up the appropriate communication.

In an example of this embodiment, a message is sent to a specific gaming device (or a number of qualified gaming devices) that the central server is searching or looking for certain odds. The gaming device responds with the entries it has available (according to one or more stored pay tables) and the odds of occurring associated with these entries. This configuration enables the central server to ask the gaming device which symbol combinations it has to potentially associate with a progressive award. For example, the central server asks one or more gaming devices for available symbol combinations which occur at the odds of 1 in 4,000,000. In this embodiment, the gaming devices are matched to one or more progressive awards (maintained by one or more progressive modules) based upon the reported symbol combinations. Thus there is no need for an operator to scour the large PAR sheets to determine which symbol combinations to associate with which progressive awards and then to manually associate such progressive awards with such symbol combinations in the gaming system.

In another embodiment, the central server accesses a stored database or table of information provided by the gaming device to find a symbol combination associated with the desired odds. In this embodiment, the central server queries such database or table to determine which gaming devices have what symbol combinations at what odds available. In one embodiment, the central server uses a sorting function to search through the progressive award data or information received from the gaming devices to match the appropriate gaming devices to the appropriate progressive awards.

In one embodiment, the paytables of one or more gaming devices in the gaming system are set up by the gaming system operator/designer to identify potential progressive award categories. In this embodiment, these potential progressive awards are tagged within the paytable and used to further build a progressive file to send to the central server. This configuration enables the gaming system operator to pick and choose the games or outcomes to associate with one or more progressive awards. In different embodiments, the process of progressive registration and enrollment occurs based on any number of desired criteria. In one embodiment, this process occurs each time the gaming device powers up from a cold startup. In another embodiment, a sync message or a suitable HASH algorithm (i.e., an algorithm which compares two sets of data and determines any data changes) is utilized to search for any changes in the gaming system. Such messages recognize that one or more parameters of a gaming device have changed and a new registration is required in the gaming system.

In one embodiment, the setup of the gaming system enables other forms of communication from the gaming device to the central server. For example, in addition to sending data relating to the symbol combination chosen for the progressive award, the gaming device also sends a graphic identification in the progressive file which represents the winning symbol combination identified to associate with the progressive. It should be appreciated that this graphic identification could be used for any number of purposes. For example, the gaming device or central controller sends this graphic identification to a sign manager (as part of the floor manager) which subsequently displays the graphic identification to the players, either directly on the gaming device(s) or via any suitable signage, to graphically inform the players of what symbol combination will win them a progressive award.

In one embodiment, the gaming system is configured to enable adjustments to one or more progressive awards. In this embodiment, the adjustments are classified into three types: (1) resetting a progressive award; (2) editing a progressive award, or (3) changing the parameters of a progressive award. In this embodiment, resetting a progressive award includes reestablishing the progressive award at its reset values. It should be appreciated that this process is only needed when something has happened and the progressive award must be restarted. For example, if a progressive award hits when a gaming device is off-line, the progressive award needs to be reset. In one embodiment, a progressive award is edited by changing the value of the progressive award by entering a new progressive award value over an old progressive award value.

In one embodiment, changing the parameters of a progressive award includes adding or deleting progressive awards, gaming devices, paytables, or denominations as contributors to a progressive award. In another embodiment, changing the parameters of a progressive award includes changes to the reset value of the progressive award, to the minimum value of the progressive award, and/or to the maximum value of the progressive award. In another embodiment, changing the parameters of a progressive award includes deleting a progressive award (if proper process is to first remove all gaming devices from a progressive award link prior to initiation of game play for that progressive award). It should be appreciated that certain changes to one or more progressive awards may be restricted in any suitable manner.

In one embodiment, the gaming system establishes progressive awards where non-matching odds games are linked together. In this embodiment, the central server identifies the odds and offers a compensatory additional chance to win the progressive independent of the base game symbol outcomes. In different embodiments, this is displayed on the player's screen, is part of a mystery progressive award or is part of a separate game of chance. These embodiments enable multiple gaming machines to participate in the same progressive pool, even if they are not mathematically similar in their pay structures or odds. That is, the gaming system utilizes the compensatory chances to ensure a balanced fairness among all gaming machines.

As indicated above, in one embodiment, a progressive award includes a progressive base value (i.e., the value to which a progressive award is reset to) and increment values (i.e., the values, based on wagers placed, which are added to the progressive base value). In one embodiment, the gaming system disclosed herein is configured to transfer increment values (maintained in monetary units) from one progressive base value to another progressive base value. For example, if a first progressive award of $4,250 includes a base value of $3,000 and an increment value of $1,250, upon a suitable triggering event, such as a designated amount of time, the central server transfers the increment value of $1,250 to a second progressive award. In another example, if the triggering event is the gaming system deactivating or shutting down a progressive module which maintains a progressive award, the increment value of the progressive award maintained by the deactivated progressive module is transferred to one or more different progressive awards maintained by one or more of the different progressive modules. That is, in this embodiment, the incremental values are tied to or otherwise associated with actively incrementing progressive awards. In one embodiment, the increment value may be subsequently transferred again to another progressive award maintained by another progressive module of the gaming system. In different embodiments, the central server may transfer part or all of an increment value of one progressive award maintained by one progressive module to one or more other progressive awards maintained by another progressive module.

In another embodiment, the central server is adapted to store one or more incremental values for one or more time periods. For example, when the central server modifies a progressive (i.e., deactivating a progressive or modifying the denomination amount of a progressive), any incremental value accumulated for the modified progressive is stored by the central server. In this example, the stored incremental value is saved for a designated period of time, saved until the modified progressive is reactivated, distributed over time or handled in any suitable manner.

It should be appreciated that the server-based progressive gaming system disclosed above can be described in its functionality as a progressive manager (PM). In one embodiment, a progressive manager or progressive manager module is designed to work with any server based game that supports a progressive award function. In another embodiment, the progressive manager is capable to incorporate player card data, configure different progressive awards (i.e., create one or more progressive awards, edit one or more progressive awards and/or delete one or more progressive awards), select winners of any progressive awards, establish secondary progressive awards, control messaging, control jackpots, control licensing, and any other suitable function desired by the gaming system implementer.

In one embodiment, in incorporating player card data, the PM implements club member jackpots and keeps track of player activity (as would be required by some accumulated value progressive awards described below.) In this embodiment, the PM tracks card-in and card-out times and provides a safeguard against a missed card-out (such as via a "card-in heartbeat" which messages the player tracking system in designated intervals to ensure the player is still playing). In different embodiments, the PM maintains data about the players including, but not limited to: account number, card number, first name, surname, preferred name, ranking, promotion status, address, city, state, birthday, anniversary, gaming sessions, or any other data deemed suitable by the gaming system implementer.

In one embodiment, a gaming establishment, such as a casino, includes the capabilities to provide higher jackpots to better or higher ranked customers through variable bonusing based on one or more playing rankings. In this embodiment, the PM queries different gaming devices to determine the relative ranking of each player at these gaming devices. Each player ranking is associated with a fixed bonus amount to provide to that player in addition to any progressive award or jackpot provided to that player. In one embodiment, a gaming establishment configures the bonus amount for each player based on each player's individual ranking. For example, for a progressive award with a starting value or amount of $1000, a base level player competes for the displayed starting amount of $1000, while a higher ranked gold player competes for the displayed starting amount of $1000 plus a bonus premium of $200 associated with the player's gold ranking.

In different embodiments, the progressive gaming system disclosed herein handles the traditional progressive gaming machine centric view, a traditional central controller centric view, an accumulated value progressive award gaming machine centric view or an accumulated value progressive award central controller centric view. In one embodiment, the progressive gaming system also handles the errors in the jackpot process. In this embodiment, one of the most common errors is when the gaming machine is off-line when a progressive award hits. Accordingly, the progressive gaming system disclosed herein contemplates a recovery process in case this happens, wherein the progressive gaming system has the capability to display data on any of its numerous active progressive awards or pools to a player. In one such embodiment, this is accomplished through a "View" button which brings up the progressive awards or pools and enables a player to select or peruse the values and data they wish to see.

In one embodiment, to accommodate all that is going on, the central controller includes an event system which dictates what is happening to one or more of the progressive awards. For example, data the event system might track includes progressive award or jackpot hits, door (ALL) open/closes, EPROM errors, tilts, power errors, or any other suitable data chosen by the gaming system operator. In one embodiment, the event manager also keeps historical records, such as the last X number of progressive awards or jackpots hits. In another embodiment, at least one and preferably a plurality of transactions are stored on a regular basis. For example, progressive award amounts are stored upon an End of Day event, meter lists for one or more progressive awards are stored upon an End of Day event, the total progressive award configuration is stored, history of configuration changes (who, when, before, after) are stored, or any other suitable data desired by the gaming system operator is stored. In one embodiment, this stored data is viewable in one or more reports. In another embodiment, error processing is done by the event system of the central controller to monitor the integrity of the gaming system and identify possible problems (such as firmware not available, gaming machine unable to enter progressive award play, player suspected to have left a gaming device or any other error identified by the gaming system operator). In one embodiment, the event system is part of a server based gaming system director.

In one embodiment, the gaming device is able to communicate coin data and other communications to the accumulated value progressive award and the central controller. In one embodiment, the gaming device is able to meter a number of different data points and provide this communication to the central controller. In one such embodiment, during game play, one or more gaming devices may contribute an amount to a progressive award. In this embodiment, the gaming device communicates any updated contributions regarding the progressive award to the central controller.

In one embodiment, due to the functionality of the PM and its interaction and control of a number of progressive awards, casino-end users need to be authenticated and granted permission to use the gaming system. In one embodiment, users are created and maintained in a server based gaming system director and shared with the PM. In this embodiment, the user's password also comes from the server based gaming system director. In another embodiment, each user has a certain role level which establishes different permissions that they have.

In one embodiment, because of the "on-demand" nature of the PM system disclosed herein, licenses are used and maintained for the gaming system's software and games played. In this embodiment, these licenses are purchased from the manufacturer who enables and/or disables specific functions. In different embodiments, the licenses have an expiration date, enable for only a certain number of gaming machines to use a certain feature at one time, or incorporate any other suitable control method to ensure that the software is used fairly and each instance of use is properly bought or paid for.

In one example of game play on one embodiment of the gaming system disclosed herein, a game is played that offers a very large progressive award. In this game, the progressive award is won by hitting the top award in the base game with the maximum bet played on all paylines. In one embodiment, a bonus is also available on this game in the form of a line-initiated pick and advance game which incorporates a virtual top box wheel. In another embodiment, the virtual top box includes any suitable number of different symbol selectors, wherein if the player chooses a selection associated with a wheel spin, the player spins the wheel at the end of the bonus. In this embodiment, there are progressive slices on the wheel, wherein the number of wedges that the player has active is equal to the bet per line in the initiating game.

In another embodiment, the central controller (or progressive manager) links one progressive award across multiple themes, types of gaming devices or types of games, while still enabling each theme or type of gaming device to have its own separate progressive award that may only be won from playing a gaming device of that theme or type. In one such embodiment, a first theme of gaming devices (i.e., a bank of the same type or similar types of gaming devices) are each associated with a first progressive module, another theme of gaming devices (i.e., another bank of another type or similar types of gaming devices) are each associated with a second progressive module and both themes of gaming devices are each associated with a third progressive module. In this embodiment, a player at a first themed gaming device may be provided the progressive award(s) maintained by the first progressive module as well as the progressive award(s) maintained by the third progressive module, while a player at a second themed gaming device may be provided the progressive award(s) maintained by the second progressive module as well as the progressive award(s) maintained by the third progressive module. For example, a player at a blackjack gaming device may play for a progressive award specific to blackjack gaming devices as well as a progressive award associated with each gaming device in an entire gaming establishment. In this example, another player at a poker gaming device may play for a progressive award specific to poker gaming devices as well as the progressive award associated with each gaming device in an entire gaming establishment.

In one such embodiment, the available progressive awards are provided as a result of a game initiated outcome (i.e., symbol driven). For example, Progressive Award A is a linked progressive award available from a number of different gaming device themes or types of gaming devices. In this example, each of these gaming device themes (or types of gaming devices) includes an outcome associated with winning Progressive Award A, wherein each outcome from each of the gaming devices has the same probability of occurring (or is suitably balanced as described above such that each gaming device theme or type of gaming device is equally likely to win the progressive award for each unit wagered). In this setup, each of the themes of gaming devices has an outcome that is associated with a common linked progressive award (which triggers the common linked progressive award) and another outcome unique to that theme of gaming device (that triggers that theme's unique progressive award). As discussed above, each theme of gaming devices has parity in the odds associated with the linked progressive award, wherein each theme of gaming devices is independent regarding its own progressive award. For example, one theme of gaming devices includes a high triggering or hit frequency progressive award, while another theme of gaming devices includes a low triggering or hit frequency progressive award. In this example, if one player wants to play at a gaming device that provides smaller progressive awards more frequently, but still play for a relatively large linked progressive award, that player searches for the theme of gaming devices that matches the player's desired parameters. Conversely, if another player wants to play on a gaming device that provides medium progressive awards less frequently, but still be linked into the relatively large linked progressive award, that player searches for another theme of gaming devices that matches that player's desired parameters. It should be appreciated that this embodiment provides the player with the freedom not be tied to a specific type of game to partake in the linked progressive award gaming system in hope of winning a relatively large linked progressive award. This embodiment also provides the players a plurality of progressive awards to play for wherein at least one of these progressive awards is attainable (i.e., the progressive award that is exclusive to the theme or type of gaming device which is not shared among a large link of machines) while simultaneously providing the player a chance at the relatively large, multi-themed linked progressive award.

It should be appreciated that other possible functions for the PM could include, but are not limited to: the implementation of MLPs, gaming system triggered bonuses, time based progressive awards, split progressive awards (as described below), refund progressive awards, qualifications, weighted paytables, multi-level personal progressive awards, WAP for progressive awards, wide area accumulated value progressive awards (as described below), multi-denomination progressive awards, paytable configurable progressive enablement, variable increment rate progressive awards, or any other implementation of progressive awards that would enhance a server based gaming system environment.

Mystery Progressive

In one embodiment, the gaming devices do not provide any apparent reasons to the players for obtaining one or more of the maintained progressive awards. In this embodiment, providing the progressive awards is not triggered by an event in or based specifically on any of the plays of any primary game or on any of the plays of any secondary game of the gaming machines in the system. That is, the gaming machines may simply provide one or more of the progressive awards to the players without any explanation or alternatively with simple explanations.

In one embodiment, the gaming devices of the gaming system are operable to provide multiple progressive awards to multiple players at the multiple linked gaming devices at the same time or substantially the same time. Alternatively, the gaming devices of the gaming system are operable to provide multiple progressive awards to multiple players at the multiple linked gaming devices in an overlapping or sequential manner.

In one embodiment, the gaming system operator configures the gaming devices to be eligible to receive one or more mystery progressive awards and each progressive module manages their respective progressive award or progressive pools based on any suitable gaming system operation configuration(s). In one embodiment, providing the mystery progressive award is at least partially game triggered or symbol triggered, such as at least partially based on the play of a primary game or a secondary game at one of the gaming devices in the gaming system.

In another embodiment, the gaming system determines when to provide one or more mystery progressive awards to one or more players based on such factors as when a designed amount of wagers are placed at one or more of the gaming devices of the gaming system. That is, these accumulated value progressive awards or $N^{th}$ coin progressive awards are not symbol-driven, but rather are driven by an amount of wagers placed or a suitable coin-in amount. In one embodiment, each progressive award is associated with a range of values, wherein each progressive award will be provided to a player of a gaming device in the gaming system when the progressive award increments to a progressive award hit value within the range of values associated with that progressive award. In different embodiments, the progressive award hit value at which the progressive award is provided to one of the players is predetermined, randomly determined, determined based on the wagers placed in the gaming system, determined based on the status of one or more players (such as determined through a player tracking system), determined based on time, or determined based on any other suitable method. For example, a first progressive award maintained by a first progressive module is associated with a value range of $10 to $100, a second progressive award maintained by the first progressive module (or alternatively maintained by another progressive module) is associated with a value range of $50 to $250, and a third progressive award maintained by the first progressive module (or alternatively maintained by another progressive module) is associated with a value range of $100 to $1,000. In this example, the first progressive award will be provided to a player at a gaming device associated with the first progressive module when the value of the first progressive award is in the range of $10 to $100. Additionally, the second progressive award will be provided to a player at a gaming device associated with the first progressive module (or at a gaming device associated with another progressive module) when the value of the second progressive award is in the range of $50 to $250 and the third progressive award will be provided to a player at a gaming device associated with the first progressive module (or at a gaming device associated with another progressive module) when the value of the third progressive award is in the range of $100 to $1,000. In one embodiment, a plurality of the progressive awards are associated with different value ranges. In another embodiment, each of the progressive awards is associated with a different value range. In another embodiment, a plurality of the progressive awards are associated with the same value range.

In another embodiment, the value range associated with the progressive award a player plays for is based on a player's status (via a player tracking system). For example, a bronze level player may play for a progressive award associated with a value range of $10 to $100, a silver player may play for a progressive award associated with a value range of $200 to $500 and a gold player may play for a progressive award associated with a value range of $1000 to $5000.

In one embodiment, the progressive module which hosts one of these mystery accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) provides the progressive award or prize pool when the progressive award or prize pool equals the determined accumulated value progressive award hit value. In this embodiment, the accumulated value progressive award hit value is determined at random by a RNG to maintain fairness for the players at the gaming devices in the gaming system, wherein the players are not aware of any determined accumulated value progressive award hit value.

In different embodiments, these accumulated value progressive awards are applied to any combination of different paytables, games, or denominations. For example, an accumulated value progressive award includes grouping similar gaming elements together, such as a casino grouping all gaming devices from a bank to an accumulated value progressive award, grouping all nickel denomination gaming devices to an accumulated value progressive award, or grouping games using a designated paytable together to an accumulated value progressive award. It should be appreciated that the ability to pick and choose these groupings is unlimited and, as described above, may be easily and dynamically changed. Accordingly, this embodiment enables gaming establishments to design and group gaming devices to play for accumulated value progressive awards which most attracts players.

In one embodiment, as described in more detail below, one or more accumulated value progressive awards are implemented via a player tracking system. In this embodiment, the player tracking system and/or central controller timely tracks when a player inserts their playing tracking card (i.e., Card In) to begin playing for one of these accumulated value progressive awards. The player tracking system and/or central controller also timely tracks when a player removes their player tracking card (i.e., Card Out) when concluding play for one of these accumulated value progressive awards. By this tracking, the gaming system does not provide one of these progressive awards to an empty or un-carded gaming device. In one embodiment, upon card-in, if the player is playing an enrolled paytable, denomination, or gaming device, the player's coin-in begins incrementing into the appropriate accumulated value progressive award. In this embodiment, when the player moves to a paytable, denomination or gaming device that is not associated with the accumulated value progressive award, the gaming system stops incrementing the accumulated value progressive award based on the player's coin-in. In one embodiment, the gaming system displays a message to the player regarding this ending of the accumulated value progressive award gaming session. For example, possible game changes that might cause an ending to the accumulated value progressive award gaming session for one or more gaming devices include: a change to a game that is not enrolled in the accumulated value progressive award gaming session, a player no longer betting at a required level or speed, a player no longer playing a paytable or denomination associated with the accumulated value progressive award or any other quantifying criteria desired by the gaming system operator. In these embodiments, accumulated value progressive award gaming sessions are defined by the events that enables the gaming device to remain classified under the same progressive award. That is, a player can change bets, change the number of coins bet, and even change games played and still remain in the same gaming session as long as these events are all classified and enrolled under the same accumulated value progressive award gaming session.

In the embodiment above, a Card In event starts the accumulated value progressive award gaming session and the player's coin-in begins at this point. In this manner, the carding of the player ensures the person who actually "wins" the accumulated value is provided the accumulated value progressive award because such an accumulated value progressive award is associated with the player tracking card and not the gaming machine. In another embodiment, the incrementing of wagers to an accumulated value progressive award starts when the gaming machine is activated. In this instance, the central controller knows only that the gaming machine is being wagered on and keeps track of these wagers. If the gaming machine is chosen as the winner of the accumulated value progressive award, the central controller provides that progressive award to the gaming machine (and not necessarily to the player who may have been responsible for the accumulated value or the majority of the coin-in recorded from that gaming machine).

In one embodiment, the accumulated value progressive award hit value is selected based on a random number. In this embodiment, the determined accumulated value progressive award hit value is selected over the entire range of numbers (i.e., each number in the entire range of numbers has an equal probability of being selected) for a designated accumulated value progressive award. In another embodiment, the accumulated value progressive award hit value is selected based on a weighted accumulated value. In this embodiment, the determined accumulated value progressive award hit value is selected based on one or more weighted sub-ranges, wherein each sub-range has a certain chance or percentage of being selected. For example, if the accumulated value ranges from 0 to 100 with ten sub-ranges, each of the sub-ranges contains ten entries and is weighted such that the total probability among all ranges is equal to 100%. In this embodiment, one sub-range is associated with a 25% chance of being selected, while another sub-range is associated with a 5% chance of being selected. The gaming machine randomly chooses one of the sub-regions based on the appropriate weights and then randomly chooses one of the ten entries in the sub-range to determine the actual accumulated value progressive award hit value. This method gives the gaming system operator increased control of the bonus contribution and the size of the accumulated value progressive award.

In one embodiment, once the gaming system determines that an accumulated value progressive award will be provided to a player at a gaming device, the gaming system determines which player will be provided the accumulated value progressive award utilizing one or more algorithms. In one such embodiment, due to the high volumes of coin-in and the possibility of a plurality of wagers simultaneously made, the gaming system organizes the different coin-in amounts into different coin-in chunks or coin-in groups. In one embodiment, a coin-in chunk or coin-in group is a total amount of coin-in from the end of a first time interval to the end of a second time interval. In another embodiment, a coin-in chunk or coin-in group is an amount of coin-in.

In one embodiment, the gaming system utilizes player tracking cards of a player tracking system to organize one or more player's coin-in into the appropriate coin-in chunks. In another embodiment, the gaming system utilizes a first processor to maintain the progressive awards and one or more secondary processors to track the amount of coin-in at one or more gaming machines in the gaming system. In one such embodiment, the gaming system utilizes one or more sub-controllers to track the amount of coin-in. In this embodiment, each sub-controller is associated with a plurality of gaming devices and each sub-controller collects coin-in data from its associated gaming devices. This coin-in data is classified or organized into one or more coin-in chunks.

In one embodiment, when a sub-controller creates a complete chunk of coin-in (e.g., either after the end of a designated time interval or when a designated amount of coins-in have been accumulated), the sub-controller communicates the created chunk of coin-in to the central controller. For example, for every 1000 monetary units of coin-in, a first sub-controller will create a coin-in chunk and communicate the created coin-in chunk to the central controller. In another example, every 30 seconds, a second sub-controller will create a coin-in chunk of all the monetary units wagered at the gaming devices associated with the second sub-controller during the previous 30 second time interval and communicate that created coin-in chunk to the central controller.

In these embodiments, the gaming system collects coin-in chunks over different intervals from either the individual gaming machines, one or more sub-controllers or one or more player-tracking cards (which are each individually associated with a player). In one such embodiment, gaming machines are associated with sub-controllers based on one or more factors including, but not limited to, the denomination of the gaming machine, the type of gaming machine, the location of the gaming machine, the manufacturer of the gaming machine, the player currently playing the gaming machine, a designated time period associated with the gaming machine or any other suitable factor. For each collected chunk, the gaming system tracks which gaming machines (or players) contributed to the coin-in chunk and the amount of coin-in contributed by each gaming machine (or player).

For each collected coin-in chunk, the amount of coin-in associated with the collected coin-in chunk is added to the accumulated value progressive award and a determination occurs if the added coin-in chunk puts the accumulated value progressive award at or over the determined accumulated value progressive award hit value. If the added coin-in chunk does not put the accumulated value progressive award at or over the determined accumulated value progressive award hit value, this process is repeated for the next collected coin-in chunk. If the added coin-in chunk puts the accumulated value progressive award at or over the determined accumulated value progressive award hit value, the central controller selects a winner of the accumulated value progressive award.

In one embodiment, to select a winner, the central controller creates a matrix with one slot per monetary unit of the coin-in amount. In this embodiment, each gaming machine (or player) that contributed to the coin-in chunk (which put the accumulated value progressive award at or over the determined accumulated value progressive award hit value) is lined up and is allocated one or more slots in the matrix, such that one slot is provided for each monetary unit of coin-in that the gaming machine (or player) contributed to the coin-in chunk. The central controller randomly selects one slot in the matrix and the gaming machine (or player) allocated to the selected slot is designated as the winner and provided the accumulated value progressive award. For example, if an added coin-in chunk of 1000 monetary units put the accumulated value progressive award at or over the determined accumulated value progressive award hit value, a first player contributed 400 monetary units to the coin-in chunk and a second player contributed 600 monetary units to the coin-in chunk, then the first player is allocated 40% of the slots of the matrix and the second player is allocated 60% of the slots of the matrix. In this example, the central controller randomly selects one of the slots of the matrix wherein the first player has a 40% chance of having an allotted slot selected (and winning the accumulated value progressive award) and the second player has a 60% chance of having an allotted slot selected (and winning the accumulated value progressive award).

In another embodiment, if the added coin-in chunk puts the accumulated value progressive award at or over the determined accumulated value progressive award hit value, the central controller instructs or causes the appropriate sub-controller (i.e., the sub-controller which communicated the coin-in chunk which put the accumulated value progressive award at or over the determined accumulated value progressive award hit value) to select a winner. In one embodiment, as described above, the sub-controller selects one of its associated gaming devices based on how much each gaming device contributed to the coin-in chunk which put the accumulated value progressive award at or over the determined accumulated value progressive award hit value associated of the accumulated value progressive award. In different embodiment, the sub-controller selects one of its associated gaming devices based on a random determination, based on one or more side wagers placed, based on the player's primary game wager, based on the player's status (such as determined through a player tracking system), based on a level of a progressive award, based on time (such as the time of day) or based on any other suitable method or criteria.

In another embodiment, the gaming system determines when to provide one or more mystery progressive awards to one or more players based on a predefined variable reaching a defined parameter threshold. For example, a triggering event occurs and a mystery progressive award is provided to a player when the $500,000^{th}$ player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for the progressive.

In another embodiment, the gaming system determines when to provide one or more mystery progressive awards to one or more players based on time. In this embodiment, upon initiation of a designated progressive module (i.e., a progressive module is activated, reset or otherwise initiates maintaining one or more progressive awards), a time is set for when one of the progressive awards maintained by the progressive module will be awarded. In one embodiment, such a set time may be based on historic data. For example, if previous progressives have reached $5 million after approximately sixty-seven days, the initiated progressive module may be set to cause a triggering event to occur and cause a gaming device associated with the initiated progressive module to provide a mystery progressive award to a player sixty-seven days from the time when the progressive award was reset.

In one embodiment, a suitable algorithm is implemented to determine the player who wagered at or closest to this time with tie-breaking based on any number of factors (e.g., player tracking history, amount of or recent wagers placed). In this embodiment, the progressive award is provided to the player who the algorithm determined wagered closest to when the mystery progressive award is triggered. In another embodiment, one of the players who wagered on a gaming device associated with the initiated progressive module during a mystery bonus time is randomly determined and the mystery progressive award is provided to the selected player. In another embodiment, rather than incrementing a progressive award based on coin-in, a progressive award is incremented based on time. In this embodiment, for each designated time interval, the progressive award is incremented a designated amount. In one such embodiment, the gaming system utilizes a tiered increment rate wherein a progressive award begins incrementing a designated amount for each designated time interval, but as the progressive award increases in value (or after a certain amount of time), the progressive award increments by a lesser amount and/or a longer time interval. This embodiment provides that a progressive award will increment or increase in value relatively quickly at the onset and then slow down as the progressive award grows in value after one or more thresholds are reached.

In another embodiment, the gaming system determines when to provide one or more mystery progressive awards to one or more players based upon gaming system operator defined player eligibility parameters stored on a player tracking system (such as via a player tracking card or other suitable manner). For example, a gaming system operator may choose to only enable players of the highest player tracking status to be eligible for a mystery bonus. In this embodiment, the parameters for eligibility are defined by the gaming system operator based on any desired criterion. In one embodiment, the progressive module manager of the central controller recognizes the player's identification (via the player tracking system) when the player inserts their player tracking card in the gaming machine. The progressive manager communicates with the central server to determine the player tracking level of the player and the current player tracking level defined by the gaming system operator as eligible for the mystery progressive award. In one embodiment, the gaming system operator defines minimum bet levels required for the mystery progressive award based on the player's card level. In this embodiment, different bet amounts are required to be eligible to receive different progressive award levels. Once the progressive module manager determines which players are eligible, any suitable method for awarding the mystery progressive award may be employed.

In another embodiment, the gaming system determines when to provide one or more mystery progressive awards to one or more players based on a random selection by the server. In this embodiment, the progressive module manager includes a tracking module to keep track of all active gaming machines and the wagers placed at these gaming machines. Each gaming machine would have its own entry defining its state as either active or inactive and also defining the values of the wagers placed at that gaming machine. Based on the gaming machine's state as well as one or more wager pools associated with the gaming machine, the progressive module manager determines which of these gaming machines will provide one or more mystery progressive awards. In one embodiment, a player who consistently places a higher wager would be more likely to receive the mystery progressive award than a player who consistently places a minimum wager.

In another embodiment, the gaming system determines when to provide one or more mystery progressive awards to one or more players based on determining if any numbers allotted to a gaming device match a randomly selected number. In this embodiment, upon or prior to each play of each gaming machine associated with a progressive module, a gaming device or the central server selects a random number from a range of numbers and during each primary game, the gaming machine or the central server allocates N numbers in the range, where N is the number of credits bet by the player in that primary game. At the end of the primary game, the randomly selected number is compared with the numbers allocated to the player and if a match occurs, that particular gaming machine is provided all or part of the progressive award maintained by the progressive module associated with that particular gaming machine.

Another embodiment of the gaming system disclosed herein includes a multi-denomination progressive award with player selectable options. In this embodiment, a player is enabled to set their wager on the gaming machine and still be eligible for the progressive award even though different players at different gaming machines are placing different wager amounts for the same progressive award. It should be appreciated that the accounting for this embodiment of the gaming system is done in dollar or monetary units (such as with a base of 1 cent) as opposed to credits to account for the different credit "values" among the different denominations. It should be further appreciated that tracking in monetary units accounts for gaming machines having multi-denominations, gaming machines having different denominations and/or gaming machines which accept different currencies. For example, even though a penny gaming machine considers a penny one credit and a dollar gaming machine considers a dollar one credit, for accounting purposes with respect to this example of a gaming system, the penny gaming machine accounts a wager of one penny to be a wager of one monetary unit and the dollar gaming machine accounts a wager of one dollar to be a wager of one-hundred monetary units. Such accounting serves to ensure that the progressive gaming system remains fair for all players.

In another embodiment, the determination of when to provide one of the progressive awards and to which gaming machine is determined by the central server. In another embodiment, the determination of when to provide one of the progressive awards and to which gaming machine is determined by one of the gaming machines, wherein the paytables are adjusted to reflect the varying contributions to the progressive pool. In these embodiments, the central server keeps track of the contributions from each gaming machine based on the number of monetary units they have wagered at each gaming machine. In one embodiment, the central server utilizes this information in determining a winner. For example, a weighted random determination could occur wherein Player A has contributed 300 credits and Player B has contributed 700 credits to the current pool of 1000 credits. Upon deciding to award the 1000 credits, the gaming machine or central server allots Player A a 30% chance of being awarded the progressive award and Player B a 70% chance. In one embodiment, choosing the winner includes allotting Player A the numbers 1 to 30 and Player B the number 31 to 100. In this embodiment, a random number generator chooses a number from 1 to 100 and whichever player is associated with the number which matches the randomly generated number is provided the progressive award. It should be appreciated that even though Player A wagered at a denomination and level less than Player B, Player A is still afforded a chance at winning the progressive award.

In another embodiment of the gaming system disclosed herein, using the above-described multi-denomination feature, the determination of when to provide one of the progressive awards and to which gaming machine is determined by one of the gaming devices based on a game play trigger, such as a specific symbol combination. In this embodiment, certain limitations may be enforced, such as requiring the same bet from all players who are eligible in the system or using different paytables, to enable players wagering on the higher denomination gaming machines to have a greater chance of achieving the winning combination. For example, a gaming system could have a nickel gaming machine and a quarter gaming machine attached to or otherwise associated with the same progressive module. In one embodiment, to accommodate the differences in denomination, the player at the quarter gaming machine is only required to wager one coin per line wherein the player at the nickel gaming machine is required to wager five coins per line. Likewise, in another example, the paytables of the game are altered to compensate for the difference wherein if both players were betting one coin per line, the player at the quarter gaming machine has a 1 in 7,000,000 chance of winning the progressive award maintained by the progressive module while the player at the nickel gaming machine has a 1 in 35,000,000 chance of winning the progressive award maintained by the progressive module.

Side Bets

In one embodiment, the central server utilizes one or more side bets to determine which gaming machines are associated with which progressive modules and thus which gaming machines may provide which progressive awards. In this embodiment, the player is enabled to place a side bet, side wager, or side bet wager for each progressive game or progressive award they wish to be eligible to win. Once the player places a side bet for a designated progressive award, the central server connects the player's gaming machine to the associated progressive module which maintains the designated progressive award. That is, in addition to each gaming device adapted to provide the progressive award associated with that gaming device (i.e., the gaming device's primary or default progressive award), the central server enables players at one or more gaming devices in the gaming system to place side bets on one or more progressive awards associated with other gaming devices (i.e., supplemental progressive awards). It should be appreciated that in one embodiment, if a player is playing a first gaming machine and the player places a side bet on a progressive award at a second, different gaming machine, any award provided during the primary game and/or secondary game of the second gaming machine is independent of the amount of the side wager placed by the player at the first gaming machine.

Figure 6:
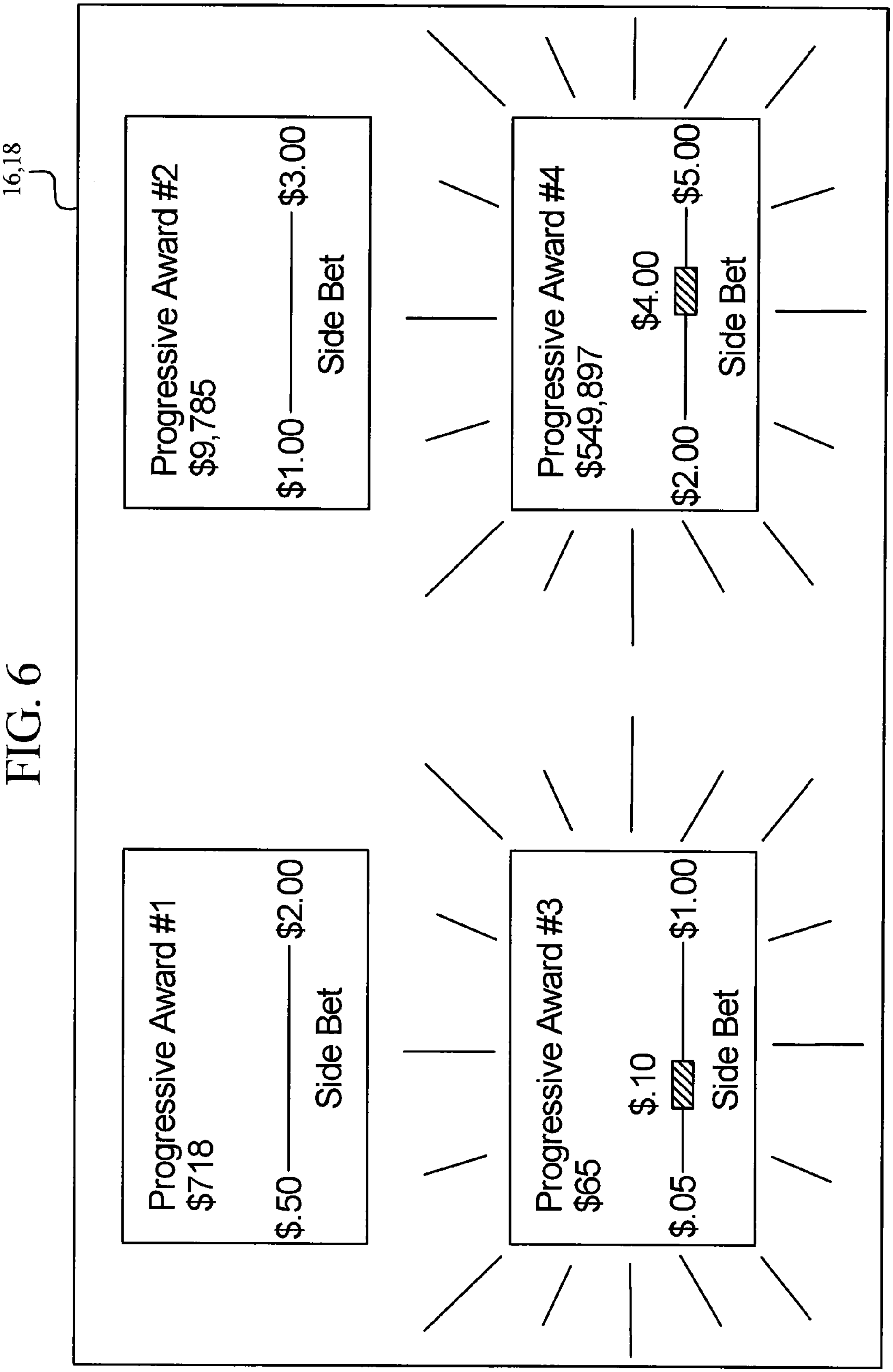
FIG. 6 is a menu illustrating each of the supplemental progressive awards which a player may place a side wager on and the range of side wagers which may be placed for each of such supplemental progressive awards.

For example, as illustrated in FIG. 5, one or more gaming devices display a screen or menu which enables a player to select from a plurality of different progressive awards (associated with different banks of gaming devices) maintained by the central server which the player wishes to wager on. In this embodiment, the player selects which side bets to wager on and the gaming device is connected to or otherwise associated with the progressive module which maintains the progressive award(s) the player placed each side wager on. FIG. 6 illustrates another example wherein the player(s) at one or more gaming machines are each provided a screen or menu of the progressive awards the player(s) may wager on. In one embodiment, each progressive award is associated with a range of side bets which the player may place on such progressive awards. As seen in FIG. 6, in this example, a player selected to place a side bet or side wager of $0.10 on highlighted progressive award #3 and also place a side bet or side wager of $4.00 on highlighted progressive award #4. In one embodiment, to be eligible to win a supplemental progressive award, a side bet placed by a player must be of at least a designated amount. In one such embodiment, different side bet amounts are required for different progressive awards. In another such embodiment, each side bet placed by each player in the gaming system must be equal or substantially equal.

Figure 7:
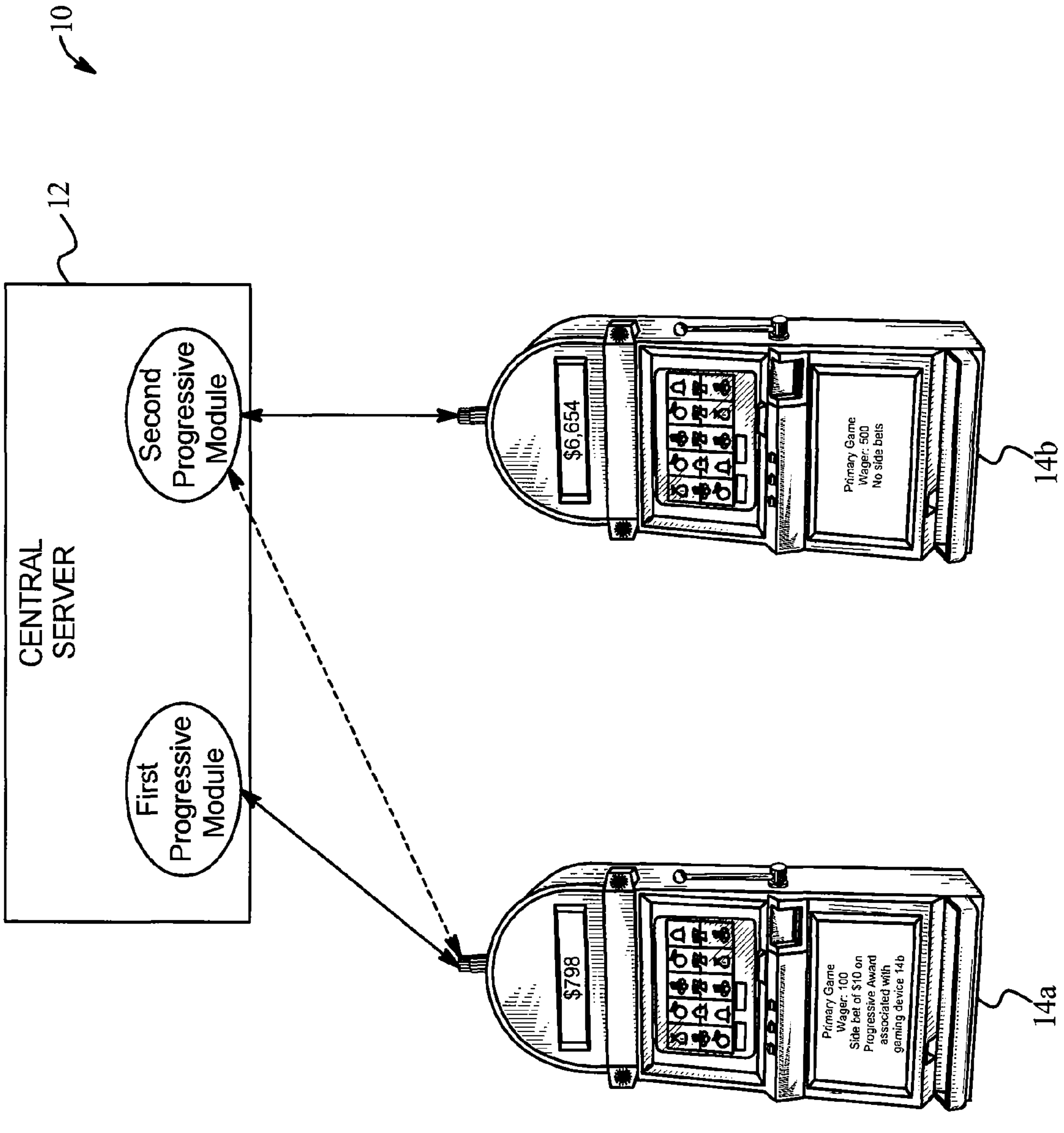
FIG. 7 is a schematic diagram of the central server in communication with a plurality of gaming devices in accordance with one embodiment of the gaming system disclosed herein wherein a player at a first gaming device places a wager on a progressive award associated with a second gaming device.

For example, as illustrated in FIG. 7, if a first player at gaming device 14*a* (which is associated with a progressive award of $798 and is further associated with a first progressive module) places a side bet or side wager on a progressive award of $6,654 associated with gaming device 14*b* (which is associated with a second progressive module), the first player's side bet causes the central server to temporarily associate gaming device 14*a* with the second progressive module, thus providing the first player at gaming device 14*a* a chance of obtaining the progressive award associated with gaming device 14*b*. In this embodiment, the progressive award associated with gaming device 14*a* is designated or classified as the default or primary progressive award and the progressive award associated with gaming device 14*b* is designated or classified as a supplemental progressive award. It should be appreciated that the classifications as primary or supplemental progressive awards is relative to each specific gaming device. That is, if a second player at gaming device 14*b* placed a side wager on the progressive award of $798 associated with gaming device 14*a*, then the progressive award of $798 associated with gaming device 14*a* would be designated or classified as a supplemental progressive award for gaming device 14*b* (and the progressive award of $6,654 associated with gaming device 14*b* would be designated or classified as the default or primary progressive award). In other words, the same progressive award may be classified as a default or primary progressive award for at least one gaming device and also as a supplemental progressive award for one or more different gaming devices.

In one embodiment, a defined relationship or ratio exists between a primary game wager for a first gaming device and a side bet (to be eligible for the progressive award associated with the first gaming device) placed by a second player at a second gaming device. In one embodiment, the side bet placed by a second player at a second gaming device must be at least a predefined portion or percentage of a primary game wager at a first gaming device. In one such embodiment, the side bet placed by the second player at the second gaming device must be at least a designated portion or percentage of the maximum wager which may be placed on the primary game of the first gaming device. For example, if the first player at gaming device 14*a* is betting 100 coins (which may, for example, be the bet required to be eligible for the progressive award associated with gaming device 14*a*) and 5% or 5 coins of the first player's wager funds the progressive award associated with gaming device 14*a* (with the remaining 95% or 95 coins funding the play of the primary game), then a second player at gaming device 14*b* must place a side bet or side wager of 5 coins to obtain a chance of winning the progressive award associated with gaming device 14*a*. Moreover, if the second player at gaming device 14*b* is betting 500 coins (which may, for example, be the bet required to be eligible for the progressive award associated with gaming device 14*b*) and 2% or 10 coins of the player's wager funds the progressive award associated with gaming device 14*b* (with the remaining 98% or 490 coins funding the play of the primary game), then the first player at gaming device 14*a* must place a side bet or side wager of 10 coins to obtain a chance of winning the progressive award associated with gaming device 14*b*. Accordingly, this side bet embodiment provides for equal betting between both types of players (i.e., the player currently playing a designated gaming device and any players not currently playing the designated gaming device who wish to place a side bet on the progressive award associated with the designated gaming device) to be eligible for the progressive award associated with the designated gaming device. In one embodiment, the central controller weights the entries so both types of players are given a fair and equal chance at the progressive based on their wagers. That is, the central controller sets the bet requirements so the side bet is essentially equated to someone playing for the progressive award on the default gaming device.

In another embodiment, a weighted entry into the progressive is utilized wherein equal bets are not required. In this embodiment, for each side bet placed, the gaming system determines the chances of winning the progressive award the side bet was placed on in relation to the player's side bet wager amount, wherein the greater the side bet, the greater the odds of winning the progressive award the side bet was placed on. Referring back to the above example, the second player at gaming device 14*b* is still betting 500 coins at a 2% entry into the progressive associated with gaming device 14*b*. Meanwhile, the first player at gaming device 14*a* has upped their side wager to 20 coins. Accordingly, the central server appropriately weights both player's entries such that the first player at gaming device 14*a* now has twice the chance to win the progressive associated with gaming device 14*b* than the second player at gaming device 14*b*. That is, because the first player at gaming device 14*a* is contributing to the progressive associated with gaming device 14*b* at twice the rate as the second player currently playing gaming device 14*b*, the first player at gaming device 14*a* has increased their odds of winning the progressive award associated with gaming device 14*b*. In this embodiment, when selecting a winner, if any, the central server takes into account each player's side bet wager in comparison to the side bet wagers of any other players. In these embodiments, a predefined relationship exists between the amount of a player's side bet and the player's odds of winning the progressive award which they placed a side bet on. It should be appreciated that any appropriate weighting method could be used as well as any appropriate betting requirements.

In one such embodiment, two different players each play for the same progressive award off of two different gaming devices. For example, Player A is playing for a progressive award of $10,000 as part of their gaming bet (i.e., the progressive award is associated with Player A's gaming device and may be provided during a play of Player A's primary wagering game) and Player B is playing for the same progressive award of $10,000 by placing a side bet to be eligible to win that progressive award. In this example, Player A wagers $1.00 for each play or spin of the base game to be eligible for the progressive award, wherein one percent (1%) of each of Player A's wagers is contributed to the progressive award and the remaining portion of each of Player A's wagers is used to fund the base game of Player A's gaming device. Moreover, to be eligible to be enrolled to win the progressive award, Player B places a side bet wager of $0.20. In a first embodiment, the entire amount of a side-bet player's wager (i.e., Player B's $0.20 side-bet) is contributed to the progressive award. In another embodiment, only a portion of a side-bet player's wager is contributed to the progressive award, wherein that player's odds of winning the progressive award are adjusted accordingly depending on the portion contributed to the progressive award.

In the above-described example, Player A's wager funds the progressive award at a rate of $0.01 per play ($1.00×1% contributed towards the progressive award) and thus Player A has the odds of 1 in 1,000,000 ($10,000/0.01) of winning the progressive award. In a first example, wherein Player B's entire side-wager is contributed to the progressive award, Player B's odds of hitting the progressive award are 1 in 50,000 ($10,000/0.20). In a second example, where only a portion of Player B's side-wager is contributed to the progressive award, if fifty percent (50%) of Player B's side-wager is contributed to the progressive award (with the other fifty percent (50%) of Player B's side-wager contributed elsewhere), Player B's odds of hitting the progressive award are 1 in 100,000 ($10,000/0.10). It should be appreciated that a split of the side bet's contribution to the progressive award may be done in any suitable manner, such as 75% of a player's side-wager contributing to the progressive award and 25% of the player's side-wager allocated elsewhere.

In different embodiments, a portion of a player's side-wager that is not contributed to the progressive award is allocated to one or more randomly provided consolation prizes, allocated to a gaming establishment for offering one or more side bet progressive awards, allocated as a form of payback to a player or allocated in any other suitable manner. In one embodiment, a portion of a player's side-bet is allocated back to the player to award the player for making the side bet. In this embodiment, since the odds of a player winning a progressive award on a side-bet may be low (i.e., if the player is making a relatively low side bet) by providing the player with another award for their side-bet wager (in addition to the chance of winning the progressive award), the player experience increased entertainment and enjoyment.

It should be appreciated that in these embodiments, the odds of a player winning the progressive award are calculated by dividing the progressive award hit value by the player's progressive award contribution value. Conversely, an expected value of a progressive award is calculated by determining the odds of winning the progressive award and multiplying the player's progressive award contribution value by these odds. It should be further appreciated that a progressive award may be triggered (in any suitable manner as described above) and provided to a player either before, at, or after the progressive award increments to that progressive award's expected return.

In a first example including an accumulated value progressive award with one or more side bet wagers, an accumulated value progressive award hit value is determined to be $50,000. In this example, monitoring of coin-in chunks is utilized to determine when to provide this progressive award to a player, wherein a single coin-in is registered to or otherwise associated with the current chunk for each $1.00 wager placed by Player A (i.e., a 1% contribution rate to the progressive award) and forty coins-in are registered to or otherwise associated with the current chunk for Player B's side-bet of $0.40 (i.e., a 100% side-bet contribution rate to the progressive award). If a coin-in chunk includes one play by Player A and one play by Player B and the current coin-in chunk is responsible for putting the accumulated value progressive award at or over the accumulated value progressive award hit value, then a matrix of 41 slots is created (as described above). In line with each player's wager contributions to the accumulated value progressive award, Player B is allocated or otherwise associated with 40 slots in the matrix and Player A is allocated or otherwise associated with 1 slot in the matrix. Thus, Player B has a 40/41 chance of winning the accumulated value progressive award and Player A has a 1/41 chance of winning the accumulated value progressive award. Accordingly, as Player B's contribution to the accumulated value progressive award (40 coins) is 40 times that of Player A's contribution to the accumulated value progressive award (1 coin), Player B's chance of winning the accumulated value progressive award is approximately 40 times that of Player A's chance of winning the accumulated value progressive award.

In another embodiment including a progressive award with one or more side-bet wagers, the central controller (or one or more individual gaming devices) randomly determines when to provide the progressive award at any time based on one or more probabilities. In this embodiment, a gaming system operator assigns odds to providing the progressive award in line with the value the gaming system operator wishes the progressive award to hit at. That is, if a high progressive award value is desired, the gaming system operator assigns lower odds of a gaming device providing the progressive award. On the other hand, if a low progressive award value is desired, the gaming system operator assigns higher odds of a gaming device providing the progressive award. In one embodiment, for each coin-in wagered by a player, the central controller (or gaming device) determines, in any suitable manner, whether to provide that player the progressive award. In one embodiment, this determination is made for each play of a game. In another embodiment, a separate pool is kept for each player and this determination is made at certain designated intervals.

For example, for each $1.00 wager placed by Player A, a single coin-in is registered to or otherwise associated with Player A (i.e., a 1% contribution rate) and for each $0.10 side bet wager placed by Player B, ten coins-in are registered to or otherwise associated with Player B. In this example, for each coin-in registered to a player, the gaming system determines, for each played game, whether to provide that player the progressive award. For example, if a progressive award has odds of triggering for each registered coin-in of 1 in 500,000, then Player A has a 1 in 500,000 chance of winning the progressive award for each game played and Player B has a 1 in 50,000 chance (or a 10 in 500,000 chance) of winning the progressive award for each game played. It should be appreciated that since Player B's contribution rate to the progressive award is ten times Player A's contribution rate to the progressive award, Player B has a ten times greater chance of winning the progressive award for each game played. In this example, the average expected value of the progressive award is $5,000 (500,000×0.01). It should be appreciated that the progressive award may be provided to the player below, at, or above this average expected value depending on the outcome of the random determinations.

It should be appreciated that in one embodiment, altering the player's odds of winning a supplemental progressive award does not apply to the embodiments described above wherein the determination of which player, if any, wins the supplemental progressive award is based on a generated symbol or symbol combination. That is, if the determination of winning the supplemental progressive award is symbol driven, then once a player is eligible for a chance to win the supplemental progressive award, the player's odds of winning the supplemental progressive award are fixed (and dependent on the fixed probabilities associated with the symbols) and does not change regardless of the amount of the side bet placed on the supplemental progressive award. In one embodiment, for a symbol driven progressive award (i.e., a progressive award triggered by a generated symbol or symbol combination) each player is required to place the same wager amount, regardless of if the wager is a side-wager or a primary game wager. For example, if a game requires a primary game wager of $1.00 to play and the progressive award contribution rate is 1%, a side-bet player is required to place a side wager of $0.01 (if the entire wager is applied to the progressive award contribution).

In one example of this embodiment wherein each player must place the same wager, Player A is placing a primary game wager and Player B is placing a side-bet wager wherein an outcome on Player B's gaming device must be associated with the progressive award. In this example, if the odds or probability of Player A's gaming device generating a symbol-driven progressive award outcome (i.e., the symbol or symbol combination associated with the progressive award) is 1 in 2,000,000, a symbol-driven outcome with the same 1 in 2,000,000 odds probability of being generated (or a combination of a plurality of symbol-driven outcomes resulting in the same total probability) must be found on Player B's gaming device. Once a symbol-driven outcome associated with the same probability of being generated is identified on Player B's gaming device, that outcome is also associated with the progressive award. In this example, if a "7-7-7" symbol combination is associated with the odds of 1 in 2,000,000 (and a payout of 50,000 coins) on Player B's gaming device, the gaming system associates the "7-7-7" symbol combination with the symbol-driven progressive award which Player B placed a side-bet on. Hence, if Player B hits the "7-7-7" symbol combination after placing a side bet, Player B is provided both the payout of 50,000 coins and the symbol-driven progressive award.

In one embodiment wherein the determination of which player, if any, wins the supplemental progressive award is based on a generated symbol or symbol combination, the gaming system may utilize one or more probability equating sequences, such as a selection game or a wheel, to equate for different gaming devices including different odds of generating different symbol combinations. For example, if the odds of a player winning a first symbol driven progressive award are one in one-million and a player at a first gaming device places a side bet on the first symbol-driven progressive award, the first gaming device must include a symbol combination which is theoretically generated once every million plays. If the first gaming device includes at least one symbol combination which is theoretically generated once every million plays, the first gaming device temporarily associates this symbol combination with the first symbol-driven progressive which the player placed a side bet on. On the other hand, if the first gaming device does not include at least one symbol combination which is theoretically generated once every million plays, the first gaming device utilizes a probability equating sequence to create an event which is associated with the odds of occurring as one in one-million. For example, if the first gaming device includes at least one designated symbol combination which is theoretically generated once every one-hundred-thousand plays, the first gaming device couples one of these symbol combinations with a probability equating sequence which is associated with an odds of success of one in ten. Accordingly, the total odds of the first player at the first gaming device obtaining the designated symbol combination and also obtaining a successful result in the probability equating sequence are one in one-million (i.e., equivalent to the odds of success for the first symbol-driven progressive). In other words, if a first gaming device includes a symbol event associated with a first probability of triggering a symbol-driven progressive and if a second gaming device does not include a symbol event associated with the first probability of triggering the symbol-driven progressive, the second gaming device utilizes one or more probability equating sequences to derive an event associated with the first probability of triggering the symbol-driven progressive. In one embodiment, if a player places a side-bet wager on a supplemental progressive award, the gaming device displays a side bet game to the player. In this embodiment, if the side bet game results in an outcome associated with the side bet progressive award, the player is provided the progressive award; however if the side bet game results in any other outcome, the player is not provided any awards for the side bet game.

In one example wherein the same wager amount is not required, Player A is playing a primary wagering game associated with a symbol-driven progressive award, wherein $0.01 of Player A's wager is contributed to the progressive award and the odds of Player A's gaming device generating the progressive award outcome is 1 in 2,000,000. In this example, Player B is placing a side wager of $0.25 on the symbol-driven progressive award and $0.25 of Player B's wager is contributed to the progressive award (i.e., Player B is contributing 25 times more to the progressive award than Player A). In one such example, Player B's gaming device communicates with the central controller to find a symbol combination with odds of 1 in 80,000 (2,000,000/25) and Player B's gaming device (or the central controller) associates this found symbol combination with the progressive award outcome. This association equates the value of each player's contribution to the progressive award to their actual chance of generating a symbol combination associated with the progressive award. In one embodiment, restrictions are placed on the side wager to ensure the gaming system is able to find the proper symbol combination. In this embodiment, a side wager may be rejected if the gaming system is unable to make the associations required.

In another embodiment wherein the same wager amount is not required, the gaming system does not modify or reassociate any symbol combinations on the gaming device which a player placed a side-bet on. In this embodiment, a side-bet player's gaming device displays a cycling through a number of plays of a primary game player's gaming device (which may be displayed via a small pop-up or any other suitable manner), wherein the number of plays is based on the player's side bet. For example, if Player A is playing a primary wagering game associated with a symbol-driven progressive award (wherein as described above, $0.01 of Player A's wager is contributed to the progressive award and the odds of Player A's gaming device generating the progressive award outcome is 1 in 2,000,000) and Player B is placing a side wager of $0.25 on the symbol-driven progressive award (wherein as described above, $0.25 of Player B's wager is contributed to the progressive award), then while Player B is playing their own base game, Player B's gaming device displays a cycling through of twenty-five plays of Player A's base game to see if the progressive outcome occurs. In this example, Player B is only provided an award for a winning progressive outcome (as the progressive award is all that Player B's side-bet wager funded). It should be appreciated that the 25 chances displayed to Player B for each chance at the progressive award provided to Player A is relative to each player's relative contribution rate to the progressive award (i.e., Player B contributed 25 times as much as Player A). It should be further appreciated that the odds of the progressive award outcome occurring for each play displayed on Player B's gaming device is equal to the same odds of the progressive award outcome occurring that Player A's gaming device has, wherein the difference is that Player B is given 25 chances at the progressive award outcome for each side wager. In one embodiment, a maximum side bet limit is imposed to limit the number of plays a player receives as to not cause the base game played on Player B's gaming device to be idle for too long as Player B awaits their side bet outcome. In one embodiment, appropriate messaging, such as "Win your side bet Progressive with an outcome of 7-7-7" may be provided through any suitable audio, audio-visual or visual devices.

In another embodiment, no base game is required to be played for a player placing one or more side-bets. For example, Player B may play for a side bet progressive award outcome only and not play any base games on Player B's gaming device. It should be appreciated that the requirement of no base games works better for certain types of progressive awards, wherein the requirement of whether or not a base game is required may be different for different types of progressive awards, different types of base games, or any other criteria.

Figure 8:
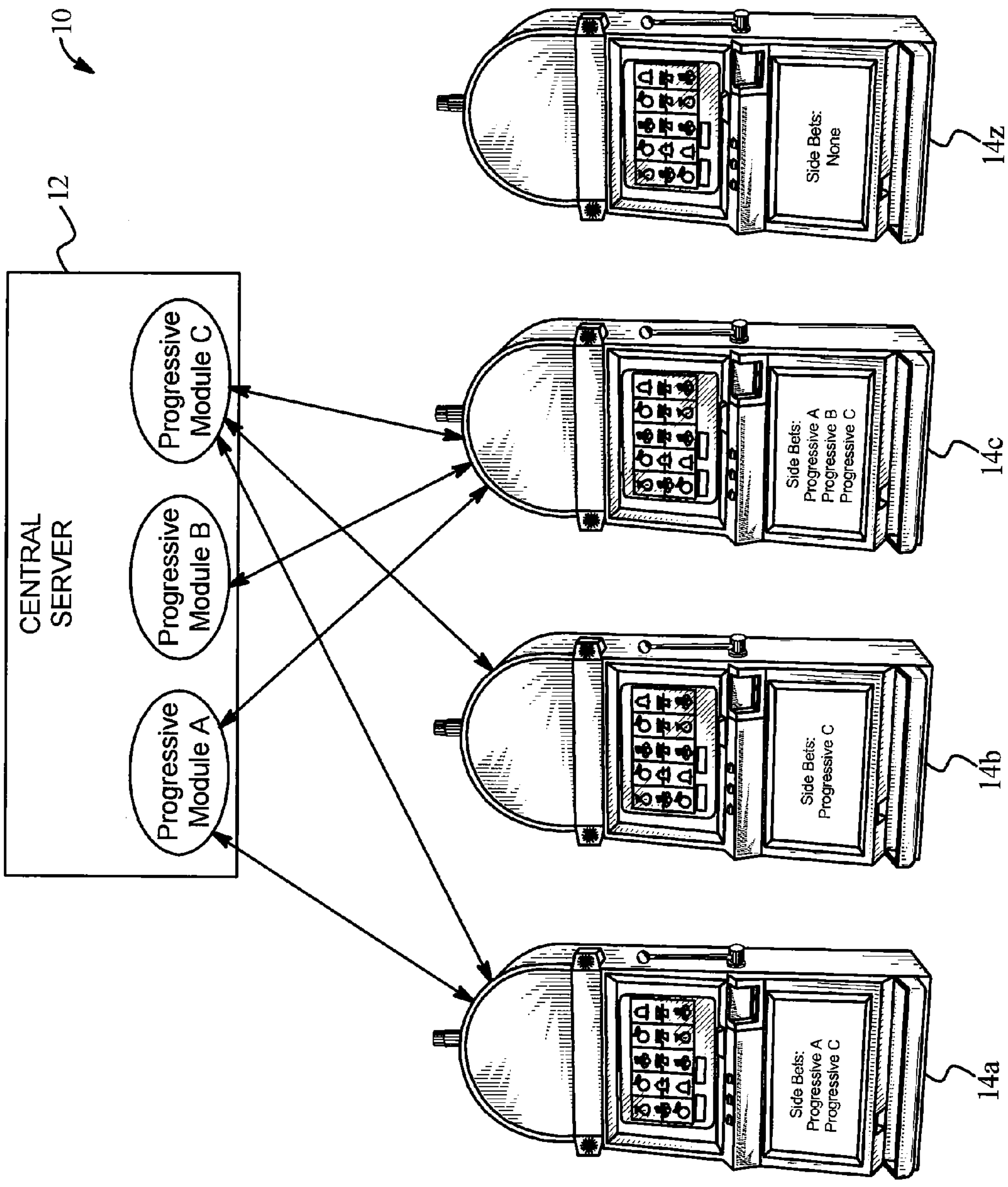
FIG. 8 is a schematic diagram of the central server in communication with a plurality of gaming devices in accordance with one embodiment of the gaming system disclosed herein wherein each progressive module is associated with one or more gaming devices and a plurality of gaming devices are each associated with a plurality of progressive modules.

As described above and further illustrated in FIG. 8, in another embodiment, each gaming machine is not initially associated with any progressive modules and thus any progressive awards. In this embodiment, the players at the gaming machines place zero, one or more side bets and each gaming machine is connected only to the progressive modules which match the player's side bet(s). For example, a first player at gaming device 14*a* placed side bets on progressive awards A and C (maintained by progressive modules A and C) and thus progressive modules A and C are associated with gaming device 14*a*; a second player at gaming device 14*b* placed a side bet on progressive award C (maintained by progressive module C) and thus progressive module C is associated with gaming device 14*b*; a third player at gaming device 14*c* placed side bets on each of the progressive awards and thus progressive modules A, B, and C are each associated with gaming device 14*c*; and a fourth player at gaming device 14*z* did not place a side bet on any progressive modules and thus no progressive modules (and no progressive awards) are associated with gaming device 14*z*.

In another embodiment, the gaming system disclosed herein enables a player to exchange or trade the progressive award associated with the player's currently played gaming device for a progressive award not associated with the player's currently played gaming device. In this embodiment, the gaming system enables a player to exchange a chance to win a primary or default progressive award associated with one progressive module for a chance to win a different supplemental progressive award associated with a second progressive module. In one embodiment, the gaming system enables a player to exchange a chance to win a primary or default progressive award for a chance to win a plurality of different supplemental progressive awards (or exchange a chance to win each of a plurality of primary progressive awards for a chance to win a different supplemental progressive award). In one embodiment, to exchange one progressive award for another progressive award, the progressive awards must be associated with each other, such as having substantially the same range of values, substantially the same contribution rates, and/or substantially the same hit rates. In another embodiment, if a player exchanges a first progressive award for a second progressive award which does not have substantially the same characteristics or parameters as the first progressive award (i.e., the second progressive award is substantially more valuable than the first progressive award), the gaming system enables the player to only obtain part of the second progressive award.

In another embodiment wherein each gaming device includes a separate wager meter which tracks wagers placed at that gaming device, if one or more side bets are placed on a gaming device, that gaming device individually flags and accounts for each side bet placed when communicating such side bet information to the central server. Upon receiving such information, the central server allocates the flagged side bet information to the appropriate progressive module and appropriate progressive award. In other words, in this embodiment, each gaming machine divides the total amount wagered at that gaming machine into an amount wagered on the underlying primary game and any amount(s) wagered (via one or more side bets placed) on each progressive award. It should be appreciated that, as described above, different players at different gaming devices may place side bets of the same or different amounts on the same progressive award and thus the central server may account for different side bet amounts from different individual gaming devices.

In one embodiment, enabling players to place side bets on one or more progressive awards provides each player the potential to select from multiple different progressive awards that are available through the central server. This embodiment enables many player to participate in a designated progressive, even if they are not currently on a gaming machine that is directly associated with the designated progressive. Such a gaming system enables each player to participate in (i.e., obtain a chance to win) any progressive in the gaming system, such as any progressive currently incremented in the casino, without having to seek out a specific gaming machine or wait until it becomes available. Such a gaming system further enables a player to participate in multiple progressives simultaneously, sequentially or in an over-lapping manner. Accordingly, in this embodiment, a player who placed a full side bet wager and is eligible for the game's own progressive award could theoretically obtain a plurality of progressive awards from a single play of a single gaming machine. The side bet feature creates a dynamic for the gaming system wherein both players of a game associated with the progressive award and non-players of a game place side bets to participate or compete for the same progressive award.

It should be appreciated that in one embodiment, if a player at a gaming device places a side-bet on a progressive award, the central controller communicates data to the gaming device and the gaming device determines if the player is provided the side-bet on progressive award. If the gaming device determines to provide the player the side-bet on progressive award, the gaming device provides the player the side-bet on progressive award and communicates data to the central controller regarding the providing of the progressive award.

In one embodiment, the side bet feature is implemented as a separate mini game on the gaming device which presents information to the central server like any other game. In one embodiment, the side bet sends a progressive file with its paytable information to the central server to be matched to an appropriate progressive award based on these characteristics. This on-demand feature essentially enables the player and/or operator to create, modify, and remove progressive awards quickly and efficiently to provide a dynamic floor that is adaptable to current demand. Accordingly, the gaming system disclosed herein lends itself to a server based gaming environment due to its quick ability to modify, assign and change gaming devices within the entire gaming system. These changes can be called for by both the player and the casino to adapt progressive awards to be implemented in a server based gaming environment to create an on-demand gaming environment.

In one embodiment, the setup of the gaming system enables for there to be two or more groups of progressive awards associated with a single gaming device (as could occur by the side-bet feature discussed above). For example, if a player chooses to place a side bet on a different progressive than the one associated with their currently played gaming device, the gaming device creates two progressive files (one for each wager placed) and the central server sorts through the data to enable the gaming device to contribute to two groups of progressive award in a single game play without requiring complex progressive metering at the gaming device. That is, for each progressive associated with a gaming device (as either a primary progressive award or a supplemental progressive award associated with a side bet), the gaming device sends a separate progressive file to the central server for the central server to sort out and assign to the proper progressive award.

Accordingly, in one embodiment, the gaming system disclosed herein includes a plurality of first gaming machines operable upon wagers by players, and a plurality of supplemental gaming machines operable upon wagers by players. The gaming system also includes a progressive award module associated with the plurality of first gaming machines, the progressive award module including at least one progressive award based at least in part on a wager contribution level of each of the plurality of first gaming machines. The gaming system further includes a progressive award triggering event associated with the progressive award module, wherein each of the plurality of first gaming machines has a first wager level and a second different wager level which are each associated with a different probability of triggering the progressive award triggering event and each are associated with a different wager contribution level, the different probabilities and contribution levels each being greater than zero. In this embodiment, the gaming system also includes a side wager event associated with the plurality of supplemental gaming machines. Upon the side wager event being triggered at least one of the supplemental gaming machines, the progressive award module is operable to determine the supplemental gaming machine associated with the side wager event, determine a wager level associated with the side wager event and determine a wager contribution level associated with the determined wager level. The progressive award module is also operable to determine a probability for the determined supplemental gaming machine to trigger the progressive award triggering event, wherein the probability is based at least in part on the determined wager level and the first and second wager contribution levels from at least one first gaming machine, and determine based on the determined probability if the determined supplemental gaming machine triggers the progressive award triggering event. In another embodiment, the progressive award module determines the probability for the determined supplemental gaming machine by multiplying the determined wager contribution level associated with the side wager event by a probability of triggering the progressive award associated with a first gaming machine, divided by the wager contribution rate associated with the first gaming machine.

In another embodiment, the gaming system disclosed herein includes a progressive award module including at least one progressive award, a progressive award triggering event associated with the at least one progressive award, and a plurality of first gaming machines in communication with the progressive award module. Each of the first gaming machines are operable upon a wager by a player. In this embodiment, each of the first gaming machines includes a base game, a first wager level and a second different wager level, wherein the first and second wager levels each provide an opportunity to win an award from said base game. Each of the first gaming machines also includes a first progressive contribution level based on said first wager level and a second different progressive contribution level based on said second wager level, wherein said first and second progressive contribution levels are each greater than zero. In this embodiment, each of the first gaming machines also includes a first probability of being associated with the progressive award triggering event based on the first wager level and a second different probability of triggering the progressive award triggering event based on the second wager level, wherein said first and second probabilities of triggering the progressive award triggering event are each greater than zero. In this embodiment, the gaming system also includes at least one supplemental gaming machine in communication with the progressive award module, wherein the supplemental gaming machine are operable upon a wager by a player. In this embodiment, the supplemental gaming machine includes a supplemental base game, at least one side wager level greater than zero, wherein the side wager level does not provide an opportunity to win an award from said supplemental base game, a supplemental progressive contribution level based on the side wager level, said supplemental progressive contribution level being greater than zero, and a supplemental probability of being associated with the progressive award triggering event based on the side wager level, said supplemental probability being greater than zero. In one such embodiment, the progressive award module is configured to increment the at least one progressive award based on the first, second and supplemental progressive contribution levels, identify any of the first and supplemental gaming machines associated with the progressive award triggering event, (wherein said association is based on the first, second and supplemental probabilities), and provide said at least one progressive award to any of the first and supplemental gaming machines identified as being associated with the progressive award triggering event.

Player Tracking

In another embodiment, the gaming system disclosed herein utilizes player tracking information to determine which gaming devices to associate with which progressive modules (and thus which progressive awards maintained by the central controller each player is eligible to win). In one embodiment, all gaming machines are eligible regardless of the status or "player tracking level" of the player at each gaming machine. In another embodiment, the central controller utilizes such information maintained by the player tracking system to ascertain betting history and wagers about each player. In this embodiment, players who consistently bet high and spend substantially amounts of time and/or money at a casino may be more likely to be eligible to win or receive a progressive award than a player who has little or no recorded history with the casino (i.e. a player with little or no tracked information). For example, the central server or player tracking system might rate the players as follows: 1) Player A with a player tracking card with a long history of high bets, 2) Player B with a player tracking card with a long history of average bets, 3) Player C with no player tracking card currently wagering high on a gaming machine for a specified period of time, 4) Player D with a player tracking card with a history of low bets, 5) Player E with no player tracking card currently wagering average bets and 6) Player F with no player tracking card currently wagering low bets. In this embodiment, Player A would be more likely to receive one of the progressive awards than Player F; however, in this embodiment, each of the players are still eligible to receive one of the progressive awards. It should be appreciated that just because the player tracking system does not maintain information about a player (i.e., the player does not have a tracking card), the player could still obtain a higher likelihood of receiving one of the progressive awards by wagering high bet amounts.

In one embodiment, the activation of the progressive modules of the central server are based on a player tracking system (implemented through a player tracking card or other suitable manner). In this embodiment, when a player inserts his or her player tracking card, the gaming machine sends suitable information to the central server. In one embodiment, the central server hosts the player tracking server, while in another embodiment, the central server requests the information from a separate player tracking server. Once the central server receives the information, the central server determines the status or "player tracking level" of the player. If the "player tracking level" is of a predefined limit, the player is eligible for progressive gaming and the central server activates another progressive module and associates it with the player's gaming machine. Thus, the gaming machine the player is currently playing is now connected to a progressive module and provides the player with the ability to increment the progressive pool further as well as possibly win it.

In another embodiment, the awarding of the progressive award is based on the player's status (via a player tracking system). For example, a bronze player may have a 0.5% chance of winning a designated progressive award maintained by the progressive module associated with the player's currently played gaming device, a silver player may have a 1.0% chance of winning the designated progressive award, a gold player may have a 1.5% chance of winning the designated progressive award and a platinum player may have a 2.0% chance of winning the designated progressive award. In another embodiment, the player's status is used to determine which level or progressive award of a multi-level progressive award configuration the player is eligible for. For example, if a player's club defines its players as bronze, silver, gold, and platinum, the bronze player may be eligible for only the bottom level of the MLP, the silver player may be eligible for the bottom two levels of the MLP, the gold player may be eligible for all but the top award on the MLP, and the platinum player may be eligible for all levels of the MLP.

In another embodiment, the player tracking card or system enables for a "personal progressive" which is associated with the specific player via the player tracking card. In this embodiment, the personal progressive increments based on a player's play of a gaming machine and is stored in association with that player's tracking card. Thus, if a player moves to another gaming machine, their personal progressive incremental value moves with them. In one embodiment, the player's personal progressive adjusts to the level of the player or of the game selected to play. In one embodiment, players with higher card levels are offered higher personal progressives or games of a certain type result in higher personal progressives.

In one embodiment, the gaming system disclosed herein provides personal equity progressive awards maintained by one or more progressive modules of the central controller. In this embodiment, in addition to the gaming system adding a percentage of all players' wagers to a group progressive award, the progressive award gaming system adds a second, individual player award or increment to the group progressive award for each individual player to form a personal progressive award for each player. That is, in this progressive setup, each player playing for the same group progressive award is provided a different total progressive award depending on that player's individual personal increment amount. Such a configuration provides the higher betting players a larger progressive award than players who play or wager less.

In one embodiment, restrictions are put on eligibility for one or more personal progressive awards, such as providing personal progressive awards for player tracking carded players only. In one such embodiment, a personal progressive award is tied to a player tracking card and thus tracks play on many games at many gaming devices (i.e., the personal progressive moves with the player). In one embodiment, the player's personal progressive award is provided to the player in addition to any other progressive awards provided to the player. In another embodiment, a player's personal progressive award has limitations regarding which group progressive awards it may be provided with.

In one example of this embodiment, a group progressive award is equal to $1050.00 and a personal progressive increment is equal to 1% of a player's wagers. In this example, Player A has wagered $300 (i.e., a personal increment of $3) and thus has a total progressive award of $1053.00. Player B has wagered $2,500 (i.e., a personal increment of $25) and thus has a total progressive award of $1075.00. Player C has wagered $15,000 (i.e., a personal increment of $150) and thus has a total progressive award of $1200.00.

In another embodiment, as mentioned above, a personal progressive award follows the player and is transferable (via a player tracking card) to any eligible game at any eligible gaming device that the player plays. For example, if Player A changes to a game with a $205 group progressive award and Player A is provided this new group progressive award, Player A is provided a total award or payout of $208 to account for Player A's personal increment of $3 that followed Player A. In one embodiment, a personal progressive award stays with the player until the player actually wins a progressive award. This setup provides a motivation for the player to continue to play, knowing they will eventually win their personal progressive award.

It should be appreciated that even if a first player is provided that player's personal increment amount (which resets to a base value or amount), other player's personal increment amounts do not reset until a suitable triggering event (such as being provided to a player). Relating back to the first example of the three players playing the $1050.00 progressive award, if Player A wins that progressive award and the progressive award is reset back to $500, the three player's new personal progressive values would be: Player A's total progressive award is $500 (since their personal increment value also reset when they won the progressive award); Player B's total progressive award is $525 (as their $25 personal increment value has not been reset); and Player C's total progressive award is $650 (as their $150 personal increment value has not been reset either). Accordingly, this embodiment provides a more attractive reset to players than traditional progressive awards because the reset value is higher than normal (i.e., one or more player's personal progressive increment have not been reset and carry over) which helps to eliminate jackpot fatigue. Moreover, in this embodiment, players are likely to want to continue to play for a progressive award in hopes of winning their personal progressive award which they may become personally attached to.

In another embodiment, multiple progressive awards or progressive pools are assigned to or personally associated with each player. In one such embodiment, a player carries a number of different personal progressive awards (such as a small personal progressive award, a medium personal progressive award, and a large personal progressive award). In one embodiment, each of these personal progressive awards has a different contribution rate and if one is provided to the player, the other personal progressive awards are still available to the player. This embodiments provides that a player will most likely have at least one personal progressive award greater than zero available in the event that one of their personal progressive awards is provided. In one embodiment, an MLP configuration includes more than one personal progressive award. In this embodiment, there are a number of progressive award levels available through the MLP configuration (such as the gold, silver, and bronze progressive awards), wherein the player has an associated personal progressive award for each MLP award level. For example, if the player is provided the gold progressive award level, the player is also provided their gold personal progressive award, but the current values for their remaining silver and bronze personal progressive awards are not reset.

In another embodiment, increment rates for one or more personal progressive awards are different for each player based on each players playing tracking card club rating. For example, a basic club member's personal progressive award increments at 0.05% while a platinum club member's personal progressive award increments at 0.2%. In one embodiment, a gaming establishment or casino places restrictions on one or more of the personal progressive awards, such as a personal progressive award is only available at certain times (i.e., the casino wishes to promote play at a certain time, such as during slow days or slow times).

In these embodiments, any suitable information regarding one or more personal progressive awards is provided to the player via the appropriate messaging (such as "Your personal progressive is now $50.00!! You can collect this anytime you win a progressive jackpot!!"). These messages may inform the player that their personal progressive will continue to grow until a progressive award event occurs, that the player won their personal progressive and/or any limitations that are associated with their personal progressive. In other embodiments, appropriate messaging is sent by the central server to inform players that their personal progressive awards have not been reset and may still be provided upon the player winning a jackpot.

WAP

Another usage of a central system based progressive controller is the ability to accommodate the feature of a wide area progressive (WAP) on demand. As indicated above, a WAP is a progressive award that is played over a large area and involves a large number of gaming machines. The gaming machines communicate with the progressive server regarding their coin-in values and the progressive server determines the amount of the WAP. Such coin-in values are also used to determine which players are eligible to play for the WAP (i.e. did the player wager the maximum bet amount) and the portion of each player's bet which is allotted for the WAP. In one embodiment, the WAP is won when the player receives a winning combination, such as three winning symbols on a specified payline.

In one embodiment of the gaming system disclosed herein, a host site computer or master WAP controller is coupled to a plurality of the central servers at a variety of mutually remote gaming sites for providing a multi-site linked progressive automated gaming system, such as through a wide area network or WAN. In one embodiment, the central server communicates to the WAP controller for progressive award data and appropriate security messaging. In one embodiment, a host site computer may serve gaming devices distributed throughout a number of properties at different geographical locations including, for example, different locations within a city or different cities within a state. In one embodiment, the host site computer is maintained for the overall operation and control of the gaming system. In this embodiment, a host site computer oversees the entire progressive gaming system and is the master for computing all progressive awards or progressive jackpots. All participating gaming sites report to, and receive information from, the host site computer. In this embodiment, each central server computer is responsible for all data communication between the gaming device hardware and software and the host site computer.

Such a setup provides the players of these gaming devices the ability to play for wide area progressive awards on demand, wherein a player may select to participate in one or more WAPs. If a player selects to participate in a WAP, the player's gaming device communicates with the associated progressive module on the central server to enable the player to play for the selected WAP. Thus, the player is enabled to participate in one or more WAPs at a gaming device which the player chooses. It should be appreciated that this embodiment gives the player not only the ability to play for any WAP on any gaming machine, but also enables the player to choose from different WAPs available to them.

In one embodiment, the casino utilizes the central server to communicate with a sign controller to display on one or more gaming devices (or on one or more peripheral displays associated with the gaming devices) information regarding the WAP. In one embodiment, these displays advertise or scroll the WAP on demand capability for the player. In another embodiment, the casino uses this display to indicate to the players which WAPs are available to participate in as well as to display other pertinent information about the available WAPs, such as current value, buy-in requirements.

In another embodiment including the above-described WAP on demand feature, the gaming system operator enables eligible WAP games on eligible gaming devices. In this embodiment, the gaming devices are each gaming system operator configurable to host WAP games. In one embodiment, the gaming system operators are given incentives to enable more WAPs on demand on more gaming devices in a gaming system. This enables a greater and dynamic number of gaming machines to be connected to the WAP network, but would give more control over the system to the operator as opposed to the player for how the WAP would be available.

Another embodiment utilizing WAPs on demand incorporates one or more side bets. In one embodiment, one or more gaming devices in the gaming system each enable a player to place a side bet on one or more WAPs. In this embodiment, once a player places one or more side bets on one or more WAPs, the player's currently played gaming device is connected to or otherwise associated with the associated progressive module(s) in the central server which maintain each wagered on WAP. This side bet features gives the players the potential to select from multiple different WAPs that are available through the central server. In this embodiment, each WAP has its own progressive module in the central server and in one embodiment, the central server determines which of the eligible players to provide which WAP. This determination of which players at which gaming devices are provided which WAPs may be game triggered, system triggered, based on a side wager, predetermined, randomly determined, determined based on the player's primary game wager, determined based on the player's status (such as determined through a player tracking system), determined based on a level of a jackpot award, determined based on time (such as the time of day) or determined based on any other suitable method or criteria.

In one embodiment, each gaming machine is connected only to the WAPs that match the side bet(s) which the player wagered on. In another embodiment, in addition to any WAPs the player placed a side bet on, each gaming device may also be eligible for the default progressive award associated with the player's gaming device. Thus, a player who is placing a full side bet wager on four different WAPs and is also eligible for the gaming device's default progressive award could theoretically win five progressive jackpots from a single play of a single gaming device. It should be appreciated that the determination of if the player is eligible for the gaming device's default progressive award may be automatic, based on a side wager, predetermined, randomly determined, determined based on the player's primary game wager, determined based on the player's status (such as determined through a player tracking system), determined based on a level of a jackpot award, determined based on time (such as the time of day) or determined based on any other suitable method.

In one embodiment, one or more relatively smaller wins or smaller progressive awards are associated with a player's WAP side bet. Such smaller WAPs enables for a greater number progressive awards to be made available to players of the gaming system. Thus, these smaller WAPS and smaller wins provide for a greater hit frequently and create additional excitement among players as they feel these smaller WAPs are actually attainable.

In one embodiment, each WAP has its own accounting function integrated into its associated progressive module. In another embodiment, if the WAP extends multiple properties, each multi-site WAP is in communication with the master WAP controller for accounting purposes. As described above, the accounting may be a separate dollar amount based upon the side wagers. In one embodiment, the side wager is a fixed dollar amount wherein a specified bet is required. In another embodiment, the side wager is a variable dollar amount set by the player. In this embodiment, when selecting a winner, the central server takes into account the player's side bet wager in comparison to the side bet wagers of other players. For example, a player who consistently places a higher side bet wager on a designated WAP has a greater chance or probability of winning the designated WAP than a player who consistently places the minimum side bet wager on the designated WAP.

In addition to a side bet feature, in one embodiment, the gaming system enables for the WAP on demand as a second game, for example, on an upper display. In this embodiment, the WAP second game is independent of the base or primary game and the gaming system enables the player to enter the WAP second game based upon any number of criterion, such as game driven, mystery, operator controlled or any other suitable criteria.

In another embodiment, the WAP on demand feature is integrated with a player tracking system. In this embodiment, the player tracking system collects data from a player's tracking card and uses this information in implementing the WAP on demand. Based on the data collected, the gaming system determines whether or not to offer the player the option to have one or more WAPs on demand. In another embodiment, player preferences are stored by the player tracking system and the gaming system automatically recognizes if the player has a history of playing for one or more WAPs on demand, which WAPs they prefer, as well as the player's wagering history. In one embodiment, adjusted game menus are presented based upon the player's information attained from the player tracking system. Such embodiments provide incentives, offers, or other suitable comps to the players, which provides players with a customizable playing experience with the WAP based on stored player preferences.

Beyond the effect on the progressive gaming systems, increased player control, increased operator control and the flexibility offered by enabling the central server to also serve as the progressive controller, the gaming system disclosed herein has potentials for cross property implementation. It should be appreciated that apart from the WAP on demand having the capability to be cross-property, the linked systems as well as the MLPs may be implemented as cross-property progressives. As detailed above, in both the linked and MLP systems, the gaming devices are connected to their appropriate progressive module which are part of the central server. In one embodiment, to be implemented as a cross-property, the progressive module is in communication with a master global server. Each master global server would be restricted by current gaming regulations and would accept only progressive communications from regulated and verified machines (i.e. no cross of state links). As with the case when multiple MLP systems are connected together, this embodiment enables for progressives to grow at a much larger rate, hit frequencies to increase and player excitement to grow along with casino revenue.

Signage

Figure 9:
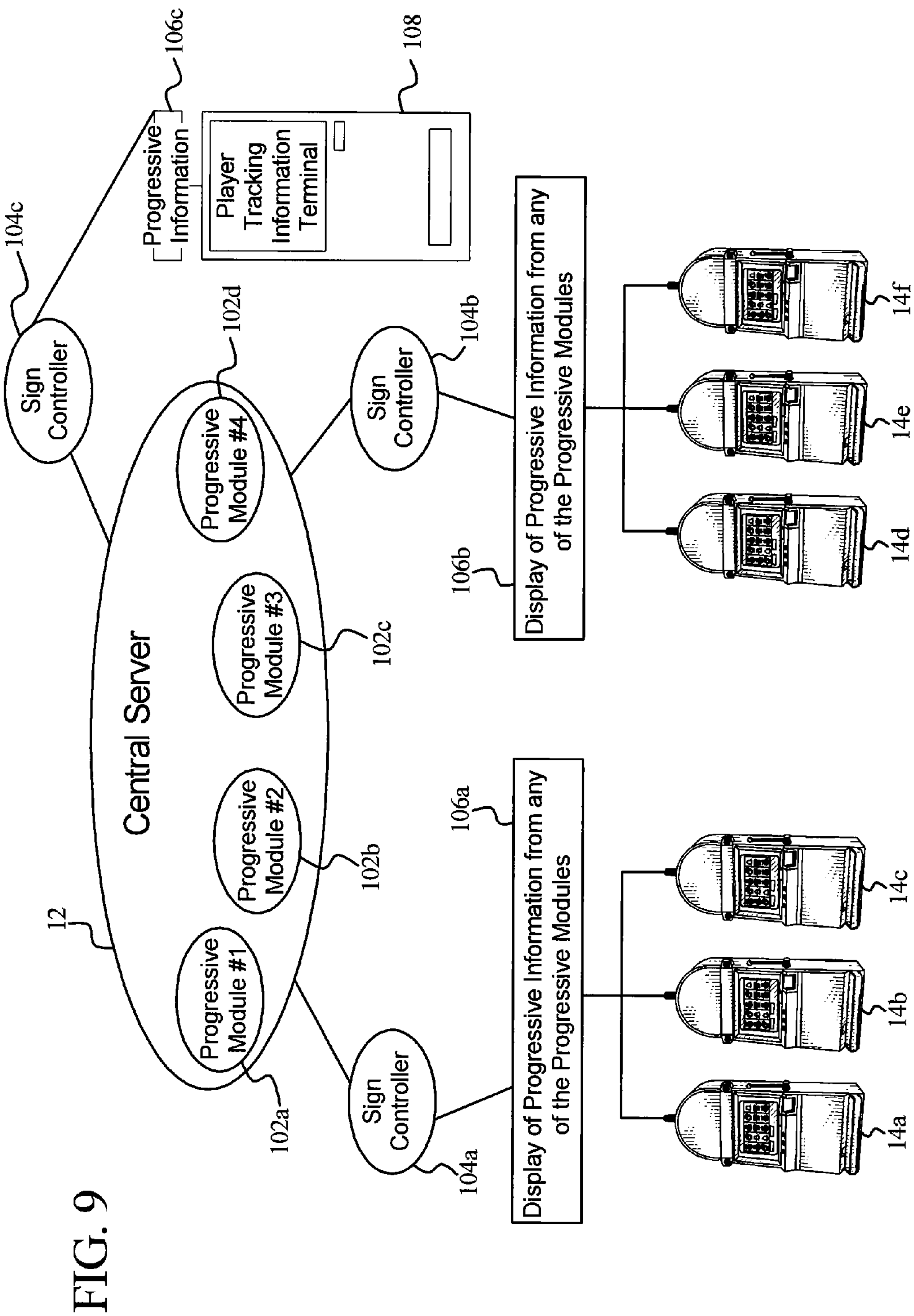
FIG. 9 is a schematic diagram of the central server in communication with a plurality of gaming devices in accordance with one embodiment of the gaming system disclosed herein wherein the central server is in further communication with a plurality of sign controllers to control which information is displayed to the players of the gaming system.

As discussed briefly above, this configuration of the progressive controller within the central server provides the ability to control the signage for the gaming machines in the gaming system. As seen in FIG. 9, each individual sign 106 is associated with a sign controller 104 which is connected to the central controller as shown below.

The central server communicates with the sign controller(s) and instructs what content to display, where to display such content, how to display such content and for how long to display such content. In one embodiment, the sign controller displays any information as long as it has the proper content manager. For example, the sign controller causes the sign to display the current values of the progressive award the gaming machine (or bank of gaming machines) is currently connected to or associated with. In another embodiment, the sign controller causes one or more signs to display information such as winners and jackpots won. In one example, the sign controller has the capability of displaying information about other progressive awards the central server has progressive module information for. It should be appreciated that the sign controller is programmed on a loop to display a plurality of information not only on a single sign, but also on other sign in the casino as well. It should be further appreciated that such information can be provided to the players through any suitable audio, audio-visual or visual devices.

As also illustrated in FIG. 9, in one embodiment, auxiliary devices, such as player tracking information terminals 108, have signs connected to the sign controllers in communication with the central server. These signs at these locations would also loop through progressive information to encourage and excite players about current progressive awards and progressive award levels. This would motivate the players to find the gaming machines where they can participate for these progressive award events.

In one embodiment, the control of the signage is essential in the implementation of cross-property progressive or WAPs on demand. Because of the cross-property nature, players are unable to see or hear every time a hit is achieved. The use of signage is therefore critical to communicating this information and keeping player excitement up. In different embodiments, the signs are used to show the current progressive levels as well as jackpot or progressive award hits and the progressive awards won by those who achieved the hits. In one embodiment, the master server communicates with the central server the status of the MLP or any linked system progressive awards. The central server communicates this information to associated sign controllers for each progressive gaming system to display the information to the players. In one embodiment, one or more gaming devices in the gaming system display information about one or more of the progressive awards which a player may wager on, which progressive awards are associated with which games and/or which progressive awards are associated with which gaming themes or types of gaming devices. In one such embodiment, the gaming device scrolls information about each progressive award on one or more displays. In another embodiment, the central controller communicates data or information to one or more display devices near a bank of gaming devices, wherein the display devices display which progressive awards are associated with the actively played games at the gaming devices in the bank, which progressive awards are associated with non-played games at the gaming devices in the bank or any other suitable information relating to one or more progressive awards which one or more players may play for.

By enabling the central server to house all of the progressive modules and communicate with the separate sign controllers, the gaming system presents the player with much more information and is suited for the adaptability that goes along with server based gaming. In the event the gaming system operator or the player changes which progressive award a gaming machine (or bank of gaming machines) is playing, the gaming system recognizes this change and dynamically changes the sign information to that which is most appropriate for the current state of the gaming machine and the player playing the gaming machine.

For example, in a stand-alone progressive embodiment, each gaming machine has the appropriate signage for its progressive. Because it is connected to the central controller, the sign controller accurately reflects status information to the player. In one of the embodiments discussed above, progressives may only be available to a certain level of player. In this embodiment, if a non-eligible player inserts his or her player tracking card, the gaming system recognizes that the gaming device should not be associated with a progressive module and therefore no progressive information should be displayed to the player. Likewise, in an MLP progressive configuration, only certain progressive award levels should be shown to a player who is not of the highest status. In these embodiments, the signs may be used to provide explanation to the player as to why they are eligible for the bonuses available to them. Further, the signs could display how to become eligible for other bonuses the player is not able to obtain.

In another embodiment, the PM gaming system described above includes a plurality of messages to provide to the player. For example, these messages inform the player of progressive award or jackpot information, attract players to one or more progressive awards, inform player of their status/eligibility for one or more progressive awards, display when a progressive award is won, display when a gaming session has ended, provide suitable player alerts, or display any other suitable information chosen by the gaming system operator. In another embodiment, the PM keeps progressive award or jackpot tokens, which are similar to messages, but are only communicated within the gaming system (to game machines, kiosks, displays, meters, etc.). These tokens include information about progressive award amounts, player ranking bonus amounts, variable bonus amounts, progressive award hit amounts, player information, progressive award information, gaming machine information, or any other suitable information chosen by the gaming system operator.

In another embodiment, the central controller (or progressive module of the central controller) broadcasts performance messaging to one or more devices in the gaming system. In one embodiment, the PM is incorporated with a sign manager which integrates with the PM to display any suitable information. For example, if the PM receives coin-in meters at a set rate, the PM communicates with the sign manager (based on that rate) to broadcast any updates to any progressive awards or progressive pools.

By utilizing of the central server to communicate with each sign controller, the gaming system presents a wealth of information to the player about not only progressive awards the player is participating in, but also other progressive awards that may be available to the player. Furthermore, the central server and sign controller configuration enables for the signs to be custom tailored to the player who is playing each gaming device to provide the player with information that will be most beneficial to their gaming session.

Partial Payouts

In one embodiment, the gaming system disclosed herein provides for shared progressive awards wherein the player receives a payout established based on the ratio of their wager to all wagers at the time of the win. In one embodiment, the ratio is calculated as a function of the player's wagering history on the gaming device or any other known method of establishing how much a player is wagering in comparison to other players or how a player rates in comparison to other players. This embodiment enables for multiple players to share in a progressive award, even if it is only triggered by one of them. This causes increased excitement as many players would receive payouts, which reduces disappointment with not winning the progressive award. The integration with the sign control and the player tracking, as described above, provides that establishing payouts to the player and communicating information about the progressive award status is a much easier task due to the centralized nature of the system.

This gaming system configuration also provides the capability of partial progressives. In one embodiment, the progressive award provided is based on the player's actual bets. This embodiment relieves the stigma of always having to place the maximum bet because the player is provided a set amount of the progressive based on their relative betting. In another embodiment, providing a partial progressive award is based on how much the player is side betting. For example, if there are four possible progressives to side bet on, a player may only receive 100% of a progressive award they win if they chose to place a side bet on all four possible progressive awards.

In another embodiment, the providing or awarding of the partial progressive award is based on the player's status (via a player tracking system). As in the example above, a bronze player may have a chance of winning 25% of the full progressive, a silver player may have a chance of winning 50% of the full progressive, a gold player may have a chance of winning 75% of the full progressive and a platinum player may have a chance of winning 100% of the full amount. In another embodiment, the providing of the partial progressive is based on a player's bet pool (the higher the bet pool, the higher the chance of receiving the full progressive amount) or on the player's overall proportion of contribution compared to that of other players. As in the example above, Player A has contributed 300 credits and Player B has contributed 700 credits to the current pool of 1000 credits. Upon deciding to award the 1000 credits, the gaming machine provides Player A a chance of being awarded 30% of the full progressive and Player B a chance of being awarded 70% of the full progressive award, wherein the partial amount of the progressive award each player may win is based on their overall proportion of contribution. It should be further appreciated that any suitable characteristic to define a partial progressive could be used at the desire of the gaming system operator and/or game designer.

In one embodiment, consolation awards are provided to everyone playing for the progressive award. In this embodiment, the gaming system detects which players are currently placing wagers when a progressive award is hit and uses an algorithm or any other known method to award such players when the progressive award is hit. In one embodiment, the central server is in communication with a player tracking module to ensure that players get the appropriate credit based on any number of factors (e.g., time of play, amount wagered, if they triggered, player status, etc.). This enables a large number of players to share in the progressive award jackpot and create excitement among everyone, even for players that did not trigger the progressive award. In another embodiment, the gaming system disclosed herein includes one or more progressive modules dedicated to a plurality of gaming devices which are participating in a tournament configuration.

In one embodiment, the gaming system includes a multi-player accumulated value progressive award which coincides with providing one or more accumulated value progressive awards as described above. In this embodiment, the multi-player accumulated value progressive award is a progressive award or pool that is provided to all eligible players who are playing for the accumulated value progressive award when the accumulated value progressive award is provided to a player. Thus, players who are not provided the accumulated value progressive award still share in another progressive award of their own. In one embodiment, the multi-player accumulated value progressive award starts from zero and increments using a designated percentage of wagers placed. In this embodiment, when the multi-player accumulated value progressive award is hit, the multi-player accumulated value progressive award is split among one or more players. In different embodiments, this split is done evenly, is weighted based on play, is based on favoring player's with higher player tracking status, randomly determined, determined based on a player's primary game wager, determined based on a level of a progressive award, determined based on time (such as the time of day) or determined based on any other suitable method or criteria. In other embodiments, the split is controlled such that it only occurs if the multi-player accumulated value progressive award is at or above a certain value (i.e., to prevent awarding players an insignificant amount, such as $0.90 each) or the gaming system enables the multi-player accumulated value progressive award to reach a negative number which is compensated for in other manners (such as by the casino, from a reserve, or made up later).

In one embodiment, to receive the multi-player accumulated value progressive award, a player must be eligible. In one embodiment, eligibility is determined based on the player wagering within a designated timeframe requirement. In one embodiment, this timeframe is established depending on the type of game played (i.e. different timeframes for poker players and slot players). In one embodiment, when a player is eligible, an indicator or other suitable display communicates this information to the player. Additionally, if a player is ineligible for the multi-player accumulated value progressive award, the indicator or display communicates this information to the player and displays to the player how they may become eligible for the multi-player accumulated value progressive award. In different embodiments, eligibility to receive at least part of the multi-player accumulated value progressive award is based on a generated symbol or symbol combination, based on a random determination by the central controller, based on a random determination at a gaming machine, based on one or more side wagers placed, predetermined, randomly determined, determined based on the player's status (such as determined through a player tracking system), determined based on time (such as the time of day) or determined based on any other suitable method or criteria.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming machines, each gaming machine including:

at least one display device, at least one input device, at least one processor, and at least one memory device which stores a plurality of instructions, which when executed by the at least one processor, cause the at least one processor to operate with the at least one display device and the at least one input device to enable a player to play a game, wherein the game includes a plurality of outcomes that are each associated with an outcome probability; and a controller configured to communicate with the plurality of gaming machines, the controller including a plurality of progressive modules and programmed to:

(a) maintain a plurality of progressive awards, wherein each progressive award is maintainable by one of the progressive modules, and each of the progressive awards is associated with a progressive award probability;

(b) select one of the progressive awards, the selection occurring prior to selecting any of the outcomes to associate with the progressive award and the selection occurring independent of any determination to provide the progressive award;

(c) determine if any of the outcome probabilities of any of the outcomes of the games of any of the gaming machines are equal or substantially equal to the progressive award probability of the selected progressive award; and (d) if any of the outcome probabilities of any of the outcomes of the games of any of the gaming machines are equal or substantially equal to the progressive award probability of the selected progressive award, without modifying or substantially modifying the progressive award probability of the selected progressive award:

(i) select one of the gaming machines which includes at least one of the outcomes with one of the outcome probabilities that is equal or substantially equal to the progressive award probability of the selected progressive award, the selection of one of the gaming machines occurring prior to and independent of any determination to provide any of the progressive awards, (ii) associate the selected gaming machine with the progressive module which maintains the selected progressive award, (iii) select the outcome associated with the determined outcome probability that is equal or substantially equal to the progressive award probability of the selected progressive award, (iv) associate the selected outcome with the selected progressive award, and (v) if the selected outcome is generated by the selected gaming machine, cause the selected gaming machine to provide the selected progressive award to a player, wherein prior to the association of the selected outcome with the selected progressive award, if the selected outcome was generated by the selected gaming machine, the selected gaming machine would not provide the selected progressive award.

2. The gaming system of claim 1, wherein the plurality of outcomes and the plurality of outcome probabilities for at least one of the games are stored in a memory device of the controller.

3. The gaming system of claim 1, wherein the plurality of outcomes and the plurality of outcome probabilities for at least one of the games are stored in a memory device of one of the gaming machines.

4. The gaming system of claim 1, wherein the plurality of outcomes are a plurality of different symbol combinations.

5. The gaming system of claim 1, wherein at least one of the progressive modules maintains a plurality of progressive awards.

6. The gaming system of claim 1, wherein a plurality of the gaming machines each include a different game.

7. The gaming system of claim 6, wherein the different games include different outcomes associated with different outcome probabilities.

8. The gaming system of claim 1, wherein if none of the outcome probabilities of any of the outcomes of the games of any of the gaming machines are equal or substantially equal to the progressive award probability of the selected progressive award, the controller is programmed to repeat (a) to (d) at least once.

9. A gaming system comprising a plurality of gaming machines, each gaming machine including:

at least one display device, at least one input device, at least one processor, and at least one memory device which stores a plurality of instructions, which when executed by the at least one processor, cause the at least one processor to operate with the at least one display device and the at least one input device to enable a player to play a game which includes a plurality of outcomes that are each associated with an outcome probability; and a controller configured to communicate with the plurality of gaming machines, the controller including a plurality of progressive modules and programmed to:

(a) maintain a plurality of progressive awards, wherein each progressive award is maintainable by one of the progressive modules, and each of the progressive awards is associated with a progressive award probability;

(b) enable a gaming establishment operator to select one of the gaming machines and one of the progressive awards, (i) the selection of one of the progressive awards occurring: (A) prior to selecting any of the outcomes to associate with the selected progressive award, and (B) independent of any determination to provide the selected progressive award and (ii) the selection of one of the gaming machines occurring prior to and independent of any determination to provide any of the progressive awards;

(c) determine if any of the outcome probabilities of any of the outcomes of the game of the selected gaming machine are equal or substantially equal to the progressive award probability of the selected progressive award;

(d) if any of the outcome probabilities of any of the outcomes of the game of the selected gaming machine are equal or substantially equal to the progressive award probability of the selected progressive award, without modifying or substantially modifying the progressive award probability of the selected progressive award:

(i) associate the selected gaming machine with the progressive module which maintains the selected progressive award, (ii) select one of the determined outcomes, and (iii) associate the selected outcome with the selected progressive award, wherein prior to the association of the selected outcome with the selected progressive award, if the selected outcome was generated by the selected gaming machine, the selected gaming machine would not provide the selected progressive award.

10. The gaming system of claim 9, wherein the plurality of outcomes and the plurality of outcome probabilities for at least one of the games are stored in a memory device of the controller.

11. The gaming system of claim 9, wherein the plurality of outcomes and the plurality of outcome probabilities for at least one of the games are stored in a memory device of one of the gaming machines.

12. The gaming system of claim 9, wherein the plurality of outcomes are a plurality of different symbol combinations.

13. The gaming system of claim 9, wherein at least one of the progressive modules maintains a plurality of progressive awards.

14. The gaming system of claim 9, wherein a plurality of the gaming machines each include a different game.

15. The gaming system of claim 14, wherein the different games include different outcomes associated with different outcome probabilities.

16. The gaming system of claim 9, wherein if none of the outcome probabilities of any of the outcomes of the game of the selected gaming machine are equal or substantially equal to the progressive award probability of the selected progressive award, the controller is programmed to repeat (a) to (d) at least once.

17. A gaming system comprising:

at least one gaming machine including:

at least one display device, at least one input device, at least one processor, and at least one memory device which stores a plurality of instructions, which when executed by the at least one processor, cause the at least one processor to operate with the at least one display device and the at least one input device to enable a player to play a game which includes a plurality of outcomes, wherein each outcome is associated with an outcome probability; and a controller configured to communicate with the at least one gaming machine, the controller including a plurality of progressive modules and programmed to:

(a) maintain a plurality of progressive awards, wherein each progressive award is maintainable by one of the progressive modules, and each of the progressive awards is associated with a progressive award probability; and (b) after the gaming machine communicates a progressive award request to the controller, the progressive award request being communicated prior to and independent of any determination to provide any of the progressive awards:

(i) determine if any of the outcome probabilities of any of the outcomes of the game are equal or substantially equal to any of the progressive award probabilities of any of the progressive awards; and (ii) if any of the outcome probabilities of any of the outcomes of the game are equal or substantially equal to any of the progressive award probabilities of any of the progressive awards, without modifying or substantially modifying any of the progressive award probabilities of any of the progressive awards:

(A) select one of the progressive awards which is associated with one of the progressive award probabilities that is equal or substantially equal to one of the outcome probabilities of one of the outcomes of the game, the selection occurring independent of any determination to provide the progressive award, (B) after selecting one of the progressive awards, select one of the outcomes of the game which is associated with the outcome probability equal or substantially equal to the progressive award probability of the selected progressive award, (C) associate the gaming machine with the progressive module which maintains the selected progressive award, and (D) communicate data representing the selected outcome and the selected progressive award to the gaming machine, such that if the selected outcome is generated, the gaming machine provides the selected outcome to a player, wherein prior to the association of the gaming machine with the progressive module which maintains the selected progressive award, if the selected outcome was generated by the gaming machine, the gaming machine would not provide the selected progressive award.

18. The gaming system of claim 17, wherein the controller is programmed to deny the progressive award request if none of the outcome probabilities of any of the outcomes of the game are equal or substantially equal to any of the progressive award probabilities of any of the progressive awards.

19. The gaming system of claim 17, wherein the plurality of outcomes and the plurality of outcome probabilities for the game are stored in a memory device of the controller.

20. The gaming system of claim 17, wherein the plurality of outcomes and the plurality of outcome probabilities for the game are stored in a memory device of the gaming machine.

21. The gaming system of claim 17, wherein the plurality of outcomes are a plurality of different symbol combinations.

22. A method of operating a gaming system, the gaming system including a controller which includes a plurality of progressive modules, the controller is configured to communicate with a plurality of gaming machines wherein each gaming machine includes at least one display device, at least one input device, at least one processor, and at least one memory device which stores a plurality of instructions, which when executed by the at least one processor, cause the at least one processor to operate with the at least one display device and the at least one input device to enable a player to play a game having a plurality of outcomes that are each associated with an outcome probability, the method comprising:

(a) maintaining a plurality of progressive awards, wherein each progressive award is maintainable by one of the progressive modules, and each of the progressive awards is associated with a progressive award probability;

(b) selecting one of the progressive awards, the selection occurring prior to selecting any of the outcomes to associate with the progressive award and the selection occurring independent of any determination to provide the progressive award;

(c) determining if any of the outcome probabilities of any of the outcomes of the games of any of the gaming machines are equal or substantially equal to the progressive award probability of the selected progressive award; and (d) if any of the outcome probabilities of any of the outcomes of the games of any of the gaming machines are equal or substantially equal to the progressive award probability of the selected progressive award, without modifying or substantially modifying the progressive award probability of the selected progressive award:

(i) selecting one of the gaming machines which includes at least one of the outcomes with one of the outcome probabilities that is equal or substantially equal to the progressive award probability of the selected progressive award, the selection of one of the gaming machines occurring prior to and independent of any determination to provide any of the progressive awards, (ii) associating the selected gaming machine with the progressive module which maintains the selected progressive award, (iii) selecting the outcome associated with the determined outcome probability that is equal or substantially equal to the progressive award probability of the selected progressive award, (iv) associating the selected outcome with the selected progressive award, and (v) causing the selected gaming machine to provide the selected progressive award to a player, if the selected outcome is generated by the selected gaming machine, wherein prior to the association of the selected outcome with the selected progressive award, if the selected outcome was generated by the selected gaming machine, the selected gaming machine would not provide the selected progressive award.

23. The method of claim 22, which includes storing the plurality of outcomes and the plurality of outcome probabilities for at least one of the games in a memory device of the controller.

24. The method of claim 22, which includes storing the plurality of outcomes and the plurality of outcome probabilities for at least one of the games in a memory device of one of the gaming machines.

25. The method of claim 22, wherein the plurality of outcomes are a plurality of different symbol combinations.

26. The method of claim 22, which includes at least one of the progressive modules maintaining a plurality of progressive awards.

27. The method of claim 22, wherein a plurality of the gaming machines each include a different game.

28. The method of claim 27, wherein the different games include different outcomes associated with different outcome probabilities.

29. The method of claim 22, which includes repeating (b) to (d) at least once if none of the outcome probabilities of any of the outcomes of the games of any of the gaming machines are equal or substantially equal to the progressive award probability of the selected progressive award.

30. The method of claim 22, which is provided through a data network.

31. The method of claim 30, wherein the data network is an internet.

32. A method of operating a gaming system, the gaming system including a controller which includes a plurality of progressive modules, the controller is configured to communicate with a plurality of gaming machines wherein each gaming machine includes at least one display device, at least one input device, at least one processor, and at least one memory device which stores a plurality of instructions, which when executed by the at least one processor, cause the at least one processor to operate with the at least one display device and the at least one input device to enable a player to play a game having a plurality of outcomes that are each associated with an outcome probability, the method comprising:

(a) maintaining a plurality of progressive awards, wherein each progressive award is maintainable by one of the progressive modules, and each of the progressive awards is associated with a progressive award probability;

(b) enabling a gaming establishment operator to select one of the gaming machines and one of the progressive awards, (i) the selection of one of the progressive awards occurring: (a) prior to selecting any of the outcomes to associate with the selected progressive award and (b) independent of any determination to provide the selected progressive award and (ii) the selection of one of the gaming machines occurring prior to and independent of any determination to provide any of the progressive awards;

(c) determining if any of the outcome probabilities of any of the outcomes of the game of the selected gaming machine are equal or substantially equal to the progressive award probability of the selected progressive award; and (d) if any of the outcome probabilities of any of the outcomes of the game of the selected gaming machine are equal or substantially equal to the progressive award probability of the selected progressive award, without modifying or substantially modifying the progressive award probability of the selected progressive award:

(i) associating the selected gaming machine with the progressive module which maintains the selected progressive award, (ii) selecting one of the determined outcomes, and (iii) associating the selected outcome with the selected progressive award, wherein prior to the association of the selected outcome with the selected progressive award, if the selected outcome was generated by the selected gaming machine, the selected gaming machine would not provide the selected progressive award.

33. The method of claim 32, which includes storing the plurality of outcomes and the plurality of outcome probabilities for at least one of the games in a memory device of the controller.

34. The method of claim 32, which includes storing the plurality of outcomes and the plurality of outcome probabilities for at least one of the games in a memory device of one of the gaming machines.

35. The method of claim 32, wherein the plurality of outcomes are a plurality of different symbol combinations.

36. The method of claim 32, which includes at least one of the progressive modules maintaining a plurality of progressive awards.

37. The method of claim 32, wherein a plurality of the gaming machines each include a different game.

38. The method of claim 32, wherein the different games include different outcomes associated with different outcome probabilities.

39. The method of claim 32, which includes repeating (b) to (d) at least once if none of the outcome probabilities of any of the outcomes of the game of the selected gaming machine are equal or substantially equal to the progressive award probability of the selected progressive award.

40. The method of claim 32, which is provided through a data network.

41. The method of claim 40, wherein the data network is an internet.

42. A method of operating a gaming system, the gaming system including a controller which includes a plurality of progressive modules, the controller is configured to communicate with at least one gaming machine which includes at least one display device, at least one input device, at least one processor, and at least one memory device which stores a plurality of instructions, which when executed by the at least one processor, cause the at least one processor to operate with the at least one display device and the at least one input device to enable a player to play a game having a plurality of outcomes that are each associated with an outcome probability, the method comprising:

(a) maintaining a plurality of progressive awards, wherein each progressive award is maintainable by one of the progressive modules, and each of the progressive awards is associated with a progressive award probability;

(b) after a progressive award request is communicated from one of the gaming machines, causing the controller to determine if any of the outcome probabilities of any of the outcomes of the game are equal or substantially equal to any of the progressive award probabilities of any of the progressive awards, the progressive award request being communicated prior to and independent of any determination to provide any of the progressive awards; and (c) if any of the outcome probabilities of any of the outcomes of the game are equal or substantially equal to any of the progressive award probabilities of any of the progressive awards, without modifying or substantially modifying any of the progressive award probabilities of any of the progressive awards, causing the controller to:

(i) select one of the progressive awards which is associated with one of the progressive award probabilities that is equal or substantially equal to one of the outcome probabilities of one of the outcomes of the game, and the selection occurring independent of any determination to provide the progressive award, (ii) after selecting one of the progressive awards, select one of the outcomes of the game which is associated with the outcome probability equal or substantially equal to the progressive award probability of the selected progressive award, (iii) associate the gaming machine with the progressive module which maintains the selected progressive award, and (iv) communicate data representing the selected outcome and the selected progressive award to the gaming machine, such that if the selected outcome is generated, the gaming machine provides the selected outcome to a player, wherein prior to the association of the gaming machine with the progressive module which maintains the selected progressive award, if the selected outcome was generated by the gaming machine, the gaming machine would not provide the selected progressive award.

43. The method of claim 42, which includes causing the controller to deny the progressive award request if none of the outcome probabilities of any of the outcomes of the game are equal or substantially equal to any of the progressive award probabilities of any of the progressive awards.

44. The method of claim 42, which includes storing the plurality of outcomes and the plurality of outcome probabilities for the game in a memory device of the controller.

45. The method of claim 42, which includes storing the plurality of outcomes and the plurality of outcome probabilities for the game in a memory device of the gaming machine.

46. The method of claim 42, wherein the plurality of outcomes are a plurality of different symbol combinations.

47. The method of claim 42, which is provided through a data network.

48. The method of claim 47, wherein the data network is an internet.

* * * * *

UNITED STATES PATENT AND TRADEMARK OFFICE

CERTIFICATE OF CORRECTION

PATENT NO. : 8,137,188 B2
APPLICATION NO. : 11/470225
DATED : March 20, 2012
INVENTOR(S) : Robert E. Breckner et al.

It is certified that error appears in the above-identified patent and that said Letters Patent is hereby corrected as shown below:

IN THE CLAIMS

In Claim 3, Column 65, Line 22, replace “a” with --the at least one--.
In Claim 5, Column 65, Line 27, between “of” and “progressive” insert --the--.
In Claim 9, Column 65, Line 67, after “award” insert --,--.
In Claim 9, Column 66, Line 8, after “award;” insert --and--.
In Claim 11, Column 66, Line 33, replace “a” with --the at least one--.
In Claim 13, Column 66, Line 38, between “of” and “progressive” insert --the--.
In Claim 17, Column 67, Lines 4, 32, 37, 38, 40, 43, and 44, between “the” and “gaming” insert --at least one--.
In Claim 20, Column 67, Line 56, replace “a” with --the at least one-- and between “the” and “gaming” insert --at least one--.
In Claim 22, Column 67, Line 61, replace “is” with --being--.
In Claim 22, Column 68, Line 42, delete the “,” after “player,”.
In Claim 24, Column 68, Line 56, replace “a” with --the at least one--.
In Claim 26, Column 68, Lines 61 to 62, between “of” and “progressive” insert --the--.
In Claim 32, Column 69, Line 12, replace “is” with --being--.
In Claim 32, Column 69, Line 33, between “award” and “and” insert --,--.
In Claim 34, Column 69, Line 66, replace “a” with --the at least one--.
In Claim 36, Column 70, Lines 4 to 5, between “of” and “progressive” insert --the--.
In Claim 42, Column 70, Line 23, replace “is” with --being--.
In Claim 42, Column 70, Line 38, delete “one of,” between “the” and “gaming” insert --at least one--, and replace “machines” with --machine--.
In Claim 42, Column 70, Lines 63 and 67, between “the” and “gaming” insert --at least one--.
In Claim 42, Column 71, Lines 2, 4, and 6, between “the” and “gaming” insert --at least one--.
In Claim 45, Column 72, Line 6, replace “a” with --the at least one-- and between “the” and “gaming” insert --at least one--.

Signed and Sealed this
First Day of March, 2016

Michelle K. Lee

Michelle K. Lee
*Director of the United States Patent and Trademark Office*